(12) United States Patent
Yoshimura et al.

(10) Patent No.: US 12,219,559 B2
(45) Date of Patent: Feb. 4, 2025

(54) TERMINAL APPARATUS, BASE STATION APPARATUS, AND COMMUNICATION METHOD

(71) Applicant: SHARP KABUSHIKI KAISHA, Sakai (JP)

(72) Inventors: Tomoki Yoshimura, Sakai (JP); Daiichiro Nakashima, Sakai (JP); Shoichi Suzuki, Sakai (JP); Toshizo Nogami, Sakai (JP); Wataru Ouchi, Sakai (JP); Taewoo Lee, Sakai (JP); Huifa Lin, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 725 days.

(21) Appl. No.: 17/422,081

(22) PCT Filed: Jan. 8, 2020

(86) PCT No.: PCT/JP2020/000313
§ 371 (c)(1),
(2) Date: Jul. 9, 2021

(87) PCT Pub. No.: WO2020/145306
PCT Pub. Date: Jul. 16, 2020

(65) Prior Publication Data
US 2022/0104230 A1    Mar. 31, 2022

(30) Foreign Application Priority Data

Jan. 10, 2019  (JP) ................................. 2019-002869

(51) Int. Cl.
*H04W 72/1273* (2023.01)
*H04W 16/14* (2009.01)

(52) U.S. Cl.
CPC ....... *H04W 72/1273* (2013.01); *H04W 16/14* (2013.01)

(58) Field of Classification Search
CPC .......................... H04W 72/1273; H04W 16/14
(Continued)

(56) References Cited

U.S. PATENT DOCUMENTS 10,743,302 B2 *  8/2020  Yang ....................... H04L 5/005
2016/0337880 A1   11/2016  Nogami et al.
(Continued)

OTHER PUBLICATIONS

3GPP TSG-RAN WG4 Meeting AH-1807 R4-1808800 Montreal, Canada R4-1808800 Jul. 2-6, 2018 (Year: 2018).*
(Continued)

*Primary Examiner* — William Nealon
(74) *Attorney, Agent, or Firm* — ScienBiziP, P.C.

(57) ABSTRACT

A terminal apparatus comprises a reception unit and a higher layer processing unit. When a carrier is set in an unlicensed band, the reception unit is configured to detect a first PDCCH in a first type 0 PDCCH common search space set and receive a first PDSCH scheduled by the first PDCCH. When the carrier is not set in the unlicensed band, the reception unit is configured to detect a second PDCCH in a second type 0 PDCCH common search space set and receive a second PDSCH scheduled by the second PDCCH. A higher layer processing unit is configured to manage common RRC signaling included in the first PDSCH or the second PDSCH. A time domain resource configuration of the first PDSCH is a first configuration, and a time domain resource configuration of the second PDSCH is a second configuration different from the first configuration.

4 Claims, 20 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2017/0048828 A1* | 2/2017 | Um | H04L 1/0061 |
| 2018/0139618 A1* | 5/2018 | Yerramalli | H04W 72/1215 |
| 2020/0221428 A1* | 7/2020 | Moon | H04B 7/024 |
| 2020/0351849 A1* | 11/2020 | Yang | H04W 52/146 |

OTHER PUBLICATIONS

NTT Docomo, New SID Proposal: Study on New Radio Access Technology, 3GPP TSG RAN Meeting #71, RP-160671, Goteborg, Sweden, Mar. 7-10, 2016.

Ericsson, On DL signals and channels for NR-U, 3GPP TSG-RAN WG1 Meeting #95, R1-1813456, Spokane, USA, Nov. 12-16, 2018, section 1,2.1,2.1.1,2.1,2.2.1,2.2.21,2.1,2.1.1,2.1,2.2.1,2.2.2.

Vivo, Discussion on the channel access procedures, 3GPP TSG RAN WG1 Meeting #94bis, R1-1810382, Chengdu, China, Oct. 8-12, 2018, section 1,2.6.

Motorola Mobility, Lenovo, Feature lead summary for NR-U DL Signals and Channels, 3GPP TSG RAN WG1 Meeting 94bis, R1-1811911, Chengdu, China, Oct. 8-12, 2018, section 1,2.2,2. 3,5,7.

Ericsson, Discussion on RMC for RRM performance, 3GPP TSG RAN WG4 adhoc_TSGR4_AH-1807 R4-1808800, Jun. 25, 2018, pp. 1-5.

* cited by examiner

Number of OFDM symbols per slot, slots per frame, and slots per subframe for nomal cyclic prefix.

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 2A

Number of OFDM symbols per slot, slots per frame, and slots per subframe for extended cyclic prefix.

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2B

| PUCCH format | Length in OFDM symbols $N_{symb}^{PUCCH}$ |
|---|---|
| 0 | 1 - 2 |
| 1 | 4 - 14 |
| 2 | 1 - 2 |
| 3 | 4 - 14 |
| 4 | 4 - 14 |

FIG. 4

| Index | O | M | First OFDM symbol index |
|---|---|---|---|
| 0 | 0 | 1 | 0 |
| 1 | 0 | 1/2 | 0 if i is even, Nsym if i is odd |
| 2 | 2 | 1 | 0 |
| 3 | 2 | 1/2 | 0 if i is even, Nsym if i is odd |
| 4 | 5 | 1 | 0 |
| 5 | 5 | 1/2 | 0 if i is even, Nsym if i is odd |
| 6 | 7 | 1 | 0 |
| 7 | 7 | 1/2 | 0 if i is even, Nsym if i is odd |
| 8 | 0 | 2 | 0 |
| 9 | 5 | 2 | 0 |
| 10 | 0 | 1 | 1 |
| 11 | 0 | 1 | 2 |
| 12 | 2 | 1 | 1 |
| 13 | 2 | 1 | 2 |
| 14 | 5 | 1 | 1 |
| 15 | 5 | 1 | 2 |

FIG. 10

| index | dmrs-TypeA-position | S | L |
|---|---|---|---|
| 0 | 2 | 2 | 12 |
| 0 | 3 | 3 | 11 |
| 1 | 2 | 2 | 10 |
| 1 | 3 | 3 | 9 |
| 2 | 2 | 2 | 9 |
| 2 | 3 | 3 | 8 |
| 3 | 2 | 2 | 7 |
| 3 | 3 | 3 | 6 |
| 4 | 2 | 2 | 5 |
| 4 | 3 | 3 | 4 |
| 5 | 2 | 9 | 4 |
| 5 | 3 | 10 | 4 |
| 6 | 2 | 4 | 4 |
| 6 | 3 | 6 | 4 |
| 7 | 2,3 | 5 | 7 |
| 8 | 2,3 | 5 | 2 |
| 9 | 2,3 | 9 | 2 |
| 10 | 2,3 | 12 | 2 |
| 11 | 2,3 | 1 | 13 |
| 12 | 2,3 | 1 | 6 |
| 13 | 2,3 | 2 | 4 |
| 14 | 2,3 | 4 | 7 |
| 15 | 2,3 | 8 | 4 |

FIG. 11

TERMINAL APPARATUS, BASE STATION APPARATUS, AND COMMUNICATION METHOD

CROSS-REFERENCE TO RELATED APPLICATION

The present application claims the benefit of and priority to Japanese Patent Application No. 2019-002869, filed on Jan. 10, 2019, the content of which is hereby incorporated herein by reference.

FIELD

The present invention relates to a terminal apparatus, a base station apparatus, and a communication method.

BACKGROUND

A radio access scheme and a wireless network for cellular mobile communication (hereinafter, referred to as "Long Term Evolution (LIE)" or "Evolved Universal Terrestrial Radio Access (EUTRA)") have been studied in the 3rd Generation Partnership Project (3GPP). In LTE, a base station apparatus is referred to as an eNodeB, and a terminal apparatus is also referred to as a UE (User Equipment). LTE is a cellular communication system in which areas covered by a plurality of base station apparatuses are arranged in a cell-like configuration. A single base station apparatus may also manage multiple serving cells.

In the 3GPP, a next generation standard (New Radio or NR) (NPL 1) is being studied in order to make a proposal for International Mobile Telecommunication (IMT)-2020, a standard for a next-generation mobile communication system, standardized by the International Telecommunication Union (ITU). NR is required to satisfy requirements for three scenarios including eMBB (enhanced Mobile Broad-Band), mMTC (massive Machine Type Communication), and URLLC (Ultra Reliable and Low Latency Communication) in a single technology framework.

PRIOR ART LITERATURE

Non-Patent Literature

NPL 1: "New SID proposal: Study on New Radio Access Technology", RP-160671, NTT docomo, 3GPP TSG RAN Meeting #71, Goteborg, Sweden, Mar. 7-10, 2016.

SUMMARY

Technical Problem

One aspect of the present invention provides a terminal apparatus that performs communication efficiently, a communication method for the terminal apparatus, a base station apparatus that performs communication efficiently, and a communication method for the base station apparatus.

Solution to Problem (1) The first aspect of the present invention is to provide a terminal apparatus comprising: a reception unit configured to, when a carrier is set in an unlicensed band, detect a first Physical Downlink Control Channel (PDCCH) in a first type 0 PDCCH common search space set and receive a first Physical Downlink Shared Channel (PDSCH) scheduled by the first PDCCH and configured to, when the carrier is not set in the unlicensed band, detect a second PDCCH in a second type 0 PDCCH common search space set and receive a second PDSCH scheduled by the second PDCCH; and a higher layer processing unit configured to manage common Radio Resource Control (RRC) signaling included in the first PDSCH or the second PDSCH, wherein a time domain resource configuration of the first PDSCH is a first configuration, and a time domain resource configuration of the second PDSCH is a second configuration different from the first configuration.

(2) The second aspect of the present invention is to provide a base station apparatus comprising: a transmission unit configured to, when a carrier is set in an unlicensed band, transmit a first PDCCH in a first type 0 PDCCH common search space set and transmit a first PDSCH scheduled by the first PDCCH and configured to, when the carrier is not set in the unlicensed band, transmit a second PDCCH in a second type 0 PDCCH common search space set and transmit a second PDSCH scheduled by the second PDCCH; and a higher layer processing unit configured to manage common RRC signaling included in the first PDSCH or the second PDSCH, wherein a time domain resource configuration of the first PDSCH is a first configuration, and a time domain resource configuration of the second PDSCH is a second configuration different from the first configuration.

(3) The third aspect of the present invention is to provide a communication method for a terminal apparatus comprising the following steps: detecting, when a carrier is set in an unlicensed band, a first PDCCH in a first type 0 PDCCH common search space set and receiving a first PDSCH scheduled by the first PDCCH, and detecting, when the carrier is not set in the unlicensed band, a second PDCCH in a second type 0 PDCCH common search space set and receiving a second PDSCH scheduled by the second PDCCH, and managing common RRC signaling included in the first PDSCH or the second PDSCH, wherein a time domain resource configuration of the first PDSCH is a first configuration, and a time domain resource configuration of the second PDSCH is a second configuration different from the first configuration.

(4) The fourth aspect of the present invention is to provide a communication method for a base station apparatus comprising the following steps: transmitting, when a carrier is set in an unlicensed band, a first PDCCH in a first type 0 PDCCH common search space set and transmitting a first PDSCH scheduled by the first PDCCH, and transmitting, when the carrier is not set in the unlicensed band, a second PDCCH in a second type 0 PDCCH common search space set and transmitting a second PDSCH scheduled by the second PDCCH; and managing common RRC signaling included in the first PDSCH or the second PDSCH, wherein a time domain resource configuration of the first PDSCH is a first configuration, and a time domain resource configuration of the second PDSCH is a second configuration different from the first configuration.

Invention Effect

According to one aspect of the present invention, the terminal apparatus can perform communication efficiently. In addition, the base station apparatus can perform communication efficiently.

BRIEF DESCRIPTION OF THE DRAWINGS

FIGS. 2A-2B are examples showing a relationship among $N^{slot}_{synth}$, a subcarrier spacing configuration μ, and a Cyclic Prefix (CP) configuration according to one aspect of the present embodiment.

FIG. 4 is a schematic diagram showing an example of a relationship between a Physical Uplink Control CHannel (PUCCH) format and the length $N^{PUCCH}_{synth}$ of the PUCCH format according to one aspect of the present embodiment.

FIG. 10 is a diagram showing a configuration example of a monitoring occasion for a type 0 PDCCH common search space set according to one aspect of the present embodiment.

FIG. 11 is a diagram showing an example of configuration information of a PDSCH indicated by a downlink time-domain resource allocation field included in a Downlink Control Information (DCI) format included in a PDCCH included in a monitoring occasion for a type 0 PDCCH common search space set according to one aspect of the present embodiment.

DETAILED DESCRIPTION OF THE PREFERRED EMBODIMENTS

Hereinafter, the embodiments of the present invention will be described.

The term "A and/or B" may be a term that includes "A", "B", or "A and B".

Figure 1:
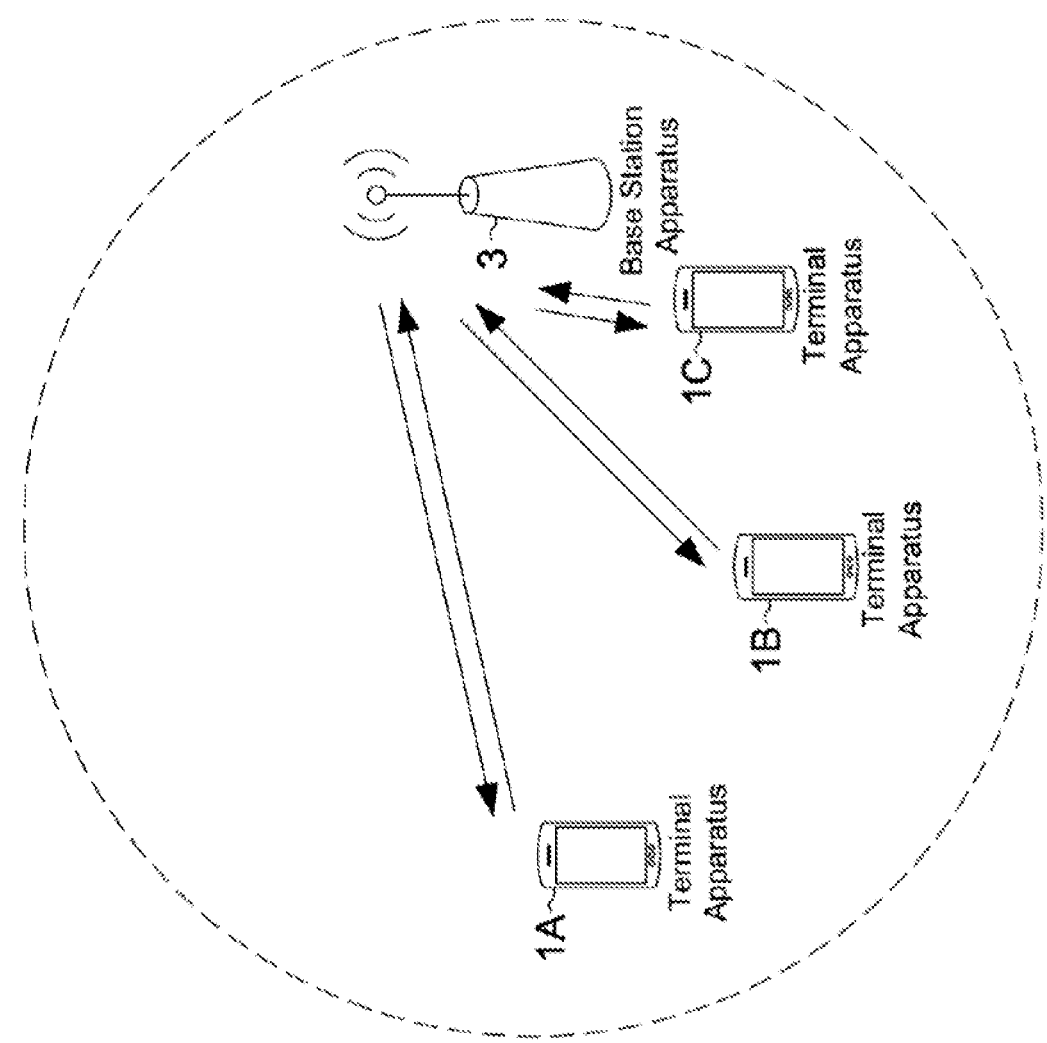
FIG. 1 is a conceptual diagram of a wireless communication system according to one aspect of the present embodiment.

FIG. 1 is a conceptual diagram of a wireless communication system according to one aspect of the present embodiment. In FIG. 1, the wireless communication system includes terminal apparatuses 1A to 1C and a base station apparatus 3 (BS #3: Base Station #3). Hereinafter, the terminal apparatuses 1A to 1C are refer to as a terminal apparatus 1 (UE #1: User Equipment #1).

The base station apparatus 3 may be configured to include one or both of an MCG (Master Cell Group) and an SCG (Secondary Cell Group). The MCG is a group of serving cells that include at least a PCell (Primary Cell). The SCG is a group of serving cells that include at least a PSCell (Primary Secondary Cell). The PCell may be a serving cell given based on an initial connection. The PCell may also be a serving cell where an initial connection is performed. The MCG may also include one or more SCells (Secondary cells). The SCG may also include one or more SCells. The PCell is also referred to as a primary cell. The PSCeil is also referred to as a primary secondary cell. The SCell is also referred to as a secondary cell.

The MCG may also include serving cells in an EUTRA. The SCG may also include serving cells in a next generation standard (New Radio (NR)).

A frame configuration will be described below.

In a wireless communication system according to one aspect of the present embodiment, at least OFDM (Orthogonal Frequency Division Multiplexing) is used. An OFDM symbol is a unit of an OFDM time domain. An OFDM symbol includes at least one or more subcarriers. An OFDM symbol may also be converted into a time-continuous signal in generation of a baseband signal. In a downlink, at least CP-OFDM (Cyclic Prefix Orthogonal Frequency Division Multiplexing) is used. In an uplink, either CP-OFDM or DFT-s-OFDM (Discrete Fourier Transform-Spread-Orthogonal Frequency Division Multiplexing) is used. The DFT-s-OFDM is given by applying transform preceding to the CP OFDM.

The OFDM symbol may also be a term including a CP attached to the OFDM symbol. In other words, a certain OFDM symbol may be configured to include the certain OFDM symbol and a CP attached to the certain OFDM symbol.

A subcarrier spacing (SCS) may be given by the subcarrier spacing $\Delta f = 2^\mu \cdot 15$ kHz. For example, a subcarrier spacing configuration p. may be configured to be any one of 0, 1, 2, 3, 4, and/or 5. For a certain BWP (BandWidth Part), the subcarrier spacing configuration μ may be given by a higher layer parameter.

In a wireless communication system according to one aspect of the present embodiment, a time unit $T_c$ may be used to represent the length of a time domain. The time unit $T_c$ may be given by $T_c = 1/(\Delta f_{max} \cdot N_f)$. $\Delta f_{max}$ may be the maximum value of the subcarrier spacing supported in the wireless communication system according to one aspect of the present embodiment. $\Delta f_{max}$ may be $\Delta f_{max} = 480$ kHz, $N_f$ may be $N_f = 4096$. A constant κ is $\kappa = \Delta f_{max} \cdot N_f / (\Delta f_{ref} N_{f,ref}) = 64$. $\Delta f_{ref}$ may be 15 kHz. $N_{f,ref}$ may be 2048.

The constant κ may be a value indicating a relationship between a reference subcarrier spacing and $T_c$. The constant κ may be used for a length of a subframe. The number of slots included in the subframe may be given at least based on the constant κ. $\Delta f_{ref}$ is the reference subcarrier spacing, and $N_{f,ref}$ is a value corresponding to the reference subcarrier spacing.

The transmission of a signal on a downlink and/or the transmission of a signal on an uplink may be organized into 10 ms frames. A frame includes 10 subframes. The length of a subframe is 1 ms. The length of a frame may be given independently of the subcarrier spacing Δf. In other words, the length of a frame may be given independently of μ. The length of a subframe may be given independently of the subcarrier spacing Δf. In other words, the length of a subframe may be given independently of μ.

For a certain subcarrier spacing configuration μ, the number and indexes of slots included in a subframe may be given. For example, a slot number $n^\mu_s$ may be given by an integer value in ascending order in a range from 0 to $N^{subframe, \mu}_{slot}-1$ within a subframe. For a subcarrier spacing configuration μ, the number and indexes of slots included in a frame may be given. In addition, a slot number $n^\mu_s$ may be given by an integer value in ascending order in a range from 0 to $N^{frame, \mu}_{slot}-1$ within a frame. $N^{slot}_{symb}$ consecutive OFDM symbols may be included in one slot. $N^{slot}_{symb}$ may be given at least based on some or all of CP (Cyclic Prefix) configurations. The CP configuration may be given at least based on a higher layer parameter. The CP configuration may be given at least based on dedicated RRC signaling. The slot number is also referred to as a slot index.

FIGS. 2A-2B are examples showing a relationship among $N^{slot}_{symb}$, a subcarrier spacing configuration μ, and a CP configuration according to one aspect of the present embodiment. In FIG. 2A, for example, when the subcarrier spacing configuration μ is 2 and the CP configuration is a normal CP (normal cyclic prefix), $N^{slot}_{symb}=14$, $N^{frame, \mu}_{slot}=40$, and $N^{subframe, \mu}_{slot}=4$. In addition, in FIG. 2B, for example, when the subcarrier spacing configuration μ is 2 and the CP configuration is an extended CP (extended cyclic prefix), $N^{slot}_{symb}=12$, $N^{frame, \mu}_{slot}=40$, and $N^{subframe, \mu}_{slot}=4$.

Physical resources will be described below.

An antenna port is defined in such a manner that a channel on which a symbol is transmitted on one antenna port can be inferred from a channel on which another symbol is transmitted on the same antenna port. In a case that a large scale property of a channel on which a symbol is transmitted on one antenna port can be inferred from a channel on which a symbol is transmitted on another antenna port, the two antenna ports are referred to as being QCL (Quasi Co-Located). The large scale property may include at least a long term property of a channel. The large scale property may include at least some or all of delay spread, Doppler spread, Doppler shift, average gain, average delay, and spatial Rx parameters. The expression that a first antenna port and a second antenna port are QCL with respect to a beam parameter may mean that a reception beam assumed by the reception side for the first antenna port may be the same as a reception beam assumed by the reception side for the second antenna port. The expression that a first antenna port and a second antenna port are QCL with respect to a beam parameter may mean that a transmission beam assumed by the reception side for the first antenna port may be the same as a transmission beam assumed by the reception side for the second antenna port. In a case that a large scale property of a channel on which a symbol on one antenna port is transmitted can be inferred from a channel on which a symbol on another antenna port is transmitted, the terminal apparatus 1 may assume the two antenna ports to be QCL. The expression that two antenna ports are QCL may mean that the two antenna ports are assumed to be QCL.

A resource grid defined by $N^{size, \mu}_{grid,x}N^{RB}_{sc}$ subcarriers and $N^{subframe, \mu}_{symb}$ OFDM symbols is given for a subcarrier spacing configuration and a carrier set. $N^{size, \mu}_{grid,x}$ may indicate the number of resource blocks given for the subcarrier spacing configuration μ. $N^{size, \mu}_{grid,x}$ may also represent the bandwidth of a carrier. $N^{size, \mu}_{grid,x}$ may also correspond to the value of a higher layer parameter CarrierBandwidth. The carrier x may indicate either a downlink carrier or an uplink carrier. In other words, x may be either downlink (DL) or uplink (UL). $N^{RB}_{sc}$ may indicate the number of subcarriers included in one resource block. $N^{RB}_{sc}$ may be 12. At least one resource grid may be given for each antenna port p and/or for each subcarrier spacing configuration μ and/or for each transmission direction configuration. The transmission direction includes at least a DL and a UL. Hereinafter, a set of parameters including at least some or all of the antenna port p, the subcarrier spacing configuration, and the transmission direction configuration is also referred to as a first radio parameter set. In other words, one resource grid may be given for each first radio parameter set.

In the downlink, a carrier included in a serving cell is referred to as a downlink carrier (or a downlink component carrier). In the uplink, a carrier included in a serving cell is referred to as an uplink carrier (an uplink component carrier). The downlink component carrier and the uplink component carrier are collectively referred to as a component carrier (or a carrier).

The type of the serving cell may be any one of a PCell, a PSCell, and a SCell. The PCell may be a serving cell identified at least based on a cell ID acquired from an SS (Synchronization Signal)/PBCH (Physical Broadcast Channel) in an initial connection. The PCell may be at least configured with a RACH (Random Access CHannel) resource. The SCell may be a serving cell used in carrier aggregation. The SCell may be a serving cell given at least based on dedicated RRC signaling.

Each element in the resource grid given for each first radio parameter set is referred to as a resource element. The resource element is identified at least based on a frequency domain index k, and a time domain index $l_{sym}$. For a certain first radio parameter set, the resource element is identified at least based on a frequency domain index $k_{sc}$ and a time domain index $l_{sym}$. The resource element identified by the frequency domain index $k_{sc}$ and the time domain index $l_{sym}$ is also referred to as a resource element ($k_{sc}$, $l_{sym}$). The frequency domain index $k_{sc}$ indicates any of values from 0 to $N^\mu_{RB}N^{RB}_{sc}-1$. $N^\mu_{RB}$ may be the number of resource blocks given for the subcarrier spacing configuration μ. $N^\mu_{RB}$ may also be $N^{size, \mu}_{grid,x}$. $N^{RB}_{sc}$ so may be the number of subcarriers included in a resource block, and $N^{RB}_{sc}=12$. The frequency domain index $k_{sc}$ may correspond to a subcarrier index $k_{sc}$. The time domain index $l_{sym}$ may correspond to an OFDM symbol index $l_{sym}$.

Figure 3:
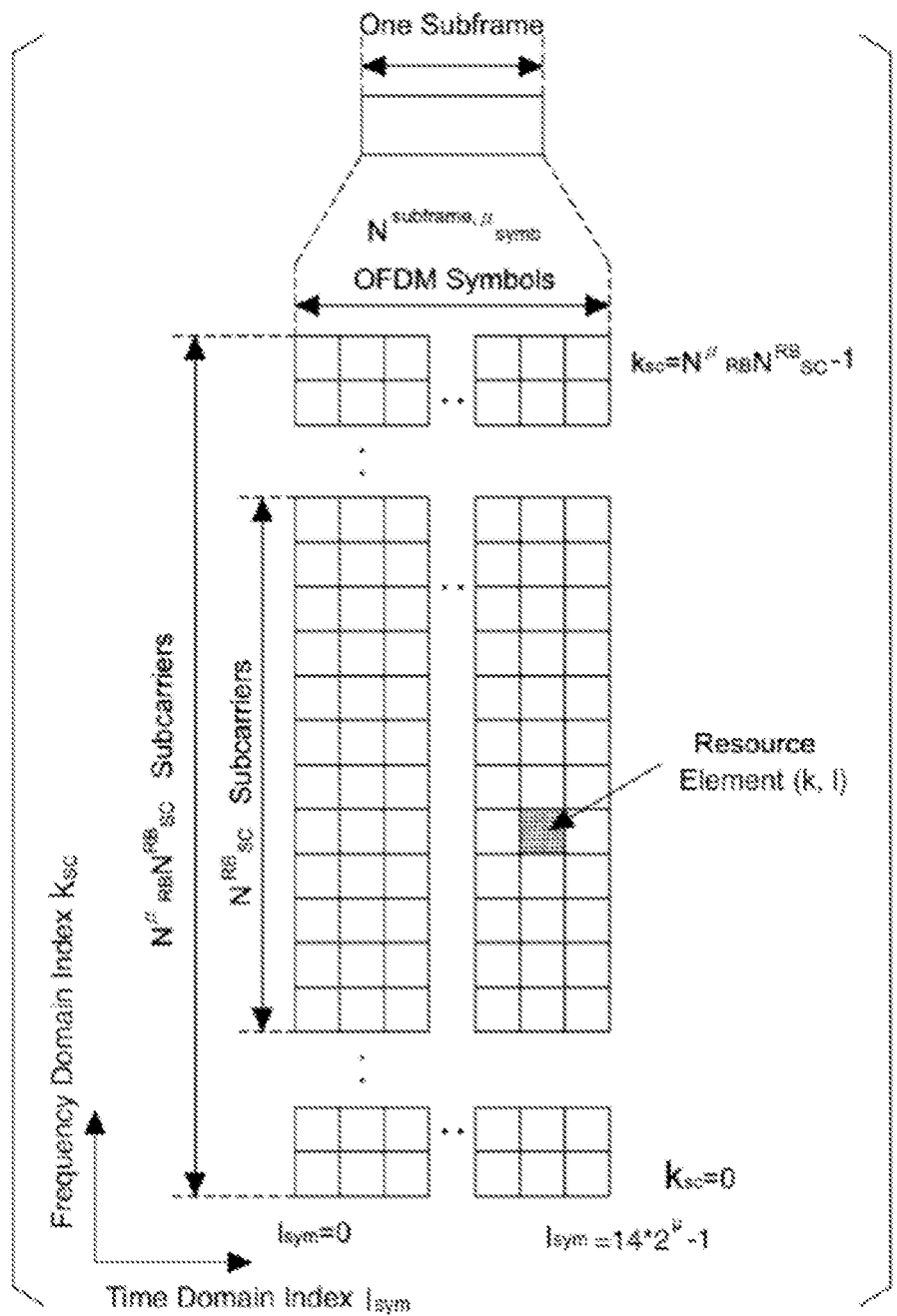
FIG. 3 is a schematic diagram showing an example of a resource grid in a subframe according to one aspect of the present embodiment.

FIG. 3 is a schematic diagram showing an example of a resource grid in a subframe according to one aspect of the present embodiment. In the resource grid of FIG. 3, a horizontal axis is a time domain index $l_{sym}$, and a vertical axis is a frequency domain index $k_{sc}$. In one subframe, the frequency domain of the resource grid includes $N^\mu_{RB}N^{RB}_{sc}$ subcarriers. In one subframe, the time domain of the resource grid may include $14 \cdot 2^\mu$ OFDM symbols. One resource block includes $N^{RB}_{sc}$ subcarriers. The time domain of the resource block may correspond to one OFDM symbol. The time domain of the resource block may also correspond to fourteen OFDM symbols. The time domain of the resource block may correspond to one or more slots. The time domain of the resource block may also correspond to one subframe.

The terminal apparatus 1 may be indicated to perform transmission and/or reception using only a subset of the resource grid. The subset of a resource grid is also referred to as a BWP and may be given based on at least some or all of higher layer parameters and/or DCI. The BWP is also referred to as a carrier bandwidth part. The BWP is also referred to as a BandWidth Part. The terminal apparatus 1 may not be indicated to perform transmission and/or reception using all sets of the resource grids. The terminal apparatus 1 may be indicated to perform transmission and/or reception using some frequency resources within the resource grid. One BWP may include a plurality of resource blocks in the frequency domain. One BWP may include a plurality of consecutive resource blocks in the frequency domain. The BWP configured for a downlink carrier is also referred to as a downlink MVP. The BWP configured for an uplink carrier is also referred to as an uplink BWP. The BWP may also be a subset of a carrier frequency band.

One or more downlink BWPs may be configured for each of serving cells. One or more uplink BWPs may be configured for each of serving cells.

One downlink BWP of the one or more downlink BWPs configured for a serving cell may be configured (or activated) as an active downlink BWP. A downlink BWP switch is used to deactivate one active downlink BWP and activate an inactive downlink BWP other than the one active downlink BWP. The downlink BWP switch may be controlled by a BWP field included in downlink control information. The downlink BWP switch may also be controlled based on a higher layer parameter.

A DL-SCH (Downlink-Shared CHannel) may be received in an active downlink BWP. PDCCH may be monitored on an active downlink BWP. A PDSCH may be received in an active downlink BWP. Some or all of a PDSCH, a PDCCH, and a CSI-RS may not be received outside of an active downlink BWP.

DL-SCH may not be received in an inactive downlink BWP. A PDCCH may not be monitored on an inactive downlink BWP. A CSI-RS (Channel State Information Reference Signal) for an inactive downlink BWP may not be reported.

Two or more downlink BWPs of the one or more downlink BWPs configured for a serving cell may not be configured as active downlink BWPs. At a certain time, one downlink BWP is active.

One uplink BWP of the one or more uplink BWPs configured for a serving cell may be configured (or activated) as an active uplink BWP. An uplink BWP switch is used to deactivate one active uplink BWP and activate an inactive uplink BWP other than the one active uplink BWP. The uplink BWP switch may be controlled by a BWP field included in downlink control information. The uplink BWP switch may also be controlled based on a higher layer parameter.

An UL-SCH (Uplink-Shared CHannel) may be transmitted in an active uplink BWP. A PUCCH may be transmitted in an active uplink BWP. A PRACH (Physical Random Access CHannel) may be transmitted in an active uplink BWP. An SRS (Sounding Reference Signal) may be transmitted in an active uplink MVP. Some or all of a PUSCH and a PUCCH may not be transmitted outside of an active uplink BWP.

An UL-SCH (Uplink-Shared. CHannel) is not transmitted in an inactive uplink BWP. A PUCCH is not transmitted in an in active uplink BWP. A PRACH is not transmitted in an inactive uplink BWP. An SRS is not transmitted in an inactive uplink MVP.

Two or more uplink BWPs of the one or more uplink BWPs configured for a serving cell may not be configured as active uplink BWPs. At a certain time, one uplink BWP may be active.

The higher layer parameter is a parameter included in a higher layer signal. The higher layer signal may be RRC (Radio Resource Control) signaling or MAC CE (Medium Access Control Control Element). Here, the higher layer signal may be an RRC layer signal or may be a MAC layer signal.

The higher layer signal may be common RRC signaling. The common RRC signaling may include at least some or all of the following features C1 to C3.

Feature C1) being mapped to a BCCH (Broadcast Control Channel) logical channel or a CCCH logical channel
Feature C2) including at least a ReconfigurationWithSync information element
Feature C3) being mapped to a PBCH (Physical Broadcast Channel) and/or system information.

The ReconfigrationWithSync information element may include information indicating a configuration commonly used in the serving cell. The configuration commonly used in the serving cell may include at least a PRACH configuration. The PRACH configuration may indicate at least one or more random access preamble indexes. The PRACH configuration may indicate at least a PRACH time/frequency resource.

The common RRC signaling may include at least a common RRC parameter. The common RRC parameter may also be a cell-specific parameter that is commonly used in the serving cell.

The higher layer signal may be dedicated RRC signaling. The dedicated RRC signaling may include at least some or all of the following features D1 to D2.

Feature D1) being mapped to a DCCH (Dedicated Control CHannel) logical channel
Feature D2) not including at least a ReconfigrationWithSync information element.

For example, an MIB (Master Information Block) and an SIB (System Information Block) may be common RRC signaling. In addition, a higher layer message that is mapped to the DCCH logical channel and includes at least the ReconfigurationWithSync information element may be common RRC signaling. In addition, a higher layer message that is mapped to the DCCH logical channel and does not include the ReconfigurationWithSync information element may be included in the dedicated RRC signaling.

The SIB may at least indicate a time index of an SS (Synchronization Signal) block. The SS block is also referred to as an SS/PBCH block. The SIB may include at least information related to a PRACH resource. The SIB may include at least information related to an initial connection configuration.

The ReconfigurationWithSync information element may include at least information related to a PRACH resource (or a RACH resource). The ReconfigurationWithSync information element may include at least information related to a random access configuration.

The dedicated RRC signaling may include at least a dedicated RRC parameter. The dedicated RRC parameter may be a UE-specific parameter dedicated to the terminal apparatus 1.

The common RRC parameter and the dedicated RRC parameter are referred to as higher layer parameters.

A physical channel and a physical signal according to various aspects of the present embodiment will be described below.

One physical channel may be mapped to one serving cell. One physical channel may be mapped to one carrier band part configured for one carrier included one a serving cell.

An uplink physical channel may correspond to a set of resource elements that transmit information generated in a higher layer. The uplink physical channel may be a physical channel used in an uplink carrier. In a wireless communication system according to one aspect of the present embodiment, at least some or all of the following uplink physical channels may be used.

PUCCH (Physical Uplink Control Channel)
PUSCH (Physical Uplink Shared CHannel)
PRACH (Physical Random Access CHannel)

The PUCCH may be used to transmit uplink control information (UCI). The uplink control information includes some or all of Channel State Information (CSI), a Scheduling Request (SR), and a Hybrid Automatic Repeat request ACKnowledgement (HARQ-ACK) information.

The uplink control information may be multiplexed on the PUCCH. The multiplexed PUCCH may be transmitted.

The uplink control information may be mapped to the PUCCH.

The HARQ-ACK information may include at least a HARQ-ACK bit corresponding to a transport block (Transport Block (TB), Medium Access Control Protocol Data Unit (MAC PDU), Downlink-Shared Channel (DL-SCH), Uplink-Shared Channel (UL-SCH), or Physical Downlink Shared Channel (PDSCH)). The HARQ-ACK bit may indicate an ACK (acknowledgement) or a NACK (negative-acknowledgement) corresponding to the transport block. The ACK may be a value indicating that decoding of the transport block is successfully completed. The NACK may be a value indicating that decoding of the transport block is not successfully completed. The HARQ-ACK information may correspond to a HARQ-ACK codebook that includes one or more HARQ-ACK bits. The expression that the HARQ-ACK bit corresponds to one or more transport blocks may mean that the HARQ-ACK bit corresponds to a PDSCH including the one or more transport blocks.

The HARQ-ACK bit may indicate an ACK or a NACK corresponding to one CBG (Code Block Group) included in the transport block. The HARQ-ACK information is also referred to as a HARQ-ACK, a HARQ feedback, HARQ information, HARQ control information, and a HARQ-ACK message.

A scheduling request (SR) may be at least used to request a PUSCH (or UL-SCH) resource for initial transmission (or new transmission). A scheduling request bit may be used to indicate either a positive SR or a negative SR. The expression that the scheduling request bit indicates a positive SR is also referred to as "transmitting a positive SR". The positive SR may indicate that a PUTSCH resource for initial transmission is requested by the terminal apparatus 1. The positive SR may indicate that a scheduling request is triggered by a higher layer. The positive SR may be transmitted in a case that a scheduling request is instructed by a higher layer to be transmitted. The expression that the scheduling request bit indicates a negative SR is also referred to as "transmitting a negative SR". The negative SR may indicate that a PUSCH resource for initial transmission is not requested by the terminal apparatus 1. The negative SR may indicate that a scheduling request is not triggered by a higher layer. The negative SR may be transmitted in a case that a scheduling request is not instructed by a higher layer to be transmitted.

The scheduling request bit may be used to indicate either a positive SR or a negative SR for any one or more SR configurations. Each of the one or more SR configurations may correspond to one or more logical channels, respectively. A positive SR for a certain SR configuration may be a positive SR for any or all of the one or more logical channels corresponding to the certain SR configuration. A negative SR may not correspond to a specific SR configuration. Indicating a negative SR may mean indicating a negative SR for all SR configurations.

The SR configuration may be a scheduling request ID. The scheduling request ID may be given by a higher layer parameter.

The channel state information may include at least some or all of a Channel Quality Indicator (CQI), a Precoder Matrix Indicator (PMI), and a Rank Indicator (RI). The CQI is an indicator related to channel quality (for example, propagation strength), and the PMI is an indicator related to a precoder. The RI is an indicator related to a transmission rank (or the number of transmission layers).

The channel state information may be given at least based on receiving a physical signal (e.g., CSI-RS) that is at least used for channel measurement. The channel state information may include a value selected by the terminal apparatus 1. The channel state information may be selected by the terminal apparatus 1 at least based on receiving a physical signal that is at least used for channel measurement. The channel measurement includes interference measurement.

A channel state information report is a report of the channel state information. The channel state information report may include a CSI part 1 and/or a CSI part 2. The CSI part 1 may be configured to include at least some or all of wideband channel quality information (wideband CQI), a wideband precoder matrix indicator (wideband PMI), and a rank indicator. The number of bits of the CSI part 1 multiplexed on the PUCCH may be a predetermined value regardless of a value of the rank indicator of the channel state information report. The number of bits of the CSI part 2 multiplexed on the PUCCH may be given at least based on the value of the rank indicator of the channel state information report. The rank indicator of the channel state information report may be a value of the rank indicator used to calculate the channel state information report. The rank indicator of the channel state information may be a value indicated by a rank indicator field included in the channel state information report.

A set of rank indicators permitted in the channel state information report may be some or all of 1 to 8. The set of rank indicators permitted in the channel state information report may be given at least based on a higher layer parameter RankRestriction. In a case that the set of rank indicators permitted in the channel state information report includes only one value, the rank indicator of the channel state information report may be the one value.

A priority may be configured for the channel state information report. The priority of the channel state information report may be given at least based on some or all of a configuration related to a time domain behavior of the channel state information report, a type of content of the channel state information report, an index of the channel state information report, and/or an index of a serving cell configured with measurement of the channel state information report.

The configuration related to the time domain behavior of the channel state information report may be a configuration indicating whether the channel state information report is performed aperiodically, semi-persistently, or semi-statically.

The type of content of the channel state information report may indicate whether the channel state information report includes a Reference Signals Received Power (MRP) of a layer 1.

The index of the channel state information report may be given by a higher layer parameter.

The PUCCH supports PUCCH formats (PUCCH format 0 to PUCCH format 4). The PUCCH format may be transmitted on the PUCCH. The expression that a PUCCH format is transmitted may mean that a PUCCH is transmitted.

FIG. 4 is a schematic diagram showing an example of a relationship between a PUCCH format and the length $N^{PUCCH}_{symb}$ of the PUCCH format according to one aspect of the present embodiment. The length $N^{PUCCH}_{symb}$ of PUCCH format 0 is 1 or 2 OFDM symbols. The length $N^{PUCCH}_{symb}$ of PUCCH format 1 is any of 4 to 14 OFDM symbols. The length $N^{PUCCH}_{symb}$ of PUCCH format 2 is 1 or 2 OFDM symbols. The length $N^{PUCCH}_{symb}$ of PUCCH format 3 is any of 4 to 14 OFDM symbols. The length $N^{PUCCH}_{symb}$ of PUCCH format 4 is any of 4 to 14 OFDM symbols.

The PUSCH is at least used to transmit the transport block. The PUSCH may be used to transmit at least some or all of the transport block, the HARQ-ACK information, the channel state information, and the scheduling request. The PUSCH is at least used to transmit a random access message 3.

The UL-SCH may be mapped to the PUSCH. The uplink control information may be mapped to the PUSCH.

The PRACH may be at least used to transmit a random access preamble (message 1). The PRACH may be at least used to indicate some or all of an initial connection establishment procedure, a handover procedure, a connection re-establishment procedure, synchronization (timing adjustment) for PUSCH transmission, and a request for the PUSCH (or UL-SCH) resource. The random access preamble may be used to notify the base station apparatus 3 of an index (random access preamble index) given by a higher layer of the terminal apparatus 1.

The random access preamble may be given by cyclic-shifting a Zadoff-Chu sequence corresponding to a physical root sequence index u. The Zadoff-Chu sequence may be generated based on the physical root sequence index u. In one serving cell, multiple random access preambles may be defined. A random access preamble may be identified at least based on an index of the random access preamble. A different random access preamble corresponding to a different index of the random access preamble may correspond to a different combination of the physical root sequence index u and the cyclic shift. The physical root sequence index u and the cyclic shift may be given at least based on information included in system information. The physical root sequence index u may be an index for identifying a sequence included in the random access preamble. The random access preamble may be identified at least based on the physical root sequence index u.

An uplink physical signal may correspond to a set of resource elements. The uplink physical signal may not transmit information generated in a higher layer. The uplink physical signal may be a physical signal used in an uplink carrier. In a wireless communication system according to one aspect of the present embodiment, at least some or all of the following uplink physical signals may be used.

UL DMRS (UpLink Demodulation Reference Signal)
SRS (Sounding Reference Signal)
UL PTRS (Uplink Phase Tracking Reference Signal)

The UL DMRS is associated with transmission of a PUSCH and/or a PUCCH. The UL DMRS is multiplexed with the PUSCH or the PUCCH. The base station apparatus 3 may use the UL DMRS to perform propagation path compensation of the PUSCH or the PUCCH. Hereinafter, transmission of both a PUSCH and a UL DMRS associated with the PUSCH will be referred to simply as transmission of a PUSCH. Hereinafter, transmission of both a PUCCH and a UL DMRS associated with the PUCCH will be referred to simply as transmission of a PUCCH. The UL DMRS associated with the PUSCH is also referred to as a UL DMRS for a PUSCH. The UL DMRS associated with the PUCCH is also referred to as a UL DMRS for a PUCCH.

The association between the UL DMRS and the PUSCH may mean that the UL DMRS and the PUSCH are transmitted on the same antenna port. The association between the UL DMRS and the PUSCH may mean that the precoder of the UL DMRS is the same as the precoder of the PUSCH.

The SRS may be transmitted at the end of a subframe in an uplink slot or in a predetermined number of OFDM symbols from the end.

The UL PTRS may be a reference signal that is at least used for phase tracking.

A downlink physical channel may correspond to a set of resource elements that transmit information generated in a higher layer. The downlink physical channel may be a physical channel used in a downlink carrier. In a wireless communication system according to one aspect of the present embodiment, at least some or all of the following downlink physical channels may be used.

PBCH (Physical Broadcast Channel)
PDCCH (Physical Downlink Control Channel)
PDSCH (Physical Downlink Shared Channel)

The PBCH is at least used to transmit an MIB and/or a PBCH payload. The PBCH payload may at least include information indicating an index related to transmission timing of an SS block. The PBCH payload may include information associated with an identifier (index) of the SS block. The PBCH may be transmitted based on a predetermined transmission interval. The PBCH may be transmitted at an interval of 80 ms. The PBCH may be transmitted at an interval of 160 ms. The content of information included in the PBCH may be updated every 80 ms. Some or all of the contents of information included in the PBCH may be updated every 160 ms. The PBCH may include 288 subcarriers. The PBCH may include 2, 3, or 4 OFDM symbols. The MIB may include information related to an identifier (index) of the SS block. The MIB may include information indicating at least some of a slot number, a subframe number, and/or a radio frame number in which the PBCH is transmitted.

A Broadcast CHannel (BCH) may be mapped to the PBCH.

The PDSCH may be at least used to transmit downlink control information (DCI). The PDCCH may be transmitted with at least Downlink Control Information (DCI) included therein. The downlink control information is also referred to as a DCI format. The downlink control information may at least indicate either a downlink assignment or an uplink grant. The DCI format used for PDSCH scheduling is also referred to as a downlink DCI format. The DCI format used for PDSCH scheduling is also referred to as an uplink DCI format. The uplink DCI format at least includes one or both of DCI format 0_0 and DCI format 0_1. The terminal apparatus 1 may monitor a set of PDCCH candidates in one or more control resource sets (CORESETs).

The downlink control information may be mapped to the PDCCH.

The DCC format 0_0 at least includes some or all of 1A to 1E.

1A) DCI format identification field (Identifier for DCI formats field)
1B) Frequency domain resource assignment field
1C) Uplink time domain resource assignment field.
1D) Frequency hopping flag field
1E) MCS (Modulation and Coding Scheme) field The DCI format identification field may indicate whether a DCI format including the DCI format identification field is an uplink DCI format or a downlink DCI format. The DCI format identification field included in the DCI format 0_0 may indicate 0 (or may indicate an uplink DCI format).

The frequency domain resource assignment field may be at least used to indicate the assignment of frequency resources for the PUSCH (or PDSCH).

The uplink time domain resource assignment field may be at least used to indicate the assignment of time resources for the PUSCH (or PDSCH).

The frequency hopping flag field may be at least used to indicate whether frequency hopping is applied to the PUSCH.

The MCS field may be at least used to indicate some or all of a modulation scheme and/or a target coding rate for the PUSCH (or PDSCH). The target coding rate may be a target coding rate for the transport block of the PUTSCH. A transport block size (TBS) may be given at least based on the target coding rate.

The DCI format 0_0 may not include a field used for a CSI request.

The DCI format 0_1 includes at least some or all of 2A to 2H.

2A) DCI format identification field
2B) Frequency domain resource assignment field
2C) Uplink time domain resource assignment field
2D) Frequency hopping flag field
2E) MCS field
2F) CSI request field (Second CSI request field)
2G) BWP field
2H) UL DAI (Downlink Assignment Indicator) field The DCI format identification field included in the DCI format 0_1 may indicate 0.

The BWP field may be used to indicate an uplink BWP to which the PUSCH is mapped. The BWP field may be used to indicate a downlink BWP to which the PDSCH is mapped.

The CSI request field is at least used to indicate a CSI report. A size of the second CSI request field may be given at least based on a higher layer parameter ReportTrigger-Size.

The UL DAI field may be at least used to generate a codebook of HARQ-ACK information. V UL DAI may be given at least based on a value of the UL DAI field. The V UL DAI is also referred to as a UL DAI.

The downlink DCI format at least includes one or both of DCI format 1_0 and DCI format 1_1.

The DCI format 1_0 includes at least some or all of 3A to 3I.

3A) DCI format identification field (Identifier for DCI formats field)
3B) Frequency domain resource assignment field
3C) Downlink time domain resource assignment field
3D) Frequency hopping flag field
3E) MCS field (Modulation and Coding Scheme field)
3F) First CSI request field
3G) PDSCH-to-HARQ feedback timing indicator field
3H) PUCCH resource indicator field
3I) Counter DAI field (Counter Downlink Assignment Indicator field)

The DCI format identification field included in the DCI format 1_0 may indicate 1 (or may indicate a downlink DCI format).

The downlink time domain resource assignment field may be used to indicate at least some or all of a timing K0, a DMRS mapping type, an OFDM symbol to which the PDSCH is mapped. When the index of a slot including the PDCCH is slot n, the index of a slot including the PDSCH may be n+K0.

The PDSCH-to-HARQ feedback timing indicator field may be a field indicating a timing K1. In a case that the index of a slot including the last OFDM symbol of the PDSCH is a slot n, the index of a slot including the PUCCH or PUSCH including at least the HARQ-ACK corresponding to a transport block included in the PDSCH may be n+K1. In a case that the index of the slot including the last OFDM symbol of the PDSCH is a slot n, an index of a slot including a first OFDM symbol of the PUCCH or a first OFDM symbol of the PUSCH including at least the HARQ-ACK corresponding to a transport block included in the PDSCH may be n+K1.

The PUCCH resource indicator field may be a field indicating an index of either one or a plurality of PUCCH resources included in a PUCCH resource set.

The counter DAI field may be at least used to generate a codebook of HARQ-ACK information. $V^{DL}_{C\text{-}DAI,\,c,\,m}$ may be given at least based on a value of the counter DAI field. The $V^{DL}_{C\_DAI,\,c,\,m}$ is also referred to as a counter DAI.

The DCI format 1_1 includes at least some or all of 4A to 4I.

4A) DCI format identification field (Identifier for DCI formats field)
4B) Frequency domain resource assignment field
4C) Downlink time domain resource assignment field
4D) Frequency hopping flag field
4E) MCS field (Modulation and Coding Scheme field)
4F) PDSCH-to-HARQ feedback timing indicator field
4G) PUCCH resource indicator field
4H) BWP field
4I) DAI field (Downlink Assignment Indicator field)

The DCI format identification field included in the DCI format 1_1 may indicate 1 (or may indicate a downlink DCI format).

The DAI field may be at least used to generate a codebook of HARQ-ACK information. $V^{DL}_{T\text{-}DAL,\,m}$ may be given at least based on a value of the DAI field. The $V^{DL}_{C\text{-}DAI,\,c,\,m}$ may be given at least based on a value of the DAI field. The $V^{DL}_{T\text{-}DAI,m}$ is also referred to as a total DAI.

DCI format 2_0 may be at least used to indicate a slot format. The slot format may be information indicating a transmission direction (downlink, uplink, or XXX) for each of OFDM symbols constituting a slot. XXX may not indicate the transmission direction.

The control resource set may indicate a time domain and/or a frequency domain to which one or more PDCCHs are mapped. The control resource set may be a domain in which the terminal apparatus 1 monitors the PDCCH. The control resource set may include consecutive resources (or localized resources). The control resource set may include non-consecutive resources (or distributed resources).

Some or all of the index of the control resource set, the number of OFDM symbols of the control resource set, and the set of resource blocks of the control resource set may be given for each control resource set.

The index of the control resource set may be at least used to identify the control resource set.

The number of OFDM symbols of the control resource set may indicate the number of OFDM symbols to which the control resource set is mapped.

The set of resource blocks of the control resource set may indicate a set of resource blocks to which the control resource set is mapped. The set of resource blocks of the control resource set may be given by a bitmap included in a higher layer parameter. The bits included in the bitmap may correspond to six consecutive resource blocks.

A set of PDCCH candidates monitored by the terminal apparatus 1 may be defined in terms of a search space set. In other words, the set of PDCCH candidates monitored by the terminal apparatus 1 may be given by the search space set.

A search space may include one or more PDCCH candidates at a certain aggregation level. The aggregation level of the PDCCH candidate may indicate the number of CCEs that constitute the PDCCH.

The search space set may include at least one or more search spaces. The search space set may include one or more PDCCH candidates corresponding to each of one or more aggregation levels. The search space set may be any one of a type 0 PDCCH common search space set, a type 0a PDCCH common search space set, a type 1 PDCCH common search space set, a type 2 PDCCH common search space set, a type 3 PDCCH common search space set, and/or a UE-specific PDCCH search space set.

The type 0 PDCCH common search space set, the type 0a PDCCH common search space set, the type 1 PDCCH common search space set, the type 2 PDCCH common search space set, and the type 3 PDCCH common search space set are also referred to as a CSS set (Common Search Space set). The UE-specific PDCCH search space set is also referred to as a USS set (UE specific Search Space set).

Each of search space sets may be associated with a control resource set. Each of search space sets may be at least included in a control resource set. An index of the control resource set associated with a search space set may be given for each of the search space sets.

A monitoring periodicity of the search space set may be configured for each of the search space sets. The monitoring periodicity of the search space set may at least indicate an interval of slots in which the search space set is monitored by the terminal apparatus 1. A higher layer parameter indicating at least the monitoring periodicity of the search space set may be given for each search space set.

A monitoring offset of the search space set may be configured for each of the search space sets. The monitoring offset of the search space set may at least indicate an offset of an index of the slot, in which the search space set is monitored by the terminal apparatus 1, from a reference index (e.g., slot #0). A higher layer parameter indicating at least the monitoring offset of the search space set may be given for each search space set.

A monitoring pattern of the search space set may be configured for each of the search space sets. The monitoring pattern of the search space set may indicate a first OFDM symbol for the search space set in which the monitoring is performed. The monitoring pattern of the search space set may be given by a bitmap indicating the first OFDM symbol in one or more slots. A higher layer parameter indicating at least the monitoring pattern of the search space set may be given for each search space set.

A monitoring occasion for the search space set may be given at least based on some or all of the monitoring periodicity of the search space set, the monitoring offset of the search space set, the monitoring pattern of the search space set, and/or a DRX configuration.

Figure 5:
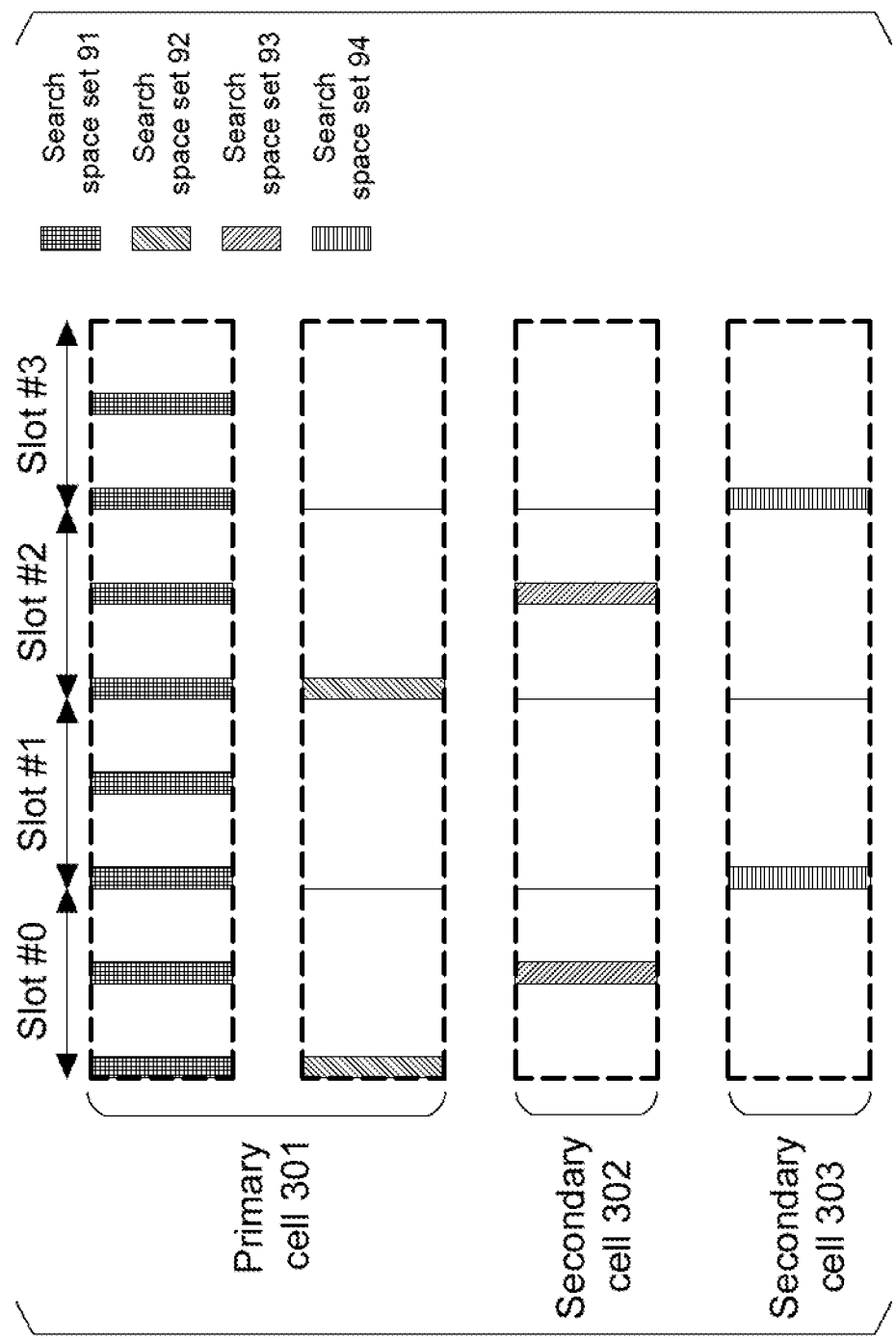
FIG. 5 is a diagram showing an example of a monitoring occasion for a search space set according to one aspect of the present embodiment.

FIG. 5 is a diagram showing an example of a monitoring occasion for a search space set according to one aspect of the present embodiment. In FIG. 5, search space set 91 and search space set 92 are configured in a primary cell 301, search space set 93 are configured in a secondary cell 302, and search space set 94 are configured in a secondary cell 303.

In FIG. 5, blocks indicated by grid lines indicate the search space set 91, blocks indicated by upper-right diagonal lines indicate the search space set 92, blocks indicated by upper-left diagonal lines indicate the search space set 93, and blocks indicated by horizontal lines indicate the search space set 94.

The monitoring periodicity of the search space set 91 is set to one slot, the monitoring offset of the search space set 91 is set to zero slots, and the monitoring pattern of the search space set 91 is set to [1,0,0,0,0,0,0,1,0,0,0,0,0,0]. In other words, the monitoring occasions for the search space set 91 are the first OFDM symbol (OFDM symbol #0) and the eighth OFDM symbol (OFDM symbol #7) in each of the slots.

The monitoring periodicity of the search space set 92 is set to two slots, the monitoring offset of the search space set 92 is set to zero slots, and the monitoring pattern of the search space set 92 is set to [1,0,0,0,0,0,0,0,0,0,0,0,0,0]. In other words, the monitoring occasion for the search space set 92 is the first OFDM symbol (OFDM symbol #0) in each even-numbered slot.

The monitoring periodicity of the search space set 93 is set to two slots, the monitoring offset of the search space set 93 is set to zero slots, and the monitoring pattern of the search space set 93 is set to [0,0,0,0,0,0,0,1,0,0,0,0,0,0]. In other words, the monitoring occasion for the search space set 93 is the eighth OFDM symbol (OFDM symbol #7) in each even-numbered slot.

The monitoring periodicity of the search space set 94 is set to two slots, the monitoring offset of the search space set 94 is set to one slot, and the monitoring pattern of the search space set 94 is set to [1,0,0,0,0,0,0,0,0,0,0,0,0,0]. In other words, the monitoring occasion for the search space set 94 is the first OFDM symbol (OFDM symbol #0) in each odd-numbered slot.

The type 0 PDCCH common search space set may be at least used for the DCI format with a CRC (Cyclic Redundancy Check) sequence scrambled by an SI-RNTI (System Information-Radio Network Temporary Identifier). The configuration of the type 0 PDCCH common search space set may be given at least based on four bits of the LSBs (Last Significant Bits) of a higher layer parameter PDCCH-ConfigSIB1. The higher layer parameter PDCCH-ConfigSIB1 may be included in an MIB. The configuration of the type 0 PDCCH common search space set may be given at least based on a higher layer parameter SearchSpaceZero. The interpretation of bits of the higher layer parameter SearchSpaceZero may be the same as the interpretation of four bits of the LSBs of the higher layer parameter PDCCH-ConfigSIB1. The configuration of the type 0 PDCCH common search space set may be given at least based on a higher layer parameter SearchSpaceSIB1. The higher layer parameter SearchSpaceSIB1 may be included in a higher layer parameter PDCCH-ConfigCommon. The PDCCH detected in the type 0 PDCCH common search space set may be at least used for scheduling a PDSCH transmitted with an SIB1 included. The SIB1 is a type of SIB. The SIB1 may include scheduling information for an SIB other than the SIB1. The terminal apparatus 1 may receive the higher layer parameter PDCCH-ConfigCommon in the EUTRA. The terminal apparatus 1 may receive the higher layer parameter PDCCH-ConfigCommon in the MCG.

The type 0a PDCCH common search space set may be at least used for the DCI format with a CRC (Cyclic Redundancy Check) sequence scrambled by a SI-RNTI (System Information-Radio Network Temporary Identifier). The configuration of the type 0a PDCCH common search space set may be given at least based on a higher layer parameter SearchSpaceOtherSystemInformation. The higher layer parameter SearchSpaceOtherSystemInformation may be included in the SIB1. The higher layer parameter SearchSpaceOtherSystemInformation may be included in the higher layer parameter PDCCH-ConfigCommon. The PDCCH detected in the type 0 PDCCH common search space set may be at least used for scheduling a PDSCH transmitted with an SIB included other than the SIB1.

The type 1 PDCCH common search space set may be at least used for the DCI format with a CRC sequence scrambled by an RA-RNTI (Random Access-Radio Network Temporary Identifier) and/or with a CRC sequence scrambled by a TC-RNTI (Temporary Common-Radio Network Temporary Identifier). The RA-RNTI may be given at least based on the time/frequency resource of a random access preamble transmitted by the terminal apparatus 1. The TC-RNTI may be given by a PDSCH that is scheduled in the DCI format with a CRC sequence scrambled by the RA-RNTI (also referred to as a message 2 or a random access response). The configuration of the type 1 PDCCH common search space set may be given at least based on a higher layer parameter ra-SearchSpace. The higher layer parameter ra-SearchSpace may be included in the SIB1. The higher layer parameter ra-SearchSpace may be included in the higher layer parameter PDCCH-ConfigCommon.

The type 2 PDCCH common search space set may be at least used for the DCI format with a CRC sequence scrambled by a P-RNTI (Paging-Radio Network Temporary Identifier). The P-RNTI may be at least used for the transmission of the DCI format including information notifying the change of an SIB. The configuration of the type 2 PDCCH common search space set may be given at least based on a higher layer parameter PagingSearchSpace. The higher layer parameter PagingSearchSpace may be included in the SIB1. The higher layer parameter PagingSearchSpace may be included in the higher layer parameter PDCCH-ConfigCommon.

The type 3 PDCCH common search space set may be at least used for the DCI format with a CRC sequence scrambled by a C-RNTI (Cell-Radio Network Temporary Identifier). The C-RNTI may be given at least based on a PDSCH that is scheduled in the DCT format with the CRC sequence scrambled by the TC-RNTI (also referred to as a message 4 or a contention resolution). The type 3 PDCCH common search space set may be a search space set given in a case that a higher layer parameter SearchSpaceType is set as common, The UE-specific PDCCH search space set may be at least used for the DCI format with a CRC sequence scrambled by a C-RNTI.

When a C-RNTI is given to the terminal apparatus 1, the type 0 PDCCH common search space set, the type 0a PDCCH common search space set, the type 1 PDCCH common search space set, and/or the type 2 PDCCH common search space set may be at least used for the DCI format with a CRC sequence scrambled by the C-RINTI.

When a C-RNTI is given to the terminal apparatus 1, a search space set given at least based on any one of the higher layer parameter PDCCH-ConfigSIB, the higher layer parameter SearchSpaceZero, the higher layer parameter SearchSpaceSIB1, the higher layer parameter SearchSpaceOtherSystemInformation, the higher layer parameter ra-SearchSpace or the higher layer parameter PagingSearchSpace may be at least used for the DCI format with a CRC sequence scrambled with the C RNTI.

The common control resource set may include at least one or both of the CSS and the USS. The dedicated control resource set may include at least one or both of the CSS and the USS.

A physical resource of the search space set includes a control channel element (CCE). The CCE includes six resource element groups (REGs). The REG may include one OFDM symbol in one physical resource block (PRB). In other words, the REG may include 12 resource elements (REs). The PRB is also simply referred to as a resource block (RB).

The PDSCH is at least used to transmit a transport block. The PDSCH may be at least used to transmit a random access message 2 (Random Access Response). The PDSCH may be at least used to transmit system information including a parameter used for an initial access.

The DL-SCH may be mapped to the PDSCH.

A downlink physical signal may correspond to a set of resource elements. The downlink physical signal may not transmit information generated in a higher layer. The downlink physical signal may be a physical signal used in a downlink carrier. In a wireless communication system according to one aspect of the present embodiment, at least some or all of the following downlink physical signals may be used.

SS (Synchronization signal)
DL DMRS (Downlink DeModulation Reference Signal)
CSI-RS (Channel State information Reference Signal)
DL PTRS (DownLink Phase Tracking Reference Signal)
TRS (Tracking Reference Signal)

The synchronization signal is used for the terminal apparatus 1 to establish synchronization m a frequency domain and/or a time domain in the downlink. The synchronization signal includes a PSS (Primary Synchronization Signal) and an SSS (Secondary Synchronization Signal).

An SS block (SS/PBCH block) includes at least some or all of the PSS, the SSS, and the PBCH. Respective antenna ports of some or all of the PSS, the SSS, and the PBCH included in the SS block may be the same. Some or all of the PSS, the SSS, and the PBCH included in the SS block may be mapped to consecutive OFDM symbols. Respective CP configurations of some or all of the PSS, the SSS, and the PBCH included in the SS block may be the same. Respective subcarrier spacing configurations μ of some or all of the PSS, the SSS, and the PBCH included in the SS block may be the same.

The DL DMRS is associated with transmission of the PBCH, the PDCCH and/or the PDSCH. The DL DMRS is multiplexed with the PBCH, the PDCCH and/or the PDSCH. The terminal apparatuses 1 may use the DL DMRS corresponding to the PBCH, the PDCCH, or the PDSCH to perform propagation path compensation of the PBCH, the PDCCH or the PDSCH. Hereinafter, transmission of both of a PBCH and a DL DMRS associated with the PBCH is referred to as transmission of a PBCH. In addition, transmission of both of a PDCCH and a DL DMRS associated with the PDCCH is simply referred to as transmission of a PDCCH. Transmission of both of a PDSCH and a DL DMRS associated with the PDSCH is simply referred to as transmission of a PDSCH. The DL MORS associated with the PBCH is also referred to as a DL DMRS for the PBCH. The DL DMRS associated with the PDSCH is also referred to as a DL DMRS for the PDSCH. The DL DMRS associated with the PDCCH is also referred to as a DL DMRS associated with the PDCCH.

The DL MORS may be a reference signal individually configured for the terminal apparatus 1. The sequence of the DL DMRS may be given at least based on a parameter individually configured for the terminal apparatus 1. The sequence of the DL DMRS may be given at least based on a UE specific value (e.g., C-RNTI, or the like). The DL DMRS may be individually transmitted for the PDCCH and/or the PDSCH.

The CSI-RS may be a signal that is at least used to calculate channel state information. A pattern of the CSI-RS assumed by the terminal apparatus may be given at least by a higher layer parameter.

The PTRS may be a signal that is at least used to compensate for phase noise. A pattern of the PTRS assumed by the terminal apparatus may be given at least based on a higher layer parameter and/or DCI.

The DL PTRS may be associated with a DL DMRS group that includes at least an antenna port used for one or more DL DMRSs. The association of the DL PTRS with the DL DMRS group may mean that the antenna port for the DL PTRS and some or all of the antenna ports included in the DL DMRS group are at least QCL. The DL DMRS group may be identified at least based on the antenna port with the smallest index for the DL DMRS included in the DL DMRS group.

The TRS may be a signal to be at least used for time and/or frequency synchronization. A pattern of the TRS assumed by the terminal apparatus may be given at least based on a higher layer parameter and/or DCI.

The downlink physical channels and the downlink physical signals are also referred to downlink signals. The uplink physical channels and the uplink physical signals are also referred to uplink signals. The downlink signals and the uplink signals are collectively referred to as physical signals. The downlink signals and the uplink signals are collectively referred to as signals. The downlink physical channels and the uplink physical channels are collectively referred to as physical channels. The downlink physical signals and the uplink physical signals are collectively referred to as physical signals.

The SS/PBCH block will be described.

The SS/PBCH block may include at least some or all of the PSS, the SSS, and the PBCH. The SS/PBCH block may include four consecutive OFDM symbols. In the time domain, the PSS may be mapped to the first OFDM symbol of the SS/PBCH block. In the time domain, the SSS may be mapped to the third OFDM symbol of the SS/PBCH block. In the time domain, the PBCH may be mapped to the second OFDM symbol, the third OFDM symbol, and the fourth OFDM symbol of the SS/PBCH block.

The SS/PBCH block may include 240 subcarriers. In the frequency domain, the 57th to 183rd subcarriers are mapped. In the frequency domain, the SSS may be mapped to the 57th to 183rd subcarriers. The first subcarrier of the first OFDM symbol to the 56th subcarrier of the first OFDM symbol may be set to zero. The 184th subcarrier of the first OFDM symbol to the 240th subcarrier of the first OFDM symbol may be set to zero. The 49th subcarrier of the third OFDM symbol to the 56th subcarrier of the third OFDM symbol may be set to zero. The 184th subcarrier of the third OFDM symbol to the 192nd subcarrier of the third OFDM symbol may be set to zero. The PBCH may be mapped to subcarriers from the first subcarrier to the 240th subcarrier of the second OFDM symbol that are not mapped with a DMRS associated with the PBCH. The PBCH may be mapped to subcarriers from the first subcarrier to the 48th subcarrier of the third OFDM symbol that are not mapped with a DMRS associated with the PBCH. The PBCH may be mapped to subcarriers from the 193rd subcarrier to the 240th subcarrier of the third OFDM symbol that are not mapped with a DMRS associated with the PBCH. The PBCH may be mapped to subcarriers from the first subcarrier to the 240th subcarrier of the fourth OFDM symbol that are not mapped with a DMRS associated with the PBCH.

A BCH (Broadcast CHannel), UL-SCH (Uplink-Shared CHannel), and DL-SCH (Downlink-Shared CHannel) are transport channels. A channel used in a Medium Access Control (MAC) layer is referred to as a transport channel. A unit of the transport channel used in the MAC layer is also referred to as a transport block (TB) or a MAC PDU. HARQ (Hybrid Automatic Repeat reQuest) control is performed for each transport block in the MAC layer. The transport block is a unit of data that the MAC layer delivers to the physical layer. In the physical layer, the transport block is mapped to a codeword, and modulation processing is performed for each codeword.

The base station apparatus 3 and the terminal apparatus 1 exchange (transmit and/or receive) higher layer signals with each other in higher layers. For example, the base station apparatus 3 and the terminal apparatus 1 may transmit and/or receive RRC (Radio Resource Control) signaling (RRC message or RRC information) in the RRC layer, respectively. In addition, the base station apparatus 3 and the terminal apparatus 1 may transmit and/or receive a MAC CE (Control Element) in the MAC layer. Here, the RRC signaling and/or the MAC CE may also be referred to as a higher layer signal (higher layer signaling).

The PUSCH and the PDSCH may be at least used to transmit the RRC signaling and/or the MAC CE. Here, the RRC signaling transmitted via the PDSCH from the base station apparatus 3 may be signaling common to multiple terminal apparatuses 1 within a serving cell. The signaling common to multiple terminal apparatuses 1 within a serving cell is also referred to as common RRC signaling. The RRC signaling transmitted via the PDSCH from the base station apparatus 3 may be signaling dedicated to a certain terminal apparatus 1 (also referred to as dedicated signaling or UE specific signaling). The signaling dedicated to the terminal apparatus 1 is also referred to as dedicated RRC signaling. A higher layer parameter specific to a serving cell may be transmitted using signaling common to a plurality of terminal apparatuses 1 within the serving cell or using signaling dedicated to a certain terminal apparatus 1. A UE-specific higher layer parameter may be transmitted using signaling dedicated to a certain terminal apparatus 1.

BCCH (Broadcast Control CHannel), CCCH (Common Control CHannel), and DCCH (Dedicated Control CHannel) are logical channels. For example, the BCCH is a higher layer channel for transmitting an M. The CCCH (common control channel) is a higher layer channel for transmitting common information in a plurality of terminal apparatuses 1. Here, the CCCH may be used, for example, for a terminal apparatus 1 that is not RRC-connected. The DCCH (Dedicated Control CHannel) is a higher layer channel that is at least used to transmit dedicated control information to the terminal apparatus 1. Here, the DCCH may be used, for example, for a terminal apparatus 1 that is RRC-connected.

The BCCH in the logical channels may be mapped to the BCH, the DL-SCH, or the UL-SCH in the transport channels. The CCCH in the logical channels may be mapped to the DL-SCH or the UL-SCH in the transport channels. The DCCH in the logical channels may be mapped to DL-SCH or UL-SCH in the transport channels.

The UL-SCH in the transport channels may be mapped to the PUSCH in the physical channels. The DL-SCH in the transport channels may be mapped to the PDSCH in the physical channels. The BCH in the transport channels may be mapped to the PITCH in the physical channels, Hereinafter, an example of a configuration of a terminal apparatus 1 according to one aspect of the present embodiment will be described.

Figure 6:
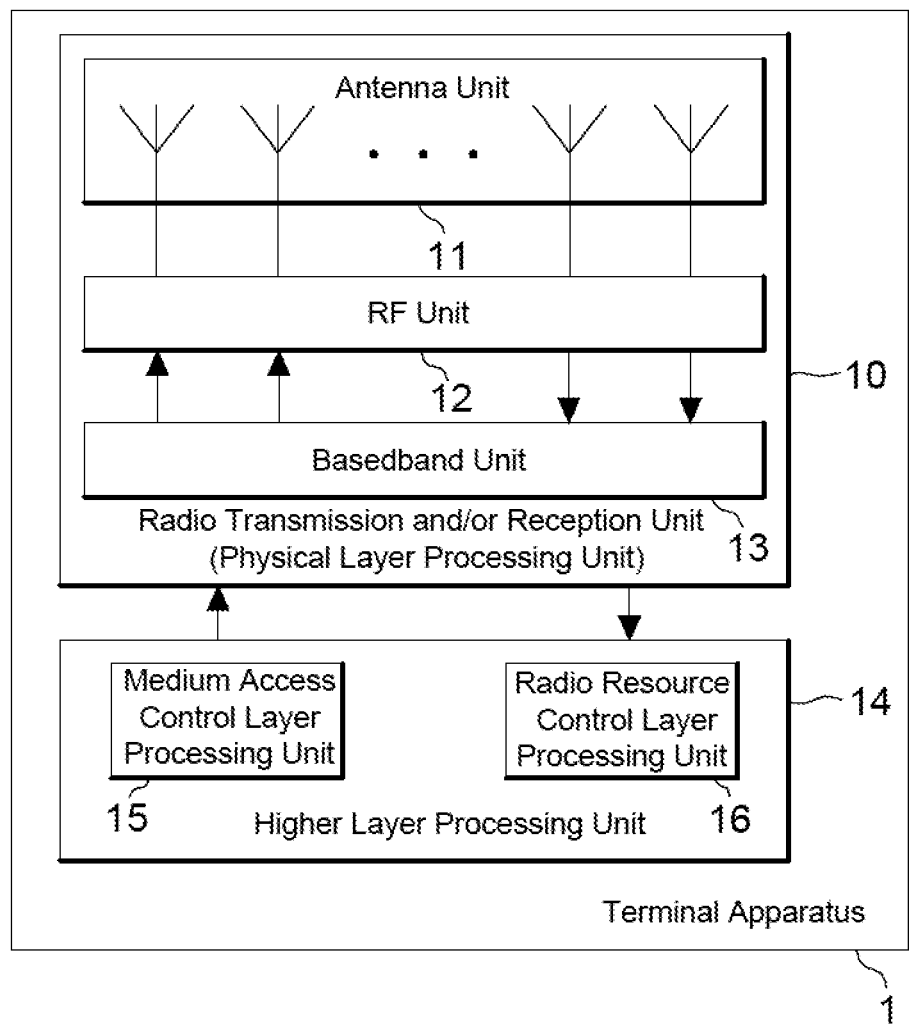
FIG. 6 is a schematic block diagram showing a configuration of a terminal apparatus according to one aspect of the present embodiment.

FIG. 6 is a schematic block diagram showing a configuration of a terminal apparatus 1 according to one aspect of the present embodiment. As shown in FIG. 6, the terminal apparatus 1 includes a radio transmission and/or reception unit 10 and a higher layer processing unit 14. The radio transmission and/or reception unit 10 includes an antenna unit 11, an RF (Radio Frequency) unit 12, and a baseband unit 13. The higher layer processing unit 14 includes at least some or all of a medium access control layer processing unit 15 and a radio resource control layer processing unit 16. The radio transmission and/or reception unit 10 is also referred to as a transmission unit, a reception unit, or a physical layer processing unit.

The higher layer processing unit 14 outputs uplink data (transport block) generated by a user operation or the like to the radio transmission and/or reception unit 10. The higher layer processing unit 14 performs processing of a MAC layer, a PDCP (Packet Data Convergence Protocol) layer, an RLC (Radio Link Control) layer, and an RRC layer.

The medium access control layer processing unit 15 included in the higher layer processing unit 14 performs the processing of the MAC layer.

The radio resource control layer processing unit 16 included in the higher layer processing unit 14 performs processing of the RRC layer. The radio resource control layer processing unit 16 manages various types of configuration information/parameters of the present terminal apparatus. The radio resource control layer processing unit 16 sets various types of configuration information/parameters based on a higher layer signal received from the base station apparatus 3. That is, the radio resource control layer processing unit 16 sets various types of configuration information/parameters based on information indicating the various types of configuration information/parameters received from the base station apparatus 3. The parameter may be a higher layer parameter.

The radio transmission and/or reception unit 10 performs processing of the physical layer, such as modulation, demodulation, encoding, decoding, and the like. The radio transmission and/or reception unit 10 demultiplexes, demodulates, and decodes the received signal, and then outputs decoded information to the higher layer processing unit 14. The radio transmission and/or reception unit 10 generates a physical signal by modulating, encoding data, and generating a baseband signal (conversion into a time continuous signal), and then transmits the physical signal to the base station apparatus 3. The radio transmission and/or reception unit 10 can perform carrier detection.

The RF unit 12 converts (down-converts) a signal received via the antenna unit 11 into a baseband signal by quadrature demodulation, and then removes unnecessary frequency components. The RF unit 12 outputs a processed analog signal to the baseband unit, The baseband unit 13 converts the analog signal input from the RE unit 12 into a digital signal. The baseband unit 13 removes a portion corresponding to a cyclic prefix (CP) from the converted digital signal, performs a fast Fourier transform (FFT) on the signal from which the CP has been removed, and extracts a signal in the frequency domain.

The baseband unit 13 generates an OFDM symbol by performing an inverse fast Fourier transform (IFFT) on data, adds a CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 by using a low-pass filter, up-converts the analog signal to a signal with a carrier frequency, and transmits the up-converted signal via the antenna unit 11. In addition, the RF unit 12 amplifies power. In addition, the RF unit 12 may provide a function of controlling transmission power. The RF unit 12 may also be referred to as a transmission power control unit.

Hereinafter, an example of a configuration of a base station apparatus 3 according to one aspect of the present embodiment will be described.

Figure 7:
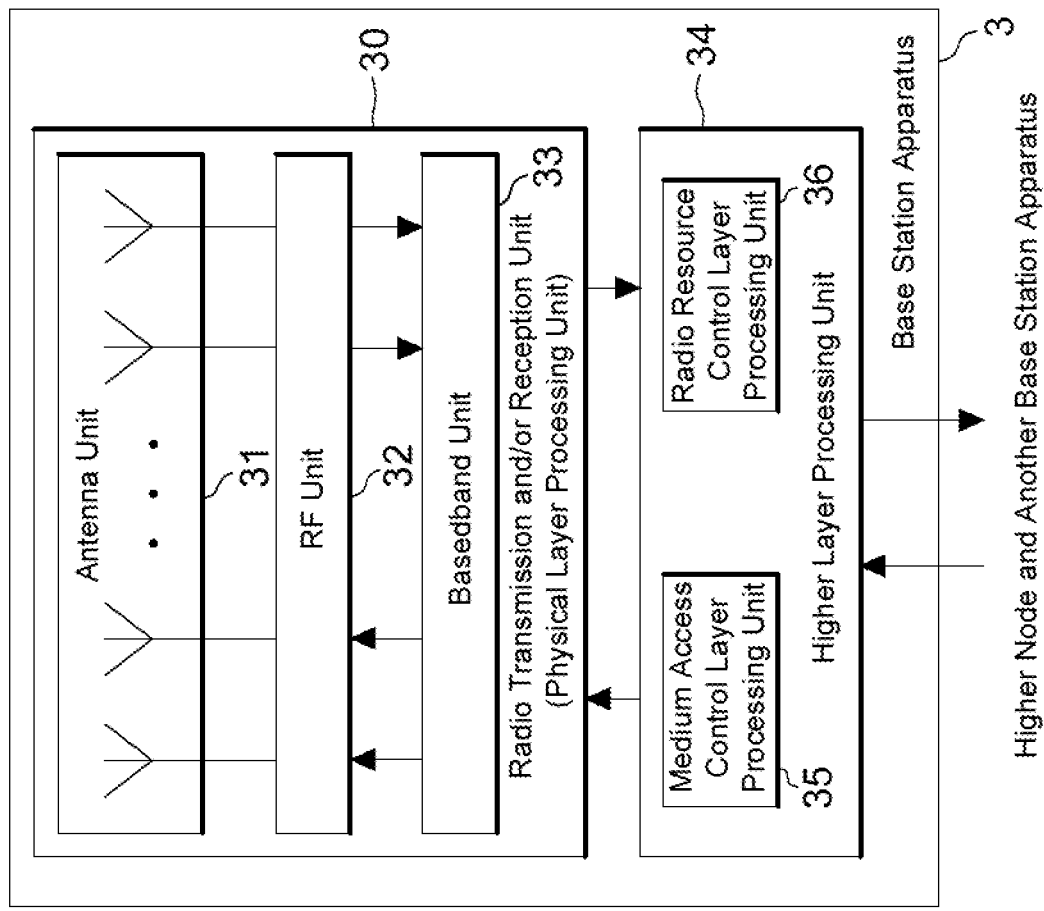
FIG. 7 is a schematic block diagram showing a configuration of a base station apparatus according to one aspect of the present embodiment.

FIG. 7 is a schematic block diagram showing a configuration of a base station apparatus 3 according to one aspect of the present embodiment. As shown in FIG. 7, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmission unit, a reception unit, or a physical layer processing unit.

The higher layer processing unit 34 performs processing of a AC layer, a PDCP layer, an RLC layer, and an RRC layer.

The medium access control layer processing unit 35 included in the higher layer processing unit 34 performs the processing of the MAC layer, The radio resource control layer processing unit 36 included in the higher layer processing unit 34 performs processing of the RRC layer. The radio resource control layer processing unit 36 generates or acquires from a higher node, downlink data (transport block) allocated on a PDSCH, system information, an RRC message, a MAC CE, and the like, and outputs them to the radio transmission and/or reception unit 30. In addition, the radio resource control layer processing unit 36 manages various types of configuration information/parameters for each terminal apparatus 1. The radio resource control layer processing unit 36 can set various types of configuration information/parameters for each terminal apparatus 1 via a higher layer signal. That is, the radio resource control layer processing unit 36 transmits/reports information indicating various types of configuration information/parameters.

Since the functionality of the radio transmission and/or reception unit 30 is the same as that of the radio transmission and/or reception unit 10, the description thereof is omitted.

Each of the units marked with reference numerals 10 to 16 provided by the terminal apparatus 1 may be configured as a circuit. Each of the units marked with reference numerals 30 to 36 provided by the base station apparatus 3 may be configured as a circuit. Some or all of the units marked with reference numerals 10 to 16 provided by the terminal apparatus 1 may be configured as a memory and a processor connected to the memory. Some or all of the units marked with reference numerals 30 to 36 provided by the base station apparatus 3 may be configured as a memory and a processor connected to the memory. The various aspects (operations and/or processes) according to the present embodiment may be realized (performed) in a memory and a processor connected to the memory included in the terminal apparatus 1 and/or the base station apparatus 3.

Hereinafter, examples of various aspects of the base station apparatus 3 will be described.

The base station apparatus 3 may perform a channel access procedure in a serving cell c and may transmit a transmission wave in the serving cell c. For example, the serving cell c may be a serving cell configured in an unlicensed band. The transmission wave is a signal transmitted from the base station apparatus 3 to a medium.

The base station apparatus 3 may perform the channel access procedure on a carrier f of the serving cell c and transmit the transmission wave on the carrier f of the serving cell c. The carrier f is a carrier included in the serving cell c. The carrier f may include a set of resource blocks given based on a higher layer parameter.

The base station apparatus 3 may perform the channel access procedure on the carrier f of the serving cell c and transmit the transmission wave on a bandwidth part b of the carrier f of the serving cell c. The bandwidth part b is a subset of a frequency band included in the carrier f.

The base station apparatus 3 may perform the channel access procedure on a bandwidth part b of the carrier f of the serving cell c and transmit the transmission wave on the carrier f of the serving cell c. Transmitting the transmission wave in the carrier f of the serving cell c may mean transmitting the transmission wave in any of bandwidth parts included in the carrier f of the serving cell c.

The base station apparatus 3 may perform the channel access procedure on a bandwidth part b of the carrier f of the serving cell c and transmit the transmission wave on the bandwidth part b of the carrier f of the serving cell c.

The channel access procedure may include at least one or both of first sensing and a counting procedure. A first channel access procedure may include the first sensing. The first channel access procedure may not include the counting procedure. A second channel access procedure may include at least both the first sensing and the counting procedure. The channel access procedure is a term that includes a part or all of the first channel access procedure and the second channel access procedure.

After the first channel access procedure is performed, the transmission wave including at least an SS/PBCH block may be transmitted. After the first channel access procedure is performed, the transmission wave including at least some or all of an SS/PBCH block, a PDSCH including broadcast information, a PDCCH including a DCI format used for scheduling the PDSCH, and a CSI-RS may be transmitted. After the second channel access procedure is performed, the transmission wave including at least a PDSCH including information other than broadcast information may be transmitted. The PDSCH including the broadcast information may include at least some or all of a PDSCH including system information, a PDSCH including paging information, and a PDSCH (message 2 and/or message 4) used for a random access.

The transmission wave including at least some or all of an SS/PBCH block, a PDSCH including broadcast information, a PDCCH including a DCI format used for scheduling the PDSCH, and a CSI-RS may also be referred to as a DRS (Discovery Reference Signal). The DRS may be a signal transmitted after the first channel access procedure.

When a duration of the DRS is equal to or shorter than a predetermined length and the duty cycle of the DRS is equal to or smaller than a predetermined value, the transmission wave including the DRS may be transmitted after the first channel access procedure is performed. When the duration of the DRS exceeds the predetermined length, the transmission wave including the DRS may be transmitted after the second channel access procedure is performed. When the duty cycle of the DRS exceeds the predetermined value, the transmission wave including the DRS may be transmitted after the second channel access procedure is performed. For example, the predetermined length may be 1 ms. In addition, the predetermined value may be $\frac{1}{20}$.

Transmitting the transmission wave after the channel access procedure is performed may also mean transmitting the transmission wave based on the channel access procedure. Transmitting the transmission wave after the channel access procedure is performed may also mean transmitting the transmission wave when it is given that a channel is transmissible based on the channel access procedure.

The first sensing may detect that a medium is idle in one or more LBT (Listen Before Talk) slot durations in a defer duration. Here, LBT may be a procedure in which whether a medium is idle or busy is given based on carrier detection. The carrier detection may perform energy detection in the medium. For example, being busy may be a state in which the amount of energy detected by carrier detection is greater than a predetermined threshold. In addition, being idle may be a state in which the amount of energy detected by carrier detection is smaller than the predetermined threshold. In addition, the expression that the amount of energy detected by the carrier detection is equal to the predetermined threshold may mean being idle. In addition, the expression that the amount of energy detected by the carrier detection is equal to the predetermined threshold may mean being busy.

Being idle can also mean being not busy Being busy can also mean being not idle.

The LBT slot duration is a unit of LBT. For each LBT slot duration, it may be given whether the medium is idle or busy. For example, the LBT slot duration may be 9 microseconds.

The defer duration may include at least a duration $T_f$ and one or more LBT slot durations. The length of the defer duration is referred to as $T_d$. For example, the period $T_f$ may be 16 microseconds.

Figure 8:
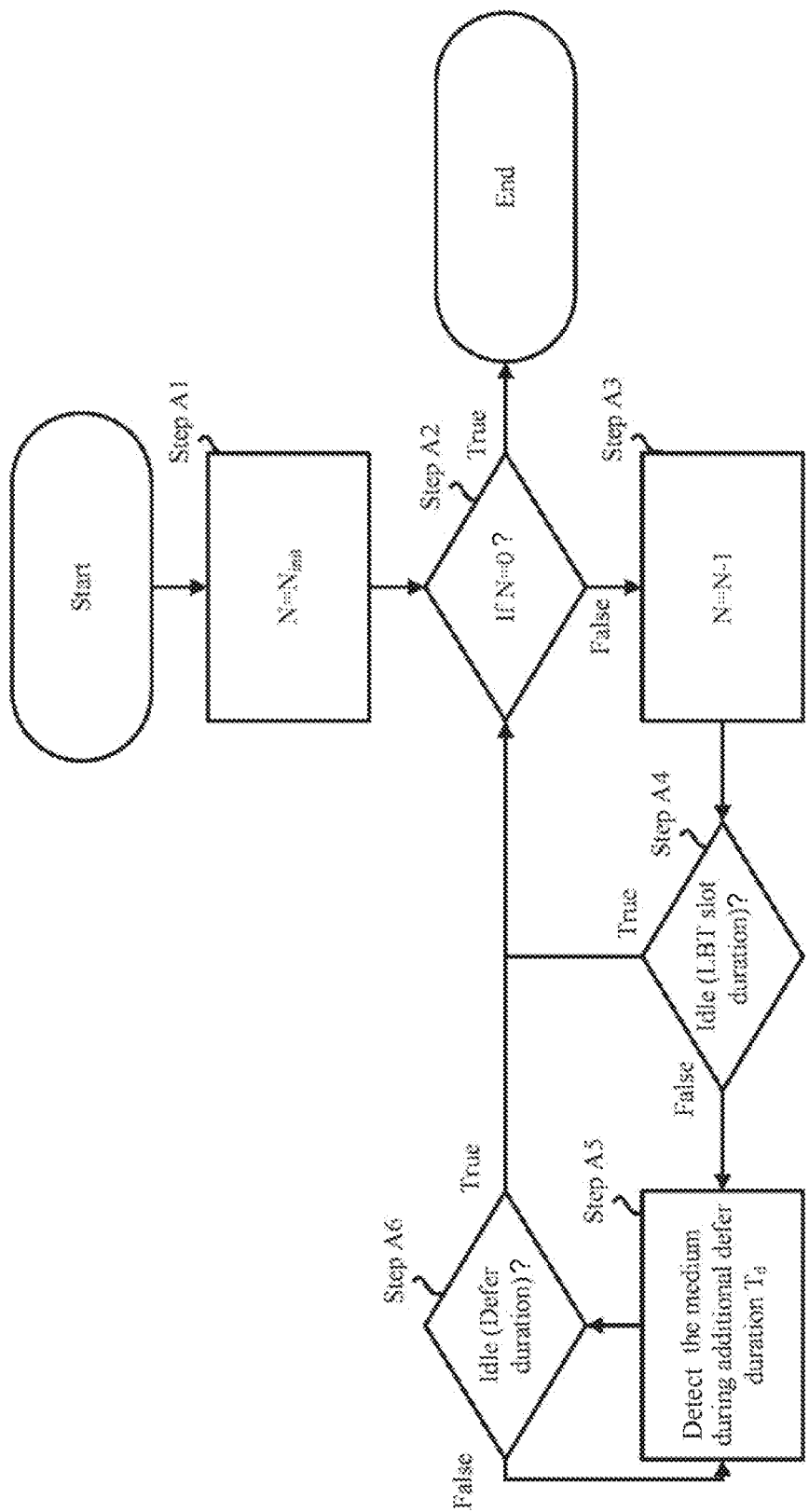
FIG. 8 is a diagram showing an example of a counting procedure according to one aspect of the present embodiment.

FIG. 8 is a diagram showing an example of a counting procedure according to one aspect of the present embodiment. The counting procedure includes at least some or all of steps from Step A1 to Step A6. Step A1 includes an operation of setting a value of a counter N as $N_{init}$. Here, $N_{init}$ is a value randomly (or pseudo-randomly) selected from integer values included in a range from 0 to CWp. The CWp is a contention window size (CWS) for a channel access priority class p.

In Step A2, it is determined whether the value of the counter N is 0. Step A2 includes an operation of completing (or ending) the channel access procedure when the counter N is 0. Step A2 includes an operation of proceeding to Step A3 if the counter N is different from 0. Here, "True" in FIG. 8 corresponds to a fact that an evaluation expression is true in a step including the operation of determining the evaluation expression. In addition, "False" corresponds to a fact that an evaluation expression is false in a step including the operation of determining the evaluation expression. In Step A2, the evaluation expression corresponds to counter N=0.

For example, Step A3 may include a step of decrementing the value of the counter N. Decrementing the value of the counter N may mean decrementing the value of the counter N by one. In other words, decrementing the value of the counter N may mean setting the value of the counter N to N−1.

For example, Step A3 may include a step of decrementing the value of the counter N when N is greater than zero (N>0). In addition, Step A3 may include a step of decrementing the value of the counter N when the base station apparatus 3 selects to decrement the counter N. In addition, Step A3 may include a step of decrementing the value of the counter N when N>0 and the base station apparatus 3 selects to decrement the counter N.

For example, Step A4 may include an operation of performing carrier detection of a medium in an LBT slot duration d and proceeding to Step A2 when the LBT slot duration d is idle. In addition, Step A4 may include an operation of proceeding to Step A2 when the LBT slot duration d is determined to be idle by the carrier detection. In addition, Step A1 may include an operation of performing the carrier detection in the LBT slot duration d and proceeding to Step A5 when the LBT slot duration d is busy. In addition, Step A4 may include an operation of proceeding to Step A5 when the LBT slot duration d is determined to be busy by the carrier detection. Here, the LBT slot duration d may be an LBT slot duration next to the LBT slot duration in which the carrier detection has been performed in the counting procedure. In Step A1, the evaluation expression may correspond to that the LBT slot duration is idle.

Step A5 includes an operation of performing the carrier detection until the carrier or medium is detected to be busy in a certain LBT slot duration included in a defer duration or until the medium is detected to be idle in all LBT slot durations included in the defer duration, Step A6 includes an operation of proceeding to Step A5 when the medium is detected to be busy in a certain LBT slot duration included in the defer duration. Step A6 includes an operation of proceeding to Step A2 when the medium is detected to be idle in all LBT slot durations included in the defer duration. In Step A6, the evaluation expression may correspond to that the medium is idle in the certain LBT slot duration.

$CW_{min,\ p}$ indicates the minimum value in a range of possible values of the contention window size CWp for the channel access priority class p. $CW_{max,\ p}$ indicates the maximum value in a range of possible values of the contention window size CWp for the channel access priority class p. The contention window size CWp for the channel access priority class p is also referred to as a CWp.

When a transmission wave including at least a physical channel (e.g., PDSCH) associated with the channel access priority class p is transmitted, the CWp is managed by the base station apparatus 3, and the CWp is adjusted prior to Step A1 of the counting procedure (that is, a CWp adjustment procedure is performed).

The CWp adjustment procedure may include at least some or all of steps from Step B1 to Step B2. Step B1 includes an operation of setting a value of the CWp to a $CW_{min,\ p}$ for all channel access priority classes p.

For example, Step B2 may include at least an operation of increasing the CWp for some or all of the channel access priority classes when x % of Y HARQ-ACKs corresponding to a reference duration k are NACKs (or determined to be NACKs). Increasing the CWp may mean setting the value of the CWp to a value greater than the value of a CWp set at the time of adjusting the CWp in a set of values permitted as possible values for the CWp. For example, the set of values permitted as possible values for the CWP may be {3, 7}, may be {7, 15}, may be {15, 31, 63}, or may be {15, 31, 63, 127, 255, 511, 1023}. Further, in Step B2, at the time of adjusting the CWp, each of unavailable HARQ-ACKs corresponding to the reference duration k may be regarded as a NACK. In addition, in Step B2, at the time of adjusting the CWp, each of unavailable HARQ-ACKs corresponding to the reference duration k may be regarded as a DTX. Besides, the DTX may be regarded as a NACK in the CWp adjustment.

The HARQ-ACK corresponding to the reference duration k may include each of HARQ-ACKs corresponding to any of one or more PDSCHs included in the reference duration k. The available HARQ-ACK corresponding to the reference duration k may include an available HARQ-ACK in each of the HARQ-ACKs corresponding to any of one or more PDSCHs included in the reference duration k. The unavailable HARQ-ACK corresponding to the reference duration k may include an unavailable HARQ-ACK in each of the HARQ-ACKs corresponding to any of one or more PDSCHs included in the reference duration k.

The set of values permitted as possible values for the CWp may be given at least based on the channel access priority class p.

For example, an expression that it is a NACK may mean that it is not an ACK. In addition, an expression that it is an ACK may mean that it is not a NACK.

For example, Step B2 may include at least an operation of setting the CWp for some or all of the channel access priority classes to a minimum value when X ?/o of the Y HARQ-ACKs corresponding to the reference duration k are not NACKs (or not determined to be NACKs). In addition, Step B2 may include at least an operation of setting the CWp for some or all of the channel access priority classes to a minimum value when $X^-$% of the Y HARQ-ACKs corresponding to the reference duration k are ACKs (or determined to be ACKs). Here, $X+X^-=100$. Setting the CWp to a minimum value may mean setting the minimum value of the set of values permitted as possible values for the CWp as the CWp.

For example, the reference duration k may correspond to a duration in which a recent transmission wave is transmitted. In addition, the reference duration k may include at least the first slot (or subframe) of the duration in which the recent transmission wave is transmitted. In addition, the reference duration k may include at least the first slot (or subframe) of slots (or subframes) including at least a PDSCH corresponding to the HARQ-ACK that can be used in the duration in which the recent transmission wave is transmitted. Hereinafter, a case where the reference duration k corresponds to a slot will be described as an example. In various aspects of the present embodiment, the description of the slot related to the reference duration k may be read as that of a subframe.

Figure 9:
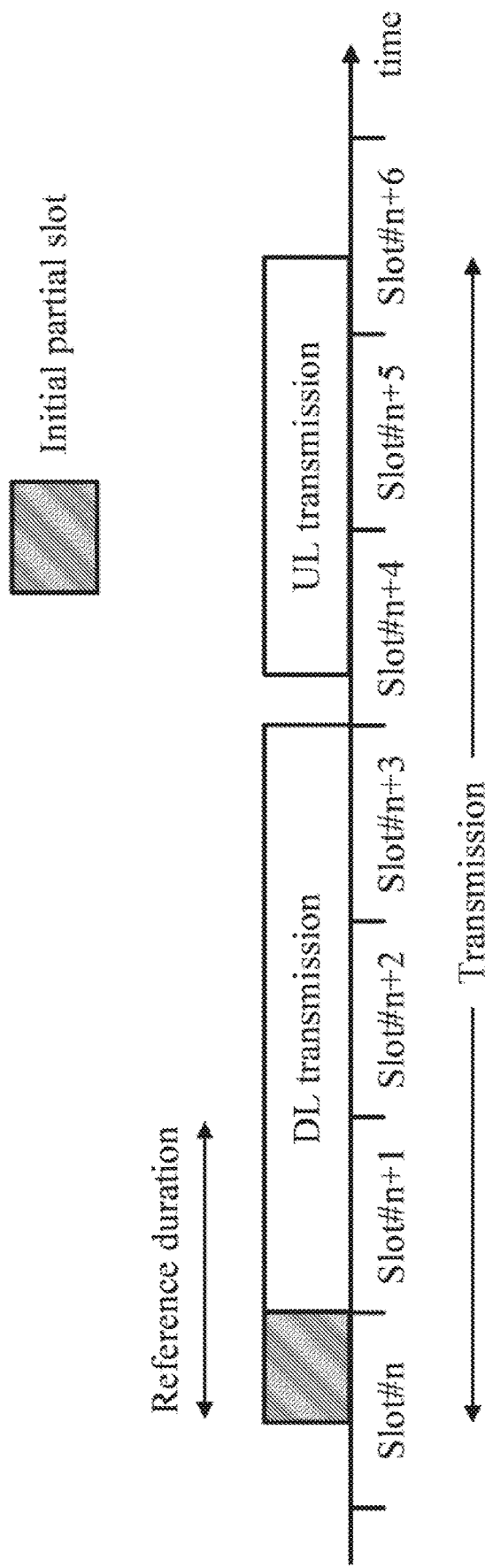
FIG. 9 is a diagram showing an example of a reference duration according to one aspect of the present embodiment.

FIG. 9 is a diagram showing an example of a reference duration k according to one aspect of the present embodiment. The block indicated by diagonal lines shown in FIG. 9 is referred to as an initial partial slot. A transmission wave may be transmitted in the initial partial slot. The initial partial slot may be a first slot that includes a transmission wave and may be a slot in which the transmission of the transmission wave is started from the middle thereof. When at least one HARQ-ACK corresponding to the PDSCH included in the initial partial slot is available, the reference duration k may include the initial partial slot and a slot next to the initial partial slot. In FIG. 9, the reference duration k may include at least a slot #n and a slot #n+1.

The type 0 PDCCH common search space set may be given at least based on four bits of the LSBs of a higher layer parameter PDCCH-ConfigSIB1. A monitoring occasion 1001 for type 0 PDCCH common search space set may be mapped to two consecutive slots (a slot n0 and a slot n0+1) from the slot n0. For an SS/PBCH block with an index i, a first slot n0 of slots to which the monitoring occasion 1001 for type 0 PDCCH common search space set is mapped may be given at least based on some or all of an offset O, a subcarrier spacing configuration μ for the PDCCH included in the monitoring occasion 1001 for the type 0 PDCCH common search space set, the index i, a value M, and an $N^{frame, \mu}_{slot}$. For example, the first slot n0 may be n0=mod ((O*2$^\mu$+ floor (i*M)), $N^{frame, \mu}_{slot}$). Here, the expression that the monitoring occasion for type 0 PDCCH common search space set is given for the SS/PBCH block with the index i may also mean that the SS/PBCH block with the index i corresponds to the monitoring occasion for type 0 PDCCH common search space set.

FIG. 10 is a diagram showing a configuration example of a monitoring occasion 1001 for a type 0 PDCCH common search space set according to one aspect of the present embodiment. In FIG. 10, the index corresponds to a value indicated by 4 bits of the LSBs of the higher layer parameter PDCCH-ConfigSIB1. In addition, the O indicates an offset O. In addition, the M indicates a value M. In addition, the First OFDM symbol index indicates a first OFDM symbol index to which the monitoring occasion 1001 for type 0 PDCCH common search space set is mapped. In addition, the Nsym indicates the number of OFDM symbols of a control resource set corresponding to the type 0 PDCCH common search space set. In addition, the i indicates the index i of the SS/PBCH block.

The monitoring occasion 1001 for type 0 PDCCH common search space set may be used when an operation is performed in a band other than an unlicensed band.

FIG. 11 is a diagram showing an example of configuration information of a PDSCH indicated by a downlink time-domain resource allocation field included in a DCI format included in a PDCCH included in a monitoring occasion 1001 for type 0 PDCCH common search space set according to one aspect of the present embodiment. In FIG. 11, the index corresponds to a value of the downlink time-domain resource allocation field. The dmrs-TypeA-position is a higher layer parameter. In addition, the dmrs-TypeA-position may be a common RRC parameter. In addition, the S indicates the index of the first OFDM symbol to which the PDSCH is mapped. In addition, the indicates the number of OFDM symbols to which the PDSCH is mapped.

The PDSCH may be used when an operation is performed in a band other than an unlicensed band.

When the DRS includes a plurality of signals, the plurality of signals are preferably arranged consecutively in the time domain. In other words, it is preferable that the DRS does not include a gap duration (or a duration in which no signal is mapped). This is due to the transmission of the DRS after one first channel access procedure.

FIGS. 12 to 20 are diagrams showing mapping examples of a DRS in a time-frequency domain according to one aspect of the present embodiment. In FIGS. 12 to 20, the horizontal axis indicates a time axis (e.g., an axis of the OFDM symbol index), and the vertical axis indicates a frequency. In addition, a blank block indicates mapping of an SS/PBCH block, a diagonally-lined block indicates mapping of a type 0 PDCCH common search space set, and a grid-lined block indicates a PDSCH with broadcast information.

In FIGS. 12 to 20, the OFDM symbol with an index #0 indicates the first OFDM symbol in one half frame. In FIGS. 12 to 20, the OFDM symbol index indicates indexes given in ascending order within one half frame. The one half frame may be half the duration of a frame. The one half frame may include the first five subframes included in the frame. The one half frame may include the latter five subframes included in the frame.

Figure 12:
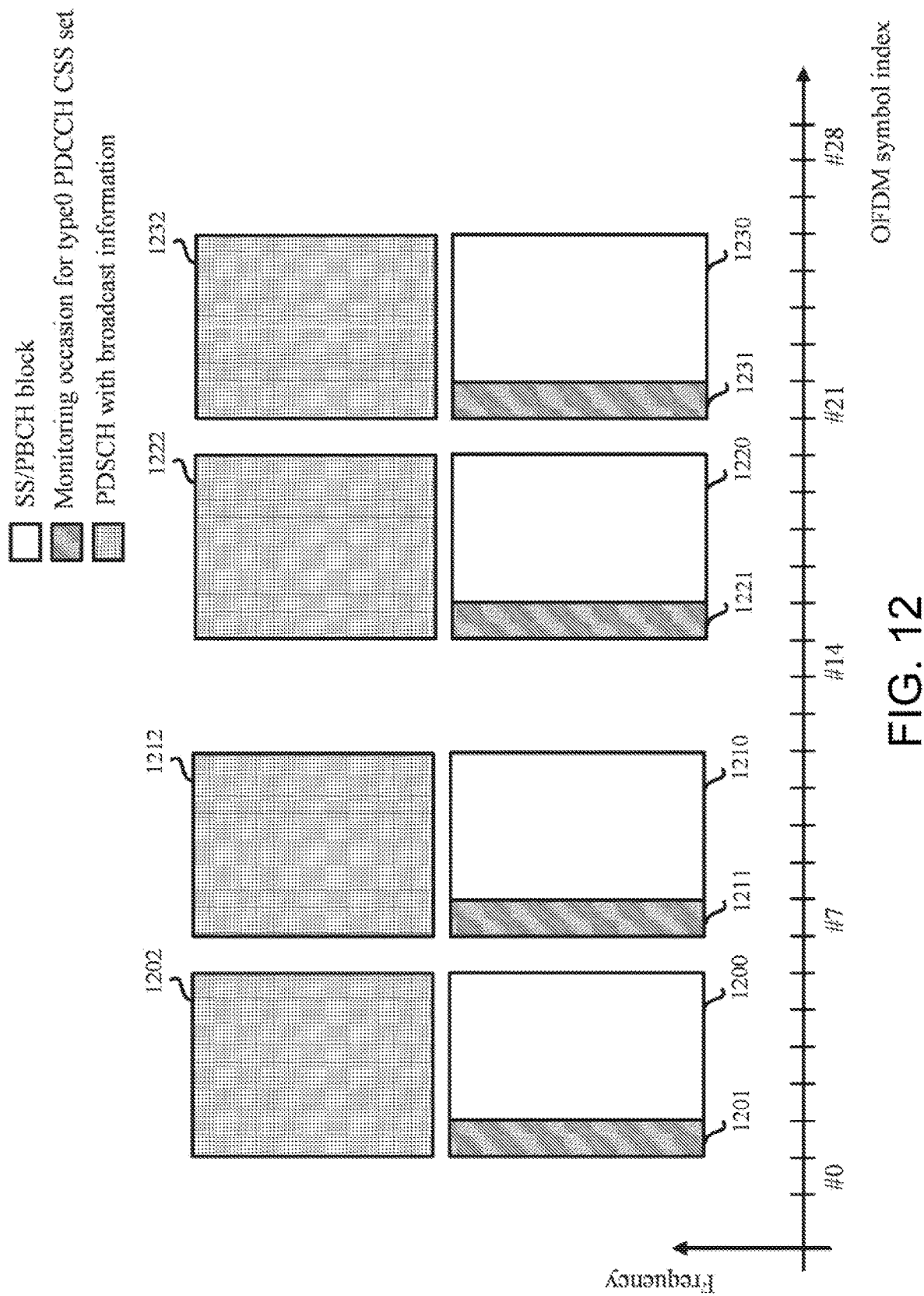
FIG. 12 is a diagram showing a mapping example of a Discovery Reference Signal (DRS) in a time-frequency domain according to one aspect of the present embodiment.

FIG. 12 is a diagram showing a mapping example of a DRS in a time-frequency domain according to one aspect of the present embodiment. In the example shown in FIG. 12, it is assumed that the mapping of SS/PBCH block candidates is a first type, and the number of symbol(s) of a control resource set associated with the type 0 PDCCH common search space set is 1. Here, as shown in FIG. 12, the SS/PBCH block 1200 may be mapped to OFDM symbols from #2 to #5. In addition, the SS/PBCH block 1210 may be mapped to OFDM symbols from #8 to #11. In addition, the SS/PBCH block 1220 may be mapped to OFDM symbols from #16 to #19. In addition, the SS/PBCH block 1230 may be mapped to OFDM symbols from #22 to #25. In addition, a monitoring occasion 1201 for type 0 PDCCH common search space (CSS) set may be mapped to OFDM symbol #1. In addition, a monitoring occasion 1211 for type 0 PDCCH CSS set may be mapped to OFDM symbol #7. In addition, a monitoring occasion 1221 for type 0 PDCCH CSS set may be mapped to OFDM symbol #15. In addition, a monitoring occasion 1231 for type 0 PDCCH CSS set may be mapped to OFDM symbol #21. In addition, a PDSCH 1202 with broadcast information may be mapped to OFDM symbols from #1 to #5. In addition, a PDSCH 1212 with broadcast information may be mapped to OFDM symbols from #7 to #11. In addition, a PDSCH 1222 with broadcast information may be mapped to OFDM symbols from #15 to #19. In addition, a PDSCH 1232 with broadcast information may be mapped to OFDM symbols from #21 to #25.

Here, the first type regarding mapping of SS/PBCH block candidates may be such a type in which each of the SS/PBCH block candidates is mapped to the 2+14*n-th OFDM symbol In a first condition, the monitoring occasion for type 0 PDCCH CCS set may be mapped to at least some or all of the OFDM symbol #1, the OFDM symbol #7, the OFDM symbol #15, and the OFDM symbol #21.

The first condition may satisfy at least some or all of the following Conditions 1A to 1C.

Condition 1A: the mapping of the SS/PBCH block candidates is the first type.

Condition 1B: the number of OFDM symbol(s) of a control resource set associated with the type 0 PDCCH common search space set is 1.

Condition 1C: the operation is performed in an unlicensed band.

The operation performed in an unlicensed band may include at least some or all of the following Elements 1 to 4.

Element 1: a higher layer parameter is given to indicate that the operation is performed in an unlicensed band.
Element 2: a serving cell is configured to operate in an unlicensed band.
Element 3: a carrier is configured in an unlicensed band.
Element 4: the carrier is included in an unlicensed band.

In the first condition, the monitoring occasion 1201 for type 0 PDCCH CSS set may be at least mapped to the OFDM symbol #1. In the first condition, the monitoring occasion 1211 for type 0 PDCCH CSS set may be at least mapped to the OFDM symbol #7. In the first condition, the monitoring occasion 1221 for type 0 PDCCH CSS set may be at least mapped to the OFDM symbol #15. In the first condition, the monitoring occasion 1231 for type 0 PDCCH CSS set may be at least mapped to the OFDM symbol #21.

In the first condition, the monitoring occasion 1201 for type 0 PDCCH CSS set may be mapped to an OFDM symbol that is right before the SS/PBCH block 1200. In the first condition, the monitoring occasion 1211 for type 0 PDCCH CSS set may be mapped to an OFDM symbol that is right before the SS/PBCH block 1210. In the first condition, the monitoring occasion 1221 for type 0 PDCCH CSS set may be mapped to an OFDM symbol that is right before the SS/PBCH block 1220. In the first condition, the monitoring occasion 1231 for type 0 PDCCH CSS set may be mapped to an OFDM symbol that is right before the SS/PBCH block 1230.

In the first condition, the SS/PBCH block 1200 may correspond to the monitoring occasion 1201 for type 0 PDCCH CSS set. In addition, in the first condition, the SS/PBCH block 1210 may correspond to the monitoring occasion 1211 for type 0 PDCCH CSS set. In addition, in the first condition, the SS/PBCH block 1220 may correspond to the monitoring occasion 1221 for type 0 PDCCH CSS set. In addition, in the first condition, the SS/PBCH block 1230 may correspond to the monitoring occasion 1231 for type 0 PDCCH CSS set.

In the first condition, the SS/PBCH block 1200 may correspond to the monitoring occasion 1211 for type 0 PDCCH CSS set. In addition, in the first condition, the SS/PBCH block 1210 may correspond to the monitoring occasion 1201 for type 0 PDCCH CSS set. In addition, in the first condition, the SS/PBCH block 1220 may correspond to the monitoring occasion 1231 for type 0 PDCCH CSS set. In addition, in the first condition, the SS/PBCH block 1230 may correspond to the monitoring occasion 1221 for type 0 PDCCH CSS set.

In the first condition, any of the SS/PBCH block 1200, the SS/PBCH block 1210, the SS/PITCH block 1220, and the SS/PBCH block 1230 may correspond to any of the monitoring occasion 1201 for type 0 PDCCH CSS set, the monitoring occasion 1211 for type 0 PDCCH CSS set, the monitoring occasion 1221 for type 0 PDCCH CSS set, and the monitoring occasion 1231 for type 0 PDCCH CSS set.

In the first condition, the index S of the first OFDM symbol to which the PDSCH 1202 with broadcast information is mapped may be equal to the index of the OFDM symbol to which the monitoring occasion 1201 for type 0 PDCCH CSS set is mapped. In the first condition, the index S of the first OFDM symbol to which the PDSCH 1202 with broadcast information is mapped may be equal to the index of the first OFDM symbol of the SS/PBCH block 1200. In the first condition, the index S of the first OFDM symbol to which the PDSCH 1212 with broadcast information is mapped may be equal to the index of the OFDM symbol to which the monitoring occasion 1211 for type 0 PDCCH CSS set is mapped. In the first condition, the index S of the first OFDM symbol to which the PDSCH 1212 with broadcast information is mapped may be equal to the index of the first OFDM symbol of the SS/PBCH block 1210. In the first condition, the index S of the first OFDM symbol to which the PDSCH 1222 with broadcast information is mapped may be equal to the index of the OFDM symbol to which the monitoring occasion 1221 for type 0 PDCCH CSS set is mapped. In the first condition, the index S of the first OFDM symbol to which the PDSCH 1222 with broadcast information is mapped may be equal to the index of the first OFDM symbol of the SS/PBCH block 1220. In the first condition, the index S of the first OFDM symbol to which the PDSCH 1232 with broadcast information is mapped may be equal to the index of the OFDM symbol to which the monitoring occasion 1231 for type 0 PDCCH CSS set is mapped. In the first condition, the index S of the first OFDM symbol to which the PDSCH 1232 with broadcast information is mapped may be equal to the index of the first OFDM symbol of the SS/PBCH block 1230.

Here, the OFDM symbol that is right before the SS/PBCH block may be an OFDM symbol corresponding to an index smaller by one than the index of the first OFDM symbol to which the SS/PBCH block is mapped. In addition, the OFDM symbol that is right after the SS/PBCH block may be an OFDM symbol corresponding to an index larger by one than the index of the ending (last) OFDM symbol to which the SS/PBCH block is mapped. In addition, the OFDM symbol that is right before the SS/PBCH block may be an OFDM symbol adjacent to the first OFDM symbol to which the SS/PBCH block is mapped. In addition, the OFDM symbol that is right before the SS/PBCH block may be an adjacent OFDM symbol before the first OFDM symbol to which the SS/PBCH block is mapped. In addition, the OFDM symbol that is right after the SS/PBCH block may be an OFDM symbol adjacent to the ending OFDM symbol to which the SS/PBCH block is mapped. In addition, the OFDM symbol that is right after the SS/PBCH block may be an adjacent OFDM symbol after the ending OFDM symbol to which the SS/PBCH block is mapped.

Figure 13:
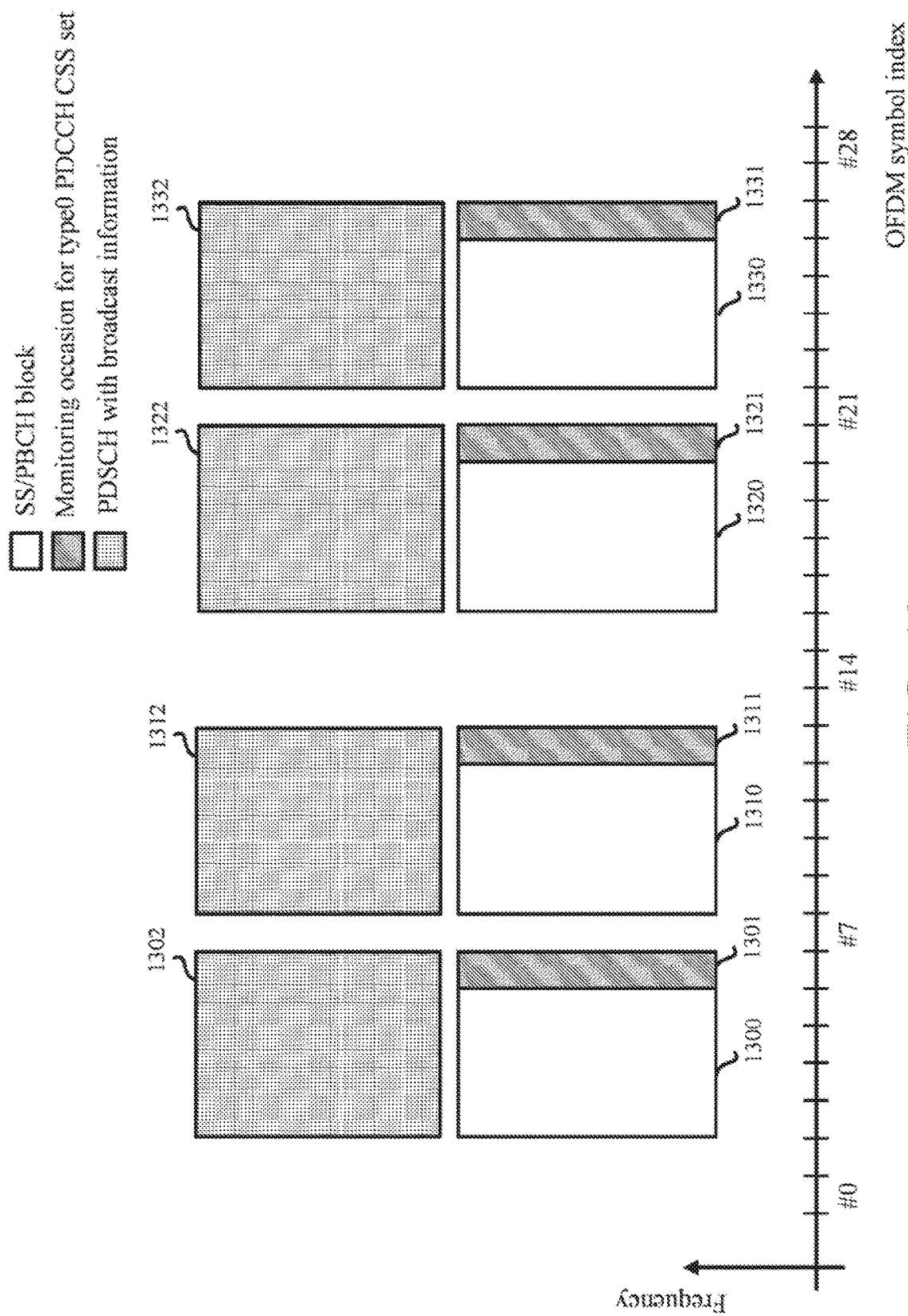
FIG. 13 is a diagram showing a mapping example of a DRS in a time-frequency domain according to one aspect of the present embodiment.

FIG. 13 is a diagram showing a mapping example of a DRS in a time-frequency domain according to one aspect of the present embodiment. In the example shown in FIG. 13, it is assumed that the mapping of SS/PBCH block candidates is a first type, and the number of symbol(s) of a control resource set associated with the type 0 PDCCH common search space set is 1. Here, as shown in FIG. 13, the SS/PBCH block 1300 may be mapped to OFDM symbols from #2 to #5, In addition, the SS/PBCH block 1310 may be mapped to OFDM symbols from #8 to #11. In addition, the SS/PBCH block 1320 may be mapped to OFDM symbols from #16 to #19. In addition, the SS/PBCH block 1330 may be mapped to OFDM symbols from #22 to #25. In addition, a monitoring occasion 1301 for type 0 PDCCH common search space (CSS) set may be mapped to OFDM symbol #6. In addition, a monitoring occasion 1311 for type 0 PDCCH CSS set may be mapped to OFDM symbol #12. In addition, a monitoring occasion 1321 for type 0 PDCCH CSS set may be mapped to OFDM symbol #20. In addition, a monitoring occasion 1331 for type 0 PDCCH CSS set may be mapped to OFDM symbol #26. In addition, a PDSCH 1302 with broadcast information may be mapped to OFDM symbols from #2 to #6. In addition, a PDSCH 1312 with broadcast information may be mapped to OFDM symbols from #8 to #12. In addition, a PDSCH 1322 with broadcast information may be mapped to OFDM symbols from #16 to #20. In addition, a PDSCH 1332 with broadcast information may be mapped to OFDM symbols from #22 to #26.

In the first condition, the monitoring occasion 1301 for type 0 PDCCH CSS set may be at least mapped to the OFDM symbol #6. In the first condition, the monitoring occasion 1311 for type 0 PDCCH CSS set may be at least mapped to the OFDM symbol #12. In the first condition, the monitoring occasion 1321 for type 0 PDCCH CSS set may be at least mapped to the OFDM symbol #20. In the first condition, the monitoring occasion 1331 for type 0 PDCCH CSS set may be at least mapped to the OFDM symbol #26.

In the first condition, the monitoring occasion 1301 for type 0 PDCCH CSS set may be mapped to an OFDM symbol that is right after the SS/PBCH block 1300. In the first condition, the monitoring occasion 1311 for type 0 PDCCH CSS set may be mapped to an OFDM symbol that is right after the SS/PBCH block 1310. In the first condition, the monitoring occasion 1321 for type 0 PDCCH CSS set may be mapped to an OFDM symbol that is right after the SS/PBCH block 1320. In the first condition, the monitoring occasion 1331 for type 0 PDCCH CSS set may be mapped to an OFDM symbol that is right after the SS/PBCH block 1330.

In the first condition, the SS/PBCH block 1300 may correspond to the monitoring occasion 1301 for type 0 PDCCH CSS set. In addition, in the first condition, the SS/PBCH block 1310 may correspond to the monitoring occasion 1311 for type 0 PDCCH CSS set. In addition, in the first condition, the SS/PBCH block 1320 may correspond to the monitoring occasion 1321 for type 0 PDCCH CSS set. In addition, in the first condition, the SS/PBCH block 1330 may correspond to the monitoring occasion 1331 for type 0 PDCCH CSS set.

In the first condition, the SS/PBCH block 1300 may correspond to the monitoring occasion 1311 for type 0 PDCCH CSS set. In addition, in the first condition, the SS/PBCH block 1310 may correspond to the monitoring occasion 1301 for type 0 PDCCH CSS set. In addition, in the first condition, the SS/PBCH block 1320 may correspond to the monitoring occasion 1331 for type 0 PDCCH CSS set. In addition, in the first condition, the SS/PBCH block 1330 may correspond to the monitoring occasion 1321 for type 0 PDCCH CSS set.

In the first condition, any of the SS/PBCH block 1300, the SS/PBCH block 1310, the SS/PBCH block 1320, and the SS/PBCH block 1330 may correspond to any of the monitoring occasion 1301 for type 0 PDCCH CSS set, the monitoring occasion 1311 for type 0 PDCCH CSS set, the monitoring occasion 1321 for type 0 PDCCH CSS set, and the monitoring occasion 1331 for type 0 PDCCH CSS set.

In the first condition, the index S+L−1 of the last OFDM symbol to which the PDSCH 1302 with broadcast information is mapped may be equal to the index of the OFDM symbol to which the monitoring occasion 1301 for type 0 PDCCH CSS set is mapped. In the first condition, the index S of the first OFDM symbol to which the PDSCH 1302 with broadcast information is mapped may be equal to the index of the first OFDM symbol of the SS/PBCH block 1300. In the first condition, the index S+L−1 of the last OFDM symbol to which the PDSCH 1312 with broadcast information is mapped may be equal to the index of the OFDM symbol to which the monitoring occasion 1311 for type 0 PDCCH CSS set is mapped. In the first condition, the index S of the first OFDM symbol to which the PDSCH 1312 with broadcast information is mapped may be equal to the index of the first OFDM symbol of the SS/PBCH block 1310. In the first condition, the index S+L−1 of the last OFDM symbol to which the PDSCH 1322 with broadcast information is mapped may be equal to the index of the OFDM symbol to which the monitoring occasion 1321 for type 0 PDCCH CSS set is mapped. In the first condition, the index S of the first OFDM symbol to which the PDSCH 1322 with broadcast information is mapped may be equal to the index of the first OFDM symbol of the SS/PBCH block 1320. In the first condition, the index S+L−1 of the last OFDM symbol to which the PDSCH 1332 with broadcast information is mapped may be equal to the index of the OFDM symbol to which the monitoring occasion 1331 for type 0 PDCCH CSS set is mapped. In the first condition, the index S of the first OFDM symbol to which the PDSCH 1332 with broadcast information is mapped may be equal to the index of the first OFDM symbol of the SS/PBCH block 1330.

Figure 14:
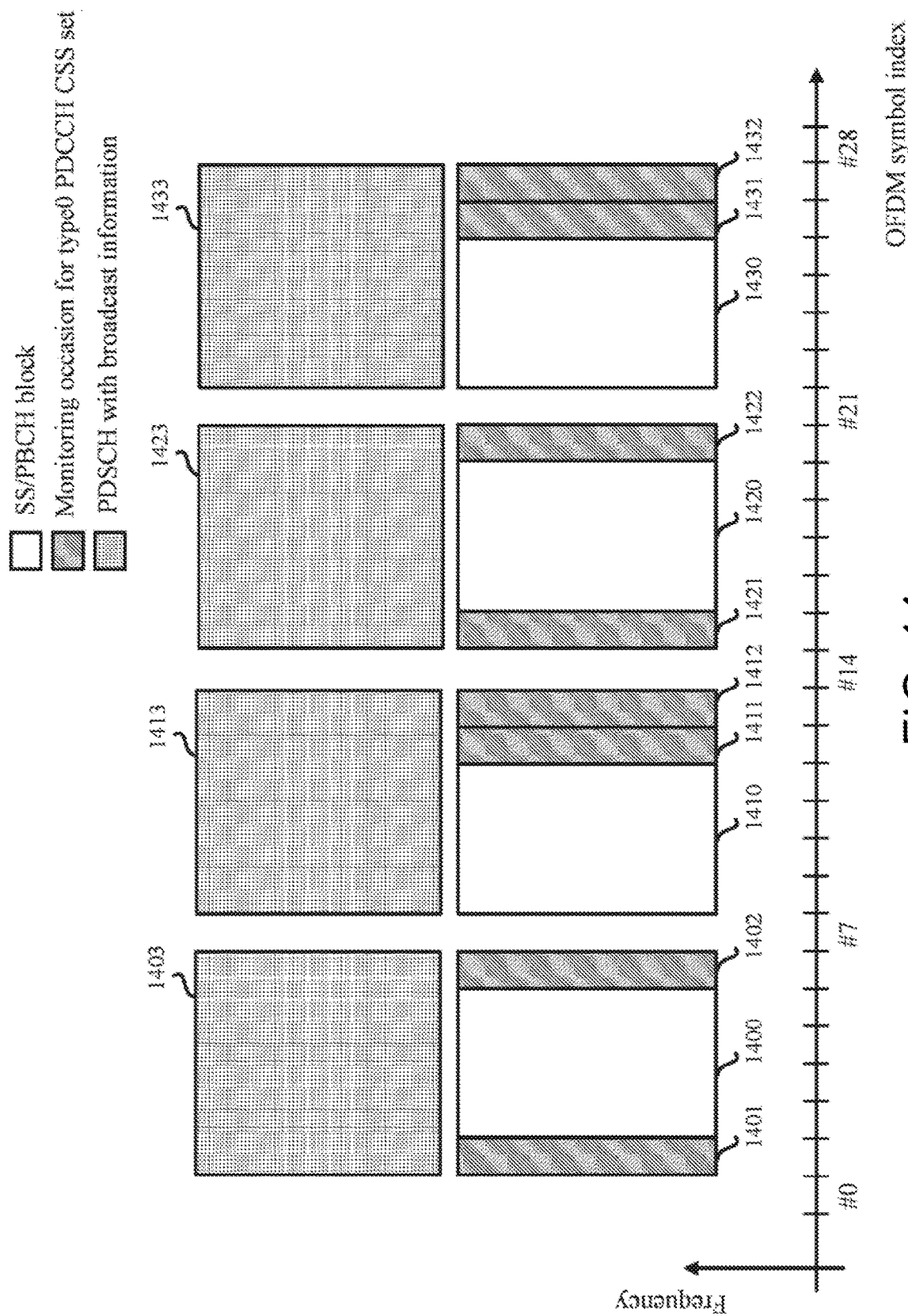
FIG. 14 is a diagram showing a mapping example of a DRS in a time-frequency domain according to one aspect of the present embodiment.

FIG. 14 is a diagram showing a mapping example of a DRS in a time-frequency domain according to one aspect of the present embodiment. In the example shown in FIG. 14, it is assumed that the mapping of SS/PBCH block candidates is a first type, and the number of symbol(s) of a control resource set associated with the type 0 PDCCH common search space set is 1. Here, as shown in FIG. 14, the SS/PBCH block 1400 may be mapped to OFDM symbols from #2 to #5. In addition, the SS/PBCH block 1410 may be mapped to OFDM symbols from #8 to #11. In addition, the SS/PBCH block 1420 may be mapped to OFDM symbols from #16 to #19. In addition, the SS/PBCH block 1430 may be mapped to OFDM symbols from #22 to #25. In addition, a monitoring occasion 1401 for type 0 PDCCH common search space (CSS) set may be mapped to OFDM symbol #1. In addition, a monitoring occasion 1402 for type 0 PDCCH common search space (CSS) set may be mapped to OFDM symbol #6. In addition, a monitoring occasion 1411 for type 0 PDCCH CSS set may be mapped to OFDM symbol #12. In addition, a monitoring occasion 1412 for type 0 PDCCH CSS set may be mapped to OFDM symbol #13. In addition, a monitoring occasion 1421 for type 0 PDCCH CSS set may be mapped to OFDM symbol #15. In addition, a monitoring occasion 1422 for type 0 PDCCH CSS set may be mapped to OFDM symbol #20. In addition, a monitoring occasion 1431 for type 0 PDCCH CSS set may be mapped to OFDM symbol #26. In addition, a monitoring occasion 1432 for type 0 PDCCH CSS set may be mapped to OFDM symbol #27. In addition, a PDSCH 1403 with broadcast information may be mapped to OFDM symbols from #1 to #6. In addition, a PDSCH 1413 with broadcast information may be mapped to OFDM symbols from #8 to #13. In addition, a PDSCH 1423 with broadcast information may be mapped to OFDM symbols from #15 to #20. In addition, a PDSCH 1433 with broadcast information may be mapped to OFDM symbols from #22 to #27.

In the first condition, the monitoring occasion 1401 for type 0 PDCCH CSS set may be at least mapped to the OFDM symbol #1. In the first condition, the monitoring occasion 1402 for type 0 PDCCH CSS set may be at least mapped to the OFDM symbol #6. In the first condition, the monitoring occasion 1411 for type 0 PDCCH CSS set may be at least mapped to the OFDM symbol #12. In the first condition, the monitoring occasion 1412 for type 0 PDCCH CSS set may be at least mapped to the OFDM symbol #13. In the first condition, the monitoring occasion 1421 for type 0 PDCCH CSS set may be at least mapped to the OFDM symbol #15. In the first condition, the monitoring occasion 1422 for type 0 PDCCH CSS set may be at least mapped to the OFDM symbol #20. In the first condition, the monitoring occasion 1431 for type 0 PDCCH CSS set may be at least mapped to the OFDM symbol #26. In the first condition, the monitoring occasion 1432 for type 0 PDCCH CSS set may be at least mapped to the OFDM symbol #27.

In the first condition, the monitoring occasion 1401 for type 0 PDCCH CSS set may be mapped to an OFDM symbol that is right before the SS/PBCH block 1400. In the first condition, the monitoring occasion 1402 for type 0 PDCCH CSS set may be mapped to an OFDM symbol that is right after the SS/PBCH block 1400. In the first condition, the monitoring occasion 1411 for type 0 PDCCH CSS set may be mapped to an OFDM symbol that is right after the SS/PBCH block 1410. In the first condition, the monitoring occasion 1412 for type 0 PDCCH CSS set may be mapped to an OFDM symbol that is right after the monitoring occasion 1411 for type 0 PDCCH CSS set. In the first condition, the monitoring occasion 1421 for type 0 PDCCH CSS set may be mapped to an OFDM symbol that is right before the SS/PBCH block 1420. In the first condition, the monitoring occasion 1422 for type 0 PDCCH CSS set may be mapped to an OFDM symbol that is right after the SS/PBCH block 1420. In the first condition, the monitoring occasion 1431 for type 0 PDCCH CSS set may be mapped to an OFDM symbol that is right after the SS/PBCH block 1430. In the first condition, the monitoring occasion 1432 for type 0 PDCCH CSS set may be mapped to an OFDM symbol that is right after the monitoring occasion 1431 for type 0 PDCCH CSS set.

In the first condition, the SS/PBCH block 1400 may correspond to the monitoring occasion 1401 for type 0 PDCCH CSS set. In addition, in the first condition, the SS/PBCH block 1400 may correspond to the monitoring occasion 1402 for type 0 PDCCH CSS set. In addition, in the first condition, the SS/PBCH block 1410 may correspond to the monitoring occasion 1411 for type 0 PDCCH CSS set. In addition, in the first condition, the SS/PBCH block 1410 may correspond to the monitoring occasion 1412 for type 0 PDCCH CSS set. In addition, in the first condition, the SS/PBCH block 1420 may correspond to the monitoring occasion 1421 for type 0 PDCCH CSS set. In addition, in the first condition, the SS/PBCH block 1420 may correspond to the monitoring occasion 1422 for type 0 PDCCH CSS set. In addition, in the first condition, the SS/PBCH block 1430 may correspond to the monitoring occasion 1431 for type 0 PDCCH CSS set. In addition, in the first condition, the SS/PBCH block 1430 may correspond to the monitoring occasion 1432 for type 0 PDCCH CSS set.

In the first condition, any of the SS/PBCH block 1400, the SS/PBCH block 1410, the SS/PBCH block 1420, and the SS/PBCH block 1430 may correspond to any of the monitoring occasion 1401 for type 0 PDCCH CSS set, the monitoring occasion 1402 for type 0 PDCCH CSS set, the monitoring occasion 1411 for type 0 PDCCH CSS set, the monitoring occasion 1412 for type 0 PDCCH CSS set, the monitoring occasion 1421 for type 0 PDCCH CSS set, the monitoring occasion 1422 for type 0 PDCCH CSS set, the monitoring occasion 1431 for type 0 PDCCH CSS set, and the monitoring occasion 1432 for type 0 PDCCH CSS set.

In the first condition, the index S of the first OFDM symbol to which the PDSCH 1403 with broadcast information is mapped may be equal to the index of the OFDM symbol to which the monitoring occasion 1401 for type 0 PDCCH CSS set is mapped. In the first condition, the index S of the first OFDM symbol to which the PDSCH 1403 with broadcast information is mapped may be equal to the index of the OFDM symbol to which the SS/PBCH block 1400 is mapped. In the first condition, the index S+L−1 of the last OFDM symbol to which the PDSCH 1403 with broadcast information is mapped may be equal to the index of the last OFDM symbol of the SS/PBCH block 1400. In the first condition, the index S+L−1 of the last OFDM symbol to which the PDSCH 1403 with broadcast information is mapped may be equal to the index of the OFDM symbol of the monitoring occasion 1402 for type 0 PDCCH CSS set is mapped. In the first condition, the index S+L−1 of the last OFDM symbol to which the PDSCH 1413 with broadcast information is mapped may be equal to the index of the OFDM symbol to which the monitoring occasion 1411 for type 0 PDCCH CSS set is mapped. In the first condition, the index S+L−1 of the last OFDM symbol to which the PDSCH 1413 with broadcast information is mapped may be equal to the index of the OFDM symbol to which the monitoring occasion 1412 for type 0 PDCCH CSS set is mapped. In the first condition, the index S of the first OFDM symbol to which the PDSCH 1413 with broadcast information is mapped may be equal to the index of the first OFDM symbol of the SS/PBCH block 1410. In the first condition, the index S of the first OFDM symbol to which the PDSCH 1423 with broadcast information is mapped may be equal to the index of the OFDM symbol to which the monitoring occasion 1421 for type 0 PDCCH CSS set is mapped. In the first condition, the index S of the first OFDM symbol to which the PDSCH 1423 with broadcast information is mapped may be equal to the index of the first OFDM symbol of the SS/PBCH block 1420. In the first condition, the index S+L−1 of the last OFDM symbol to which the PDSCH 1423 with broadcast information is mapped may be equal to the index of the OFDM symbol to which the monitoring occasion 1422 for type 0 PDCCH CSS set is mapped. In the first condition, the index S+L−1 of the last OFDM symbol to which the PDSCH 1423 with broadcast information is mapped may be equal to the index of the last OFDM symbol of the SS/PBCH block 1420. In the first condition, the index S+L−1 of the last OFDM symbol to which the PDSCH 1433 with broadcast information is mapped may be equal to the index of the OFDM symbol to which the monitoring occasion 1431 for type 0 PDCCH CSS set is mapped. In the first condition, the index S+L−1 of the last OFDM symbol to which the PDSCH 1433 with broadcast information is mapped may be equal to the index of the OFDM symbol to which the monitoring occasion 1132 for type 0 PDCCH CSS set is mapped. In the first condition, the index S+L−1 of the last OFDM symbol to which the PDSCH 1433 with broadcast information is mapped may be equal to the index of the last OFDM symbol to which the SS/PBCH block 1430 is mapped. In the first condition, the index S of the first OFDM symbol to which the PDSCH 1433 with broadcast information is mapped may be equal to the index of the first OFDM symbol of the SS/PBCH block 1430.

Here, the OFDM symbol right before the monitoring occasion for the search space set may be an OFDM symbol corresponding to an index smaller by one than the index of the first OFDM symbol to which the monitoring occasion for the search space set is mapped. In addition, the OFDM symbol right after the monitoring occasion for the search space set may be an OFDM symbol corresponding to an index larger by one than the index of the ending OFDM symbol to which the monitoring occasion for the search space set is mapped. In addition, the OFDM symbol right before the monitoring occasion for the search space set may be an OFDM symbol adjacent to the first OFDM symbol to which the monitoring occasion for the search space set is mapped. In addition, the OFDM symbol right before the monitoring occasion for the search space set may be an adjacent OFDM symbol before the first OFDM symbol to which the monitoring occasion for the search space set is mapped. In addition, the OFDM symbol right after the monitoring occasion for the search space set may be an OFDM symbol adjacent to the ending OFDM symbol to which the monitoring occasion for the search space set is mapped. In addition, the OFDM symbol right after the monitoring occasion for the search space set may be an adjacent OFDM symbol after the ending OFDM symbol to which the monitoring occasion for the search space set is mapped.

Figure 15:
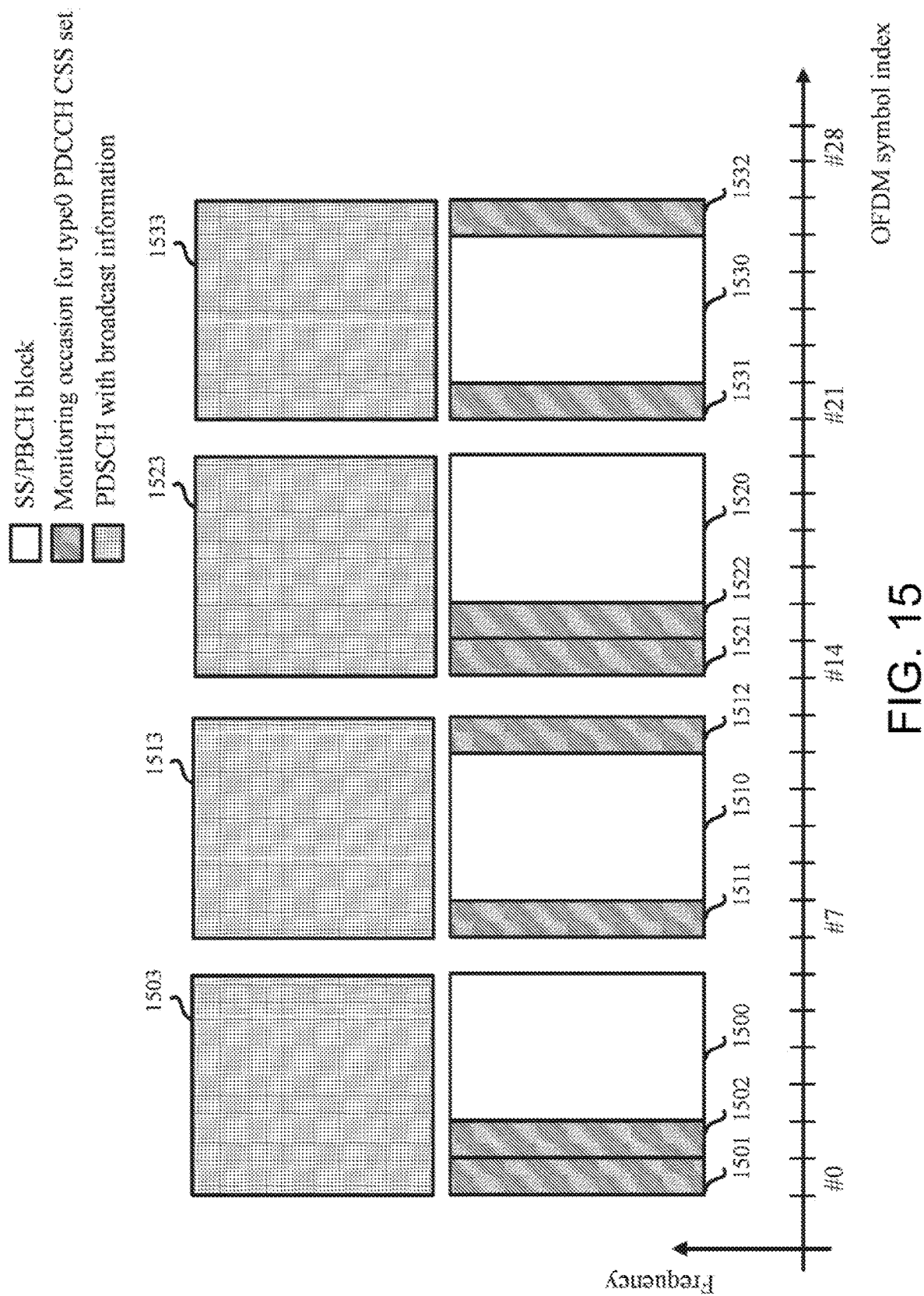
FIG. 15 is a diagram showing a mapping example of a DRS in a time-frequency domain according to one aspect of the present embodiment.

FIG. 15 is a diagram showing a mapping example of a DRS in a time-frequency domain according to one aspect of the present embodiment. In the example shown in FIG. 15, it is assumed that the mapping of SS/PBCH block candidates is a first type, and the number of symbol(s) of a control resource set associated with the type 0 PDCCH common search space set is 1. Here, as shown in FIG. 15, the SS/PBCH block 1500 may be at least mapped to OFDM symbols from #2 to #5. In addition, the SS/PBCH block 1510 may be at least mapped to OFDM symbols from #8 to #11. In addition, the SS/PBCH block 1520 may be at least mapped to OFDM symbols from #16 to #19. In addition, the SS/PBCH block 1530 may be at least mapped to OFDM symbols from #22 to #25. In addition, a monitoring occasion 1501 for type 0 PDCCH CSS set may be at least mapped to OFDM symbol #0. In addition, a monitoring occasion 1502 for type 0 PDCCH CSS set may be at least mapped to OFDM symbol #1. In addition, a monitoring occasion 1511 for type 0 PDCCH CSS set may be at least mapped to OFDM symbol #7. In addition, a monitoring occasion 1512 for type 0 PDCCH CSS set may be at least mapped to OFDM symbol #12. In addition, a monitoring occasion 1521 for type 0 PDCCH CSS set may be at least mapped to OFDM symbol #14. In addition, a monitoring occasion 1522 for type 0 PDCCH CSS set may be at least mapped to OFDM symbol #15. In addition, a monitoring occasion 1531 for type 0 PDCCH CSS set may be at least mapped to OFDM symbol #21. In addition, a monitoring occasion 1532 for type 0 PDCCH CSS set may be at least mapped to OFDM symbol #26. In addition, a PDSCH 1503 with broadcast information may be at least mapped to OFDM symbols from #0 to #5. In addition, a PDSCH 1513 with broadcast information may be at least mapped to OFDM symbols from #7 to #12. In addition, a PDSCH 1523 with broadcast information may be at least mapped to OFDM symbols from #14 to #19. In addition, a PDSCH 1533 with broadcast information may be at least mapped to OFDM symbols from #21 to #26.

In the first condition, the monitoring occasion 1501 for type 0 PDCCH CSS set may be at least mapped to the OFDM symbol #0. In the first condition, the monitoring occasion 1502 for type 0 PDCCH CSS set may be at least mapped to the OFDM symbol #1. In the first condition, the monitoring occasion 1511 for type 0 PDCCH CSS set may be at least mapped to the OFDM symbol #7. In the first condition, the monitoring occasion 1512 for type 0 PDCCH CSS set may be at least mapped to the OFDM symbol #12. In the first condition, the monitoring occasion 1521 for type 0 PDCCH CSS set may be at least mapped to the OFDM symbol #14. In the first condition, the monitoring occasion 1522 for type 0 PDCCH CSS set may be at least mapped to the OFDM symbol #15. In the first condition, the monitoring occasion 1531 for type 0 PDCCH CSS set may be at least mapped to the OFDM symbol #21. In the first condition, the monitoring occasion 1532 for type 0 PDCCH CSS set may be at least mapped to the OFDM symbol #26.

In the first condition, the monitoring occasion 1501 for type 0 PDCCH CSS set may be mapped to an OFDM symbol that is right before the monitoring occasion 1502 for type 0 PDCCH CSS set. In the first condition, the monitoring occasion 1502 for type 0 PDCCH CSS set may be mapped to an OFDM symbol that is right after the SS/PBCH block 1500. In the first condition, the monitoring occasion 1511 for type 0 PDCCH CSS set may be mapped to an OFDM symbol that is right before the SS/PBCH block 1510. In the first condition, the monitoring occasion 1512 for type 0 PDCCH CSS set may be mapped to an OFDM symbol that is right after the SS/PBCH block 1510. In the first condition, the monitoring occasion 1521 for type 0 PDCCH CSS set may be mapped to an OFDM symbol that is right before the monitoring occasion 1522 for type 0 PDCCH CSS set. In the first condition, the monitoring occasion 1522 for type 0 PDCCH CSS set may be mapped to an OFDM symbol that is right before the SS/PBCH block 1520. In the first condition, the monitoring occasion 1531 for type 0 PDCCH CSS set may be mapped to an OFDM symbol that is right before the SS/PBCH block 1530.

In the first condition, the SS/PBCH block 1500 may correspond to the monitoring occasion 1501 for type 0 PDCCH CSS set. In addition, in the first condition, the SS/PBCH block 1500 may correspond to the monitoring occasion 1502 for type 0 PDCCH CSS set. In addition, in the first condition, the SS/PBCH block 1510 may correspond to the monitoring occasion 1511 for type 0 PDCCH CSS set. In addition, in the first condition, the SS/PBCH block 1510 may correspond to the monitoring occasion 1512 for type 0 PDCCH CSS set. In addition, in the first condition, the SS/PBCH block 1520 may correspond to the monitoring occasion 1521 for type 0 PDCCH CSS set. In addition, in the first condition, the SS/PBCH block 1520 may correspond to the monitoring occasion 1522 for type 0 PDCCH CSS set. In addition, in the first condition, the SS/PBCH block 1530 may correspond to the monitoring occasion 1531 for type 0 PDCCH CSS set. In addition, in the first condition, the SS/PBCH block 1530 may correspond to the monitoring occasion 1532 for type 0 PDCCH CSS set.

In the first condition, any of the SS/PBCH block 1500, the SS/PBCH block 1510, the SS/PBCH block 1520, and the SS/PBCH block 1530 may correspond to any of the monitoring occasion 1501 for type 0 PDCCH CSS set, the monitoring occasion 1502 for type 0 PDCCH CSS set, the monitoring occasion 1511 for type 0 PDCCH CSS set, the monitoring occasion 1512 for type 0 PDCCH CSS set, the monitoring occasion 1521 for type 0 PDCCH CSS set, the monitoring occasion 1522 for type 0 PDCCH CSS set, the monitoring occasion 1531 for type 0 PDCCH CSS set, and the monitoring occasion 1532 for type 0 PDCCH CSS set.

In the first condition, the index S of the first OFDM symbol to which the PDSCH 1503 with broadcast information is mapped may be equal to the index of the OFDM symbol to which the monitoring occasion 1501 for type 0 PDCCH CSS set is mapped. In the first condition, the index S of the first OFDM symbol to which the PDSCH 1503 with broadcast information is mapped may be equal to the index of the OFDM symbol to which the monitoring occasion 1502 for type 0 PDCCH CSS set is mapped. In the first condition, the index S of the first OFDM symbol to which the PDSCH 1503 with broadcast information is mapped may be equal to the index of the OFDM symbol to which the SS/PBCH block 1500 is mapped. In the first condition, the index S of the first OFDM symbol to which the PDSCH 1513 with broadcast information is mapped may be equal to the index of the OFDM symbol to which the monitoring occasion 1511 for type 0 PDCCH CSS set is mapped. In the first condition, the index S of the first OFDM symbol to which the PDSCH 1513 with broadcast information is mapped may be equal to the index of the OFDM symbol to which the SS/PBCH block 1510 is mapped. In the first condition, the index S+L−1 of the last OFDM symbol to which the PDSCH 1513 with broadcast information is mapped may be equal to the index of the OFDM symbol to which the monitoring occasion 1512 for type 0 PDCCH CSS set is mapped. In the first condition, the index S+L−1 the last OFDM symbol to which the PDSCH 1513 with broadcast information is mapped may be equal to the index of the first OFDM symbol of the SS/PBCH block 1510. In the first condition, the index S of the first OFDM symbol to which the PDSCH 1523 with broadcast information is mapped may be equal to the index of the OFDM symbol to which the monitoring occasion 1521 for type 0 PDCCH CSS set is mapped. In the first condition, the index S of the first OFDM symbol to which the PDSCH 1523 with broadcast information is mapped may be equal to the index of the first OFDM symbol of the monitoring occasion 1522 for type 0 PDCCH CSS set. In the first condition, the index S of the first OFDM symbol to which the PDSCH 1523 with broadcast information is mapped may be equal to the index of the OFDM symbol to which the SS/PBCH block 1520 is mapped. In the first condition, the index S of the last OFDM symbol to which the PDSCH 1523 with broadcast information is mapped may be equal to the index of the last OFDM symbol of the SS/PBCH block 1520. In the first condition, the index S of the first OFDM symbol to which the PDSCH 1533 with broadcast information is mapped may be equal to the index of the OFDM symbol to which the monitoring occasion 1531 for type 0 PDCCH CSS set is mapped. In the first condition, the index S of the first OFDM symbol to which the PDSCH 1533 with broadcast information is mapped may be equal to the index of the OFDM symbol to which the SS/PBCH block 1530 is mapped. In the first condition, the index S+L−1 of the last OFDM symbol to which the PDSCH 1533 with broadcast information is mapped may be equal to the index of the last OFDM symbol to which the SS/PBCH block 1530 is mapped. In the first condition, the index S+L−1 of the last OFDM symbol to which the PDSCH 1533 with broadcast information is mapped may be equal to the index of the first OFDM symbol of the monitoring occasion 1532 for type PDCCH CSS set is mapped.

Figure 16:
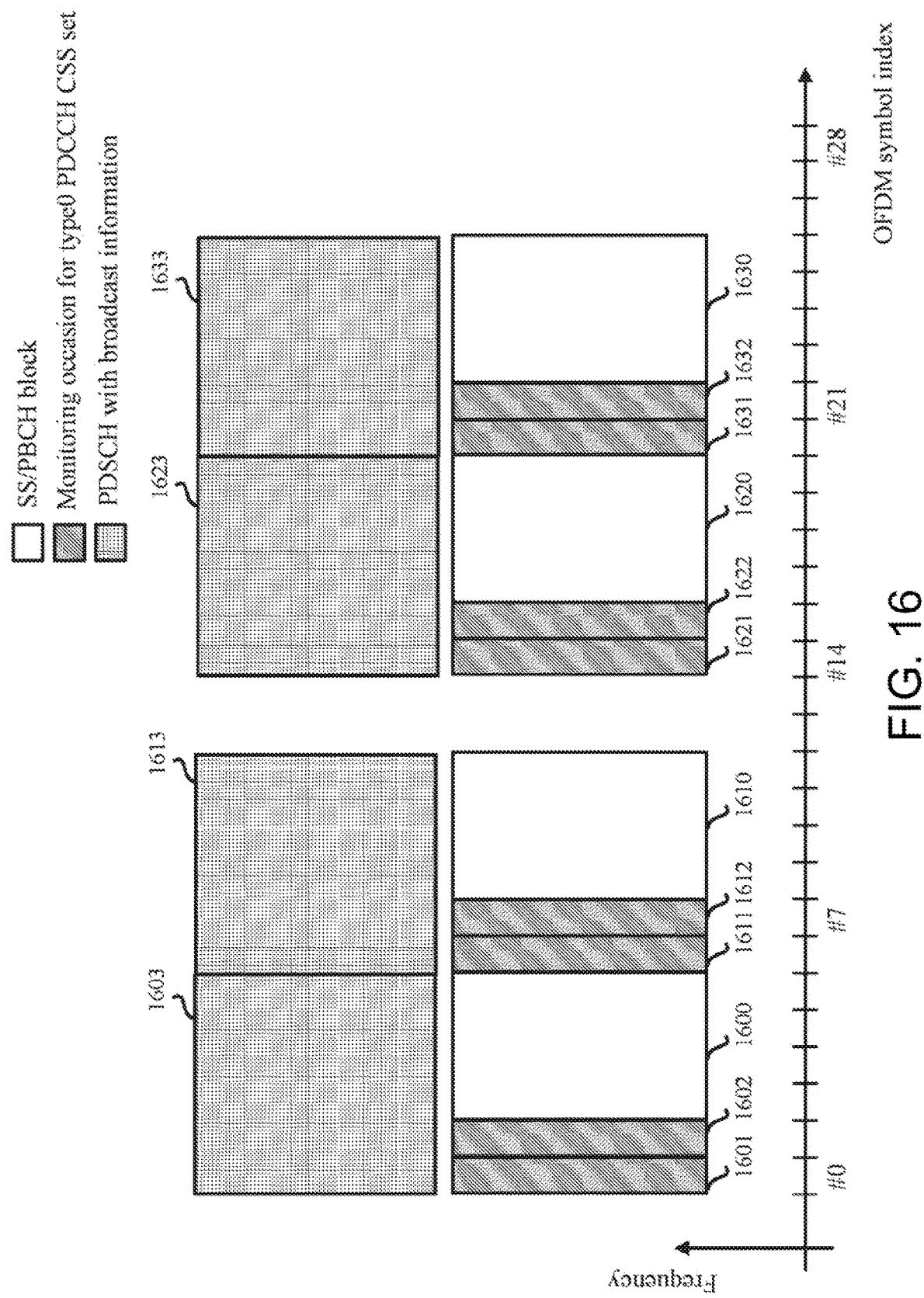
FIG. 16 is a diagram showing a mapping example of a DRS in a time-frequency domain according to one aspect of the present embodiment.

FIG. 16 is a diagram showing a mapping example of a DRS in a time-frequency domain according to one aspect of the present embodiment. In the example shown in FIG. 16, it is assumed that the mapping of SS/PBCH block candidates is a first type, and the number of symbol(s) of a control resource set associated with the type 0 PDCCH common search space set is 1. Here, as shown in FIG. 14, the SS/PBCH block 1600 may be at least mapped to OFDM symbols from #2 to #5. In addition, the SS/PBCH block 1610 may be at least mapped to OFDM symbols from #8 to #11. In addition, the SS/PBCH block 1620 may be at least mapped to OFDM symbols from #16 to #19. In addition, the SS/PBCH block 1630 may be at least mapped to OFDM symbols from #22 to #25. In addition, a monitoring occasion 1601 for type 0 PDCCH CSS set may be at least mapped to OFDM symbol #0. In addition, a monitoring occasion 1602 for type 0 PDCCH CSS set may be at least mapped to OFDM symbol #1. In addition, a monitoring occasion 1611 for type 0 PDCCH CSS set may be at least mapped to OFDM symbol #6. In addition, a monitoring occasion 1612 for type 0 PDCCH CSS set may be at least mapped to OFDM symbol #7. In addition, a monitoring occasion 1621 for type 0 PDCCH CSS set may be at least mapped to OFDM symbol 414. In addition, a monitoring occasion 1622 for type 0 PDCCH CSS set may be at least mapped to OFDM symbol #15. In addition, a monitoring occasion 1631 for type 0 PDCCH CSS set may be at least mapped to OFDM symbol #20. In addition, a monitoring occasion 1632 for type 0 PDCCH CSS set may be at least mapped to OFDM symbol #21. In addition, a PDSCH 1603 with broadcast information may be at least mapped to OFDM symbols from #0 to #5. In addition, a PDSCH 1613 with broadcast information may be at least mapped to OFDM symbols from #6 to #11. In addition, a PDSCH 1623 with broadcast information may be at least mapped to OFDM symbols from #14 to #19. In addition, a PDSCH 1633 with broadcast information may be at least mapped to OFDM symbols from #20 to #25.

In the first condition, the monitoring occasion 1601 for type 0 PDCCH CSS set may be at least mapped to the OFDM symbol #0. In the first condition, the monitoring occasion 1602 for type 0 PDCCH CSS set may be at least mapped to the OFDM symbol #1. In the first condition, the monitoring occasion 1611 for type 0 PDCCH CSS set may be at least mapped to the OFDM symbol #6. In the first condition, the monitoring occasion 1612 for type 0 PDCCH CSS set may be at least mapped to the OFDM symbol #7. In the first condition, the monitoring occasion 1621 for type 0 PDCCH CSS set may be at least mapped to the OFDM symbol #14. In the first condition, the monitoring occasion 1622 for type 0 PDCCH CSS set may be at least mapped to the OFDM symbol #15. In the first condition, the monitoring occasion 1631 for type 0 PDCCH CSS set may be at least mapped to the OFDM symbol #20. In the first condition, the monitoring occasion 1632 for type 0 PDCCH CSS set may be at least mapped to the OFDM symbol #21.

In the first condition, the monitoring occasion 1601 for type 0 PDCCH CSS set may be mapped to an OFDM symbol that is right before the monitoring occasion 1602 for type 0 PDCCH CSS set. In the first condition, the monitoring occasion 1602 for type 0 PDCCH CSS set may be mapped to an OFDM symbol that is right before the SS/PBCH block 1600. In the first condition, the monitoring occasion 1611 for type 0 PDCCH CSS set may be mapped to an OFDM symbol that is right after the SS/PBCH block 1600. In the first condition, the monitoring occasion 1612 for type 0 PDCCH CSS set may be mapped to an OFDM symbol that is right before the SS/PBCH block 1610. In the first condition, the monitoring occasion 1621 for type 0 PDCCH CSS set may be mapped to an OFDM symbol that is right before the monitoring occasion 1622 for type 0 PDCCH CSS set. In the first condition, the monitoring occasion 1622 for type 0 PDCCH CSS set may be mapped to an OFDM symbol that is right before the SS/PBCH block 1620. In the first condition, the monitoring occasion 1631 for type 0 PDCCH CSS set may be mapped to an OFDM symbol that is right after the SS/PBCH block 1620. In the first condition, the monitoring occasion 1632 for type 0 PDCCH CSS set may be mapped to an OFDM symbol that is right before the SS/PBCH block 1630.

In the first condition, the SS/PBCH block 1600 may correspond to the monitoring occasion 1601 for type 0 PDCCH CSS set. In addition, in the first condition, the SS/PBCH block 1600 may correspond to the monitoring occasion 1602 for type 0 PDCCH CSS set. In addition, in the first condition, the SS/PBCH block 1610 may correspond to the monitoring occasion 1611 for type 0 PDCCH CSS set. In addition, in the first condition, the SS/PBCH block 1610 may correspond to the monitoring occasion 1612 for type 0 PDCCH CSS set. In addition, in the first condition, the SS/PBCH block 1620 may correspond to the monitoring occasion 1621 for type 0 PDCCH CSS set. In addition, in the first condition, the SS/PBCH block 1620 may correspond to the monitoring occasion 1622 for type 0 PDCCH CSS set. In addition, in the first condition, the SS/PBCH block 1630 may correspond to the monitoring occasion 1631 for type 0 PDCCH CSS set. In addition, in the first condition, the SS/PBCH block 1630 may correspond to the monitoring occasion 1632 for type 0 PDCCH CSS set.

In the first condition, any of the SS/PBCH block 1600, the SS/PBCH block 1610, the SS/PBCH block 1620, and the SS/PBCH block 1630 may correspond to any of the monitoring occasion 1601 for type 0 PDCCH CSS set, the monitoring occasion 1602 for type 0 PDCCH CSS set, the monitoring occasion 1611 for type 0 PDCCH CSS set, the monitoring occasion 1612 for type 0 PDCCH CSS set, the monitoring occasion 1621 for type 0 PDCCH CSS set, the monitoring occasion 1622 for type 0 PDCCH CSS set, the monitoring occasion 1631 for type 0 PDCCH CSS set, and the monitoring occasion 1632 for type 0 PDCCH CSS set.

In the first condition, the index S of the first OFDM symbol to which the PDSCH 1603 with broadcast information is mapped may be equal to the index of the OFDM symbol to which the monitoring occasion 1601 for type 0 PDCCH CSS set is mapped. In the first condition, the index S of the first OFDM symbol to which the PDSCH 1603 with broadcast information is mapped may be equal to the index of the OFDM symbol to which the monitoring occasion 1602 for type 0 PDCCH CSS set is mapped. In the first condition, the index S of the first OFDM symbol to which the PDSCH 1603 with broadcast information is mapped may be equal to the index of the OFDM symbol to which the SS/PBCH block 1600 is mapped. In the first condition, the index S of the first OFDM symbol to which the PDSCH 1613 with broadcast information is mapped may be equal to the index of the OFDM symbol to which the monitoring occasion 1611 for type 0 PDCCH CSS set is mapped. In the first condition, the index S of the first OFDM symbol to which the PDSCH 1613 with broadcast information is mapped may be equal to the index of the OFDM symbol to which the monitoring occasion 1612 for type 0 PDCCH CSS set is mapped. In the first condition, the index S of the first OFDM symbol to which the PDSCH 1613 with broadcast information is mapped may be equal to the index of the OFDM symbol to which the SS/PBCH block 1610 is mapped. In the first condition, the index S of the first OFDM symbol to which the PDSCH 1623 with broadcast information is mapped may be equal to the index of the OFDM symbol to which the monitoring occasion 1621 for type 0 PDCCH CSS set is mapped. In the first condition, the index S of the first OFDM symbol to which the PDSCH 1623 with broadcast information is mapped may be equal to the index of the OFDM symbol to which the monitoring occasion 1622 for type 0 PDCCH CSS set is mapped. In the first condition, the index S of the first OFDM symbol to which the PDSCH 1623 with broadcast information is mapped may be equal to the index of the OFDM symbol to which the SS/PBCH block 1620 is mapped. In the first condition, the index S of the first OFDM symbol to which the PDSCH 1633 with broadcast information is mapped may be equal to the index of the OFDM symbol to which the monitoring occasion 1631 for type 0 PDCCH CSS set is mapped. In the first condition, the index S of the first OFDM symbol to Which the PDSCH 1633 with broadcast information is mapped may be equal to the index of the OFDM symbol to which the monitoring occasion 1632 for type 0 PDCCH CSS set is mapped. In the first condition, the index S of the first OFDM symbol to which the PDSCH 1633 with broadcast information is mapped may be equal to the index of the OFDM symbol to which the SS/PBCH block 1630 is mapped.

Figure 17:
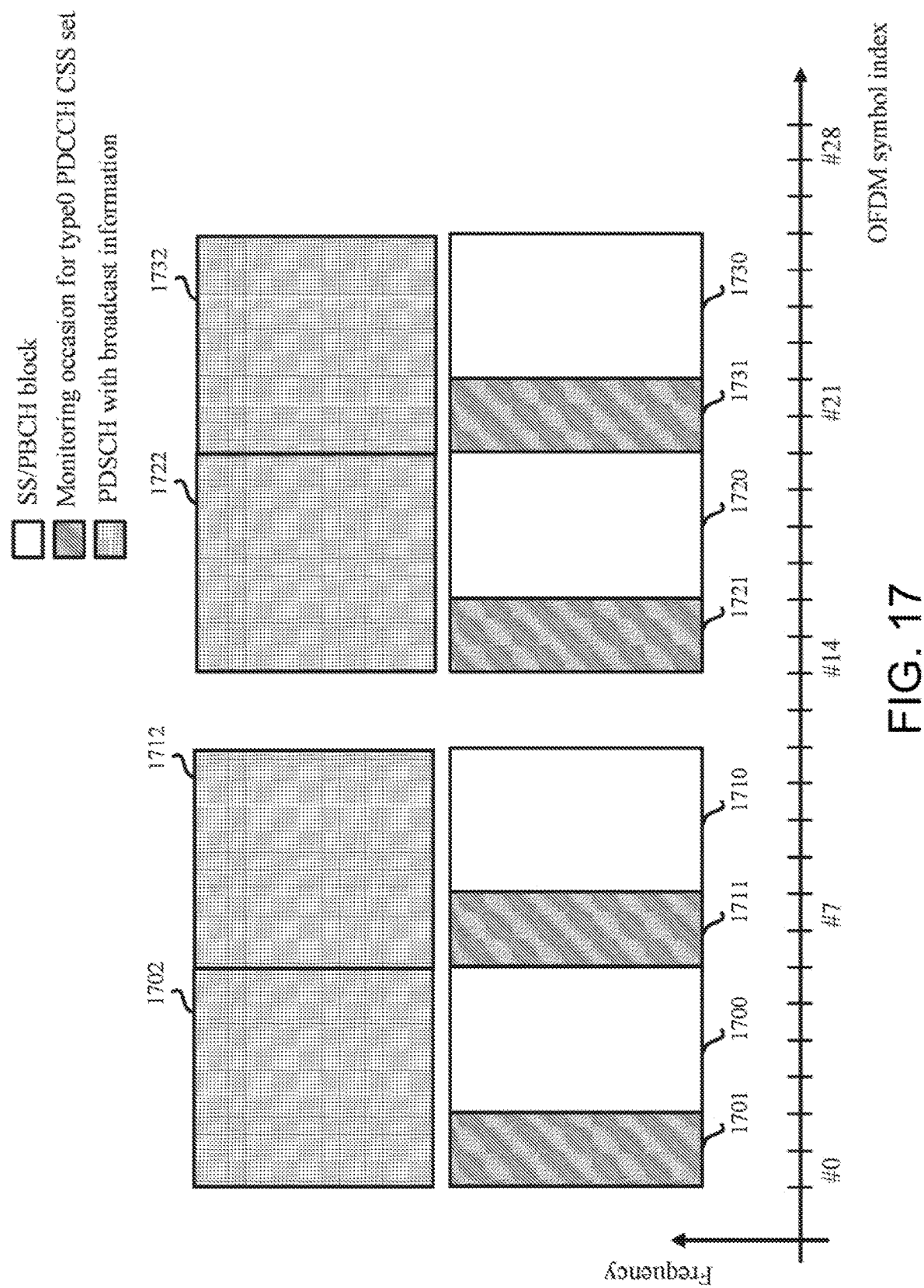
FIG. 17 is a diagram showing a mapping example of a DRS in a time-frequency domain according to one aspect of the present embodiment.

FIG. 17 is a diagram showing a mapping example of a DRS in a time-frequency domain according to one aspect of the present embodiment. In the example shown in FIG. 17, it is assumed that the mapping of SS/PBCH block candidates is a first type, and the number of symbol(s) of a control resource set associated with the type 0 PDCCH common search space set is 2. Here, as shown in FIG. 17, the SS/PBCH block 1700 may be at least mapped to OFDM symbols from #2 to #5. In addition, the SS/PBCH block 1710 may be at least mapped to OFDM symbols from #8 to #11. In addition, the SS/PBCH block 1720 may be at least mapped to OFDM symbols from #16 to #19. In addition, the SS/PBCH block 1730 may be at least mapped to OFDM symbols from #22 to #25. In addition, a monitoring occasion 1701 for type 0 PDCCH CSS set may be at least mapped to OFDM symbols from #0 to #1. In addition, a monitoring occasion 1711 for type 0 PDCCH CSS set may be at least mapped to OFDM symbols from #6 to #7. In addition, a monitoring occasion 1721 for type 0 PDCCH CSS set may be at least mapped to OFDM symbols from #14 to #15. In addition, a monitoring occasion 1731 for type 0 PDCCH CSS set may be at least mapped to OFDM symbols from #20 to #21. In addition, a PDSCH 1702 with broadcast information may be at least mapped to OFDM symbols from #0 to #5. In addition, a PDSCH 1712 with broadcast information may be at least mapped to OFDM symbols from #6 to #11. In addition, a PDSCH 1722 with broadcast information may be at least mapped to OFDM symbols from #14 to #19. In addition, a PDSCH 1732 with broadcast information may be at least mapped to OFDM symbols from #20 to #25.

In a second condition, the monitoring occasion 1701 for type 0 PDCCH CSS set may be at least mapped to the OFDM symbols from #0 to #1. In the second condition, the monitoring occasion 1711 for type 0 PDCCH CSS set may be at least mapped to the OFDM symbols from #6 to #7. In the second condition, the monitoring occasion 1721 for type 0 PDCCH CSS set may be at least mapped to the OFDM symbols from #14 to #15. In the second condition, the monitoring occasion 1731 for type 0 PDCCH CSS set may be at least mapped to the OFDM symbols from #20 to #21.

The second condition may satisfy at least some or all of the following Conditions 2A to 2C.

Condition 2A: the mapping of the SS/PBCH block candidates is the first type.

Condition 2B: the number of OFDM symbol(s) of a control resource set associated with the type 0 PDCCH common search space set is 2.

Condition 2C: the operation is performed in an unlicensed band.

In the second condition, the monitoring occasion 1701 for type 0 PDCCH CSS set may be mapped to an OFDM symbol that is right before the SS/PBCH block 1700. In the second condition, the monitoring occasion 1711 for type 0 PDCCH CSS set may be mapped to an OFDM symbol that is right before the SS/PBCH block 1710. In the second condition, the monitoring occasion 1721 for type 0 PDCCH CSS set may be mapped to an OFDM symbol that is right before the SS/PBCH block 1720. In the second condition, the monitoring occasion 1731 for type 0 PDCCH CSS set may be mapped to an OFDM symbol that is right before the SS/PBCH block 1730.

In the second condition, the SS/PBCH block 1700 may correspond to the monitoring occasion 1701 for type 0 PDCCH CSS set. In addition, in the second condition, the SS/PBCH block 1710 may correspond to the monitoring occasion 1711 for type 0 PDCCH CSS set. In addition, in the second condition, the SS/PBCH block 1720 may correspond to the monitoring occasion 1721 for type 0 PDCCH CSS set. In addition, in the second condition, the SS/PBCH block 1730 may correspond to the monitoring occasion 1731 for type 0 PDCCH CSS set.

In the second condition, the SS/PBCH block 1700 may correspond to the monitoring occasion 1711 for type 0 PDCCH CSS set. In addition, in the second condition, the SS/PBCH block 1710 may correspond to the monitoring occasion 1701 for type 0 PDCCH CSS set. In addition, in the second condition, the SS/PBCH block 1720 may correspond to the monitoring occasion 1731 for type 0 PDCCH CSS set. In addition, in the second condition, the SS/PBCH block 1730 may correspond to the monitoring occasion 1721 for type 0 PDCCH CSS set.

In the second condition, any of the SS/PBCH block 1700, the SS/PBCH block 1710, the SS/PBCH block 1720, and the SS/PBCH block 1730 may correspond to any of the monitoring occasion 1701 for type 0 PDCCH CSS set, the monitoring occasion 1711 for type 0 PDCCH CSS set, the monitoring occasion 1721 for type 0 PDCCH CSS set, and the monitoring occasion 1731 for type 0 PDCCH CSS set.

In the second condition, the index S of the first OFDM symbol to which the PDSCH 1702 with broadcast information is mapped may be equal to the index of the first OFDM symbol to which the monitoring occasion 1701 for type 0 PDCCH CSS set is mapped. In the second condition, the index S of the second OFDM symbol to which the PDSCH 1702 with broadcast information is mapped may be equal to the index of the first OFDM symbol of the SS/PBCH block 1700. In the second condition, the index S of the first OFDM symbol to which the PDSCH 1712 with broadcast information is mapped may be equal to the index of the first OFDM symbol to which the monitoring occasion 1711 for type 0 PDCCH CSS set is mapped. In the second condition, the index S of the first OFDM symbol to which the PDSCH 1712 with broadcast information is mapped may be equal to the index of the first OFDM symbol of the SS/PBCH block 1710. In the second condition, the index S of the first OFDM symbol to which the PDSCH 1722 with broadcast information is mapped may be equal to the index of the first OFDM symbol to which the monitoring occasion 1721 for type 0 PDCCH CSS set is mapped. In the second condition, the index S of the first OFDM symbol to which the PDSCH 1722 with broadcast information is mapped may be equal to the index of the first OFDM symbol of the SS/PBCH block 1720. In the second condition, the index S of the first OFDM symbol to which the PDSCH 1732 with broadcast information is mapped may be equal to the index of the first OFDM symbol to which the monitoring occasion 1731 for type 0 PDCCH CSS set is mapped. In the second condition, the index S of the first OFDM symbol to which the PDSCH 1732 with broadcast information is mapped may be equal to the index of the first OFDM symbol of the SS/PBCH block 1730.

Figure 18:
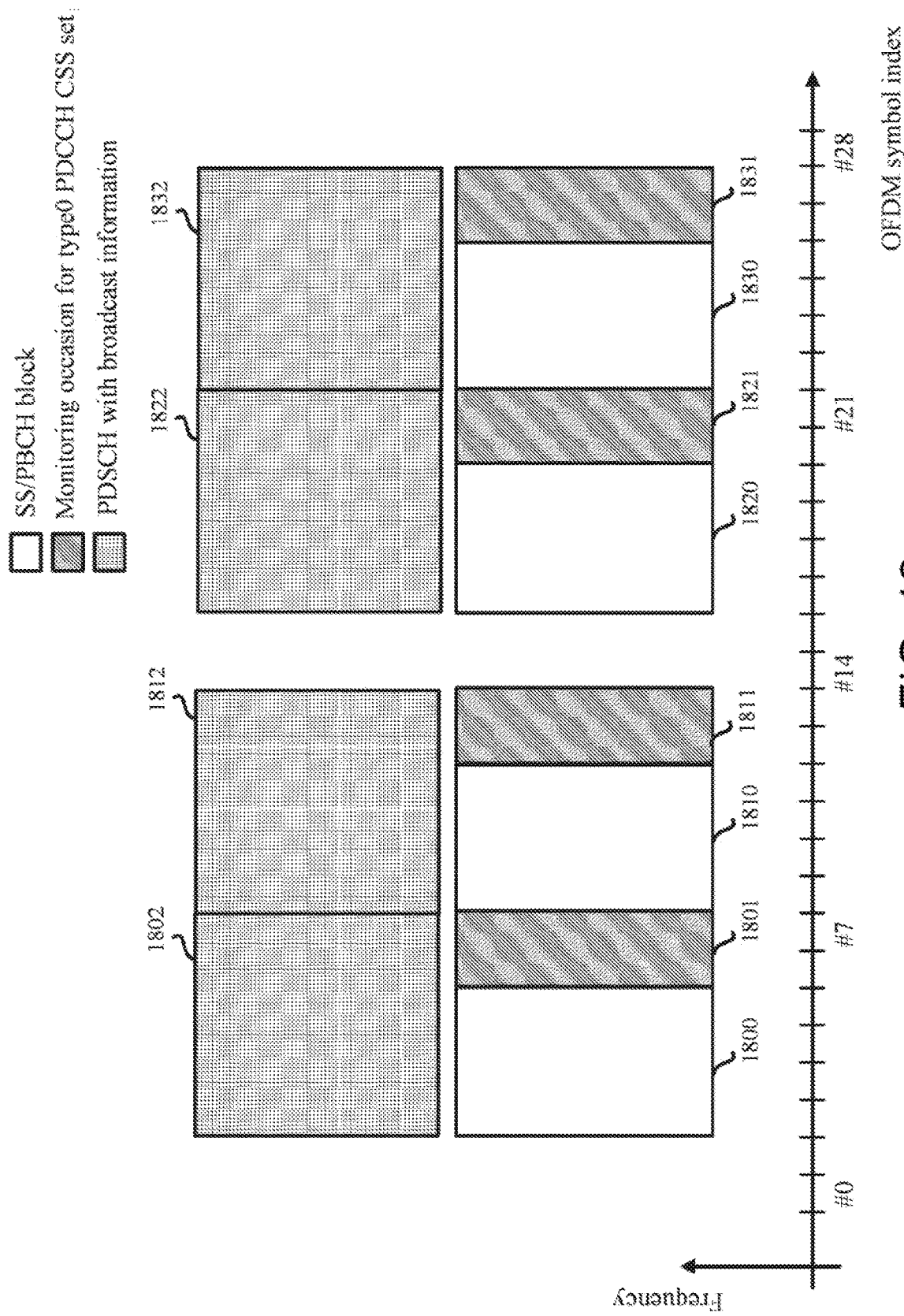
FIG. 18 is a diagram showing a mapping example of a DRS in a time-frequency domain according to one aspect of the present embodiment.

FIG. 18 is a diagram showing a mapping example of a DRS in a time-frequency domain according to one aspect of the present embodiment. In the example shown in FIG. 18, it is assumed that the mapping of SS/PBCH block candidates is a first type, and the number of symbol(s) of a control resource set associated with the type 0 PDCCH common search space set is 2. Here, as shown in FIG. 18, the SS/PBCH block 1800 may be at least mapped to OFDM symbols from #2 to #5. In addition, the SS/PBCH block 1810 may be at least mapped to OFDM symbols from #8 to #11. In addition, the SS/PBCH block 1820 may be at least mapped to OFDM symbols from #16 to #19. In addition, the SS/PBCH block 1830 may be at least mapped to OFDM symbols from #22 to #25. In addition, a monitoring occasion 1801 for type 0 PDCCH CSS set may be at least mapped to OFDM symbols from #6 to #7. In addition, a monitoring occasion 1811 for type 0 PDCCH CSS set may be at least mapped to OFDM symbols from #12 to #13. In addition, a monitoring occasion 1821 for type 0 PDCCH CSS set may be at least mapped to OFDM symbols from #20 to #21. In addition, a monitoring occasion 1831 for type 0 PDCCH CSS set may be at least mapped to OFDM symbols from #26 to #27. In addition, a PDSCH 1802 with broadcast information may be at least mapped to OFDM symbols from #2 to #7. In addition, a PDSCH 1812 with broadcast information may be at least mapped to OFDM symbols from #8 to #13. In addition, a PDSCH 1822 with broadcast information may be at least mapped to OFDM symbols from #16 to #21. In addition, a PDSCH 1832 with broadcast information may be at least mapped to OFDM symbols from #22 to #27.

In the second condition, the monitoring occasion 1801 for type PDCCH CSS set may be at least mapped to the OFDM symbols from #6 to #7. In the second condition, the monitoring occasion 1811 for type 0 PDCCH CSS set may be at least mapped to the OFDM symbols from #12 to #13. In the second condition, the monitoring occasion 1821 for type 0 PDCCH CSS set may be at least mapped to the OFDM symbols from #20 to #21. In the second condition, the monitoring occasion 1831 for type 0 PDCCH CSS set may be at least mapped to the OFDM symbols from #26 to #27.

In the second condition, the monitoring occasion 1801 for type 0 PDCCH CSS set may be mapped to an OFDM symbol that is right after the SS/PBCH block 1800. In the second condition, the monitoring occasion 1811 for type 0 PDCCH CSS set may be mapped to an OFDM symbol that is right after the SS/PBCH block 1710. In the second condition, the monitoring occasion 1821 for type 0 PDCCH CSS set may be mapped to an OFDM symbol that is right after the SS/PBCH block 1820. In the second condition, the monitoring occasion 1831 for type 0 PDCCH CSS set may be mapped to an OFDM symbol that is right after the SS/PBCH block 1830.

In the second condition, the SS/PBCH block 1800 may correspond to the monitoring occasion 1801 for type 0 PDCCH CSS set. In addition, in the second condition, the SS/PBCH block 1810 may correspond to the monitoring occasion 1811 for type 0 PDCCH CSS set. In addition, in the second condition, the SS/PBCH block 1820 may correspond to the monitoring occasion 1821 for type 0 PDCCH CSS set. In addition, in the second condition, the SS/PBCH block 1830 may correspond to the monitoring occasion 1831 for type 0 PDCCH CSS set.

In the second condition, the SS/PBCH block 1800 may correspond to the monitoring occasion 1811 for type 0 PDCCH CSS set. In addition, in the second condition, the SS/PBCH block 1810 may correspond to the monitoring occasion 1801 for type 0 PDCCH CSS set. In addition, in the second condition, the SS/PBCH block 1820 may correspond to the monitoring occasion 1831 for type 0 PDCCH CSS set. In addition, in the second condition, the SS/PBCH block 1830 may correspond to the monitoring occasion 1821 for type 0 PDCCH CSS set.

In the second condition, any of the SS/PBCH block 1800, the SS/PBCH block 1810, the SS/PBCH block 1820, and the SS/PBCH block 1830 may correspond to any of the monitoring occasion 1801 for type 0 PDCCH CSS set, the monitoring occasion 1811 for type 0 PDCCH CSS set, the monitoring occasion 1821 for type 0 PDCCH CSS set, and the monitoring occasion 1831 for type 0 PDCCH CSS set.

In the second condition, the index S+L−1 of the ending OFDM symbol to which the PDSCH 1802 with broadcast information is mapped may be equal to the index of the ending OFDM symbol to which the monitoring occasion 1801 for type 0 PDCCH CSS set is mapped. In the second condition, the index S+L−1 of the ending OFDM symbol to which the PDSCH 1802 with broadcast information is mapped may be equal to the index of the ending OFDM symbol of the SS/PBCH block 1800. In the second condition, the index S+L−1 of the ending OFDM symbol to which the PDSCH 1812 with broadcast information is mapped may be equal to the index of the ending OFDM symbol to which the monitoring occasion 1811 for type 0 PDCCH CSS set is mapped. In the second condition, the index S of the ending OFDM symbol to which the PDSCH 1812 with broadcast information is mapped may be equal to the index of the ending OFDM symbol of the SS/PBCH block 1810. In the second condition, the index S+L−1 of the ending OFDM symbol to which the PDSCH 1822 with broadcast information is mapped may be equal to the index of the ending OFDM symbol to which the monitoring occasion 1821 for type 0 PDCCH CSS set is mapped. In the second condition, the index S+L−1 of the ending OFDM symbol to which the PDSCH 1822 with broadcast information is mapped may be equal to the index of the ending OFDM symbol of the SS/PBCH block 1820. In the second condition, the index S+L−1 of the ending OFDM symbol to which the PDSCH 1832 with broadcast information is mapped may be equal to the index of the ending OFDM symbol to which the monitoring occasion 1831 for type 0 PDCCH CSS set is mapped. In the second condition, the index S+L−1 of the ending OFDM symbol to which the PDSCH 1832 with broadcast information is mapped may be equal to the index of the ending OFDM symbol of the SS/PBCH block 1830.

Figure 19:
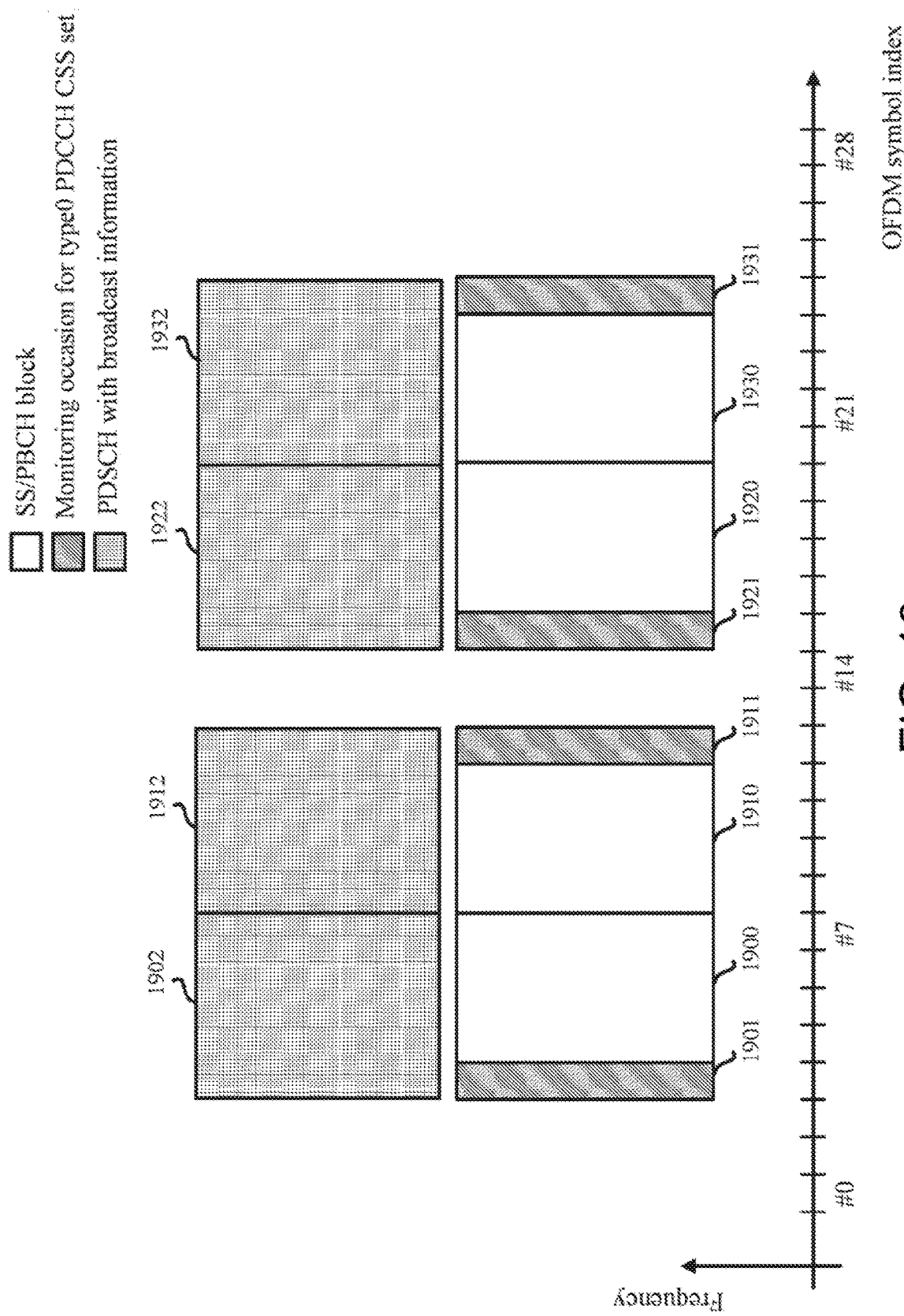
FIG. 19 is a diagram showing a mapping example of a DRS in a time-frequency domain according to one aspect of the present embodiment.

FIG. 19 is a diagram showing a mapping example of a DRS in a time-frequency domain according to one aspect of the present embodiment. In the example shown in FIG. 19, it is assumed that the mapping of SS/PBCH block candidates is a second type, and the number of symbol(s) of a control resource set associated with the type 0 PDCCH common search space set is 1. Here, as shown in FIG. 19, the SS/PBCH block 1900 may be at least mapped to OFDM symbols from #4 to #7. In addition, the SS/PBCH block 1910 may be at least mapped to OFDM symbols from #8 to #11. In addition, the SS/PBCH block 1920 may be at least mapped to OFDM symbols from #16 to #19. In addition, the SS/PBCH block 1930 may be at least mapped to OFDM symbols from #20 to #23. In addition, a monitoring occasion 1901 for type 0 PDCCH CSS set may be at least mapped to OFDM symbol #3. In addition, a monitoring occasion 1911 for type 0 PDCCH CSS set may be at least mapped to OFDM symbol #12. In addition, a monitoring occasion 1921 for type 0 PDCCH CSS set may be at least mapped to OFDM symbol #15. In addition, a monitoring occasion 1931 for type 0 PDCCH CSS set may be at least mapped to OFDM symbol #24. In addition, a PDSCH 1902 with broadcast information may be at least mapped to OFDM symbols from #3 to #7. In addition, a PDSCH 1912 with broadcast information may be at least mapped to OFDM symbols from #8 to #12. In addition, a PDSCH 1922 with broadcast information may be at least mapped to OFDM symbols from #15 to #19. In addition, a PDSCH 1932 with broadcast information may be at least mapped to OFDM symbols from #20 to #24.

Here, the second type regarding mapping of SS/PBCH block candidates may be such a type in which each of the SS/PBCH block candidates is mapped to the 4+14*n-th OFDM symbol, the 8+14*n-th OFDM symbol, the 16+14*n-th OFDM symbol, or the 20+14*n-th OFDM symbol. Here, the n may be 0 or 1.

In a third condition, the monitoring occasion 1901 for type 0 PDCCH CSS set may be at least mapped to the OFDM symbol #3. In the third condition, the monitoring occasion 1911 for type 0 PDCCH CSS set may be at least mapped to the OFDM symbol #12. In the third condition, the monitoring occasion 1921 for type 0 PDCCH CSS set may be at least mapped to the OFDM symbol #15. In the third condition, the monitoring occasion 1931 for type 0 PDCCH CSS set may be at least mapped to the OFDM symbol #24.

The third condition may satisfy at least some or all of the following Conditions 3A to 3C.

Condition 3A: the mapping of the SS/PBCH block candidates is the second type.

Condition 3B: the number of OFDM symbol(s) of a control resource set associated with the type 0 PDCCH common search space set is 1.

Condition 3C: the operation is performed in an unlicensed band.

In the third condition, the monitoring occasion 1901 for type 0 PDCCH CSS set may be mapped to an OFDM symbol that is right before the SS/PBCH block 1900. In the third condition, the monitoring occasion 1911 for type 0 PDCCH CSS set may be mapped to an OFDM symbol that is right after the SS/PBCH block 1910. In the third condition, the monitoring occasion 1921 for type 0 PDCCH CSS set may be mapped to an OFDM symbol that is right before the SS/PBCH block 1920. In the third condition, the monitoring occasion 1931 for type 0 PDCCH CSS set may be mapped to an OFDM symbol that is right after the SS/PBCH block 1930.

In the third condition, the SS/PBCH block 1900 may correspond to the monitoring occasion 1901 for type 0 PDCCH CSS set. In addition, in the third condition, the SS/PBCH block 1910 may correspond to the monitoring occasion 1911 for type 0 PDCCH CSS set. In addition, in the third condition, the SS/PBCH block 1920 may correspond to the monitoring occasion 1921 for type 0 PDCCH CSS set. In addition, in the third condition, the SS/PBCH block 1930 may correspond to the monitoring occasion 1931 for type 0 PDCCH CSS set.

In the third condition, the SS/PBCH block 1900 may correspond to the monitoring occasion 1911 for type 0 PDCCH CSS set. In addition, in the third condition, the SS/PBCH block 1910 may correspond to the monitoring occasion 1901 for type 0 PDCCH CSS set. In addition, in the third condition, the SS/PBCH block 1920 may correspond to the monitoring occasion 1931 for type 0 PDCCH CSS set. In addition, in the third condition, the SS/PBCH block 1930 may correspond to the monitoring occasion 1921 for type 0 PDCCH CSS set.

In the third condition, any of the SS/PBCH block 1900, the SS/PBCH block 1910, the SS/PBCH block 1920, and the SS/PBCH block 1930 may correspond to any of the monitoring occasion 1901 for type 0 PDCCH CSS set, the monitoring occasion 1911 for type 0 PDCCH CSS set, the monitoring occasion 1921 for type 0 PDCCH CSS set, and the monitoring occasion 1931 for type 0 PDCCH CSS set.

In the third condition, the index S of the first OFDM symbol to which the PDSCH 1902 with broadcast information is mapped may be equal to the index of the OFDM symbol to which the monitoring occasion 1901 for type 0

PDCCH CSS set is mapped. In the third condition, the index S of the first OFDM symbol to which the PDSCH 1902 with broadcast information is mapped may be equal to the index of the first OFDM symbol of the SS/PBCH block 1900. In the third condition, the index S+L−1 of the last OFDM symbol to which the PDSCH 1912 with broadcast information is mapped may be equal to the index of the OFDM symbol to which the monitoring occasion 1911 for type 0 PDCCH CSS set is mapped. In the third condition, the index S+L−1 of the ending OFDM symbol to which the PDSCH 1912 with broadcast information is mapped may be equal to the index of the ending OFDM symbol of the SS/PBCH block 1910. In the third condition, the index S of the first OFDM symbol to which the PDSCH 1922 with broadcast information is mapped may be equal to the index of the OFDM symbol to which the monitoring occasion 1921 for type 0 PDCCH CSS set is mapped. In the third condition, the index S of the first OFDM symbol to which the PDSCH 1922 with broadcast information is mapped may be equal to the index of the first OFDM symbol of the SS/PBCH block 1920. In the third condition, the index S+L−1 of the last OFDM symbol to which the PDSCH 1932 with broadcast information is mapped may be equal to the index of the OFDM symbol to which the monitoring occasion 1931 for type 0 PDCCH CSS set is mapped. In the third condition, the index S of the ending OFDM, symbol to which the PDSCH 1932 with broadcast information is mapped may be equal to the index of the ending OFDM, symbol of the SS/PBCH block 1930.

Figure 20:
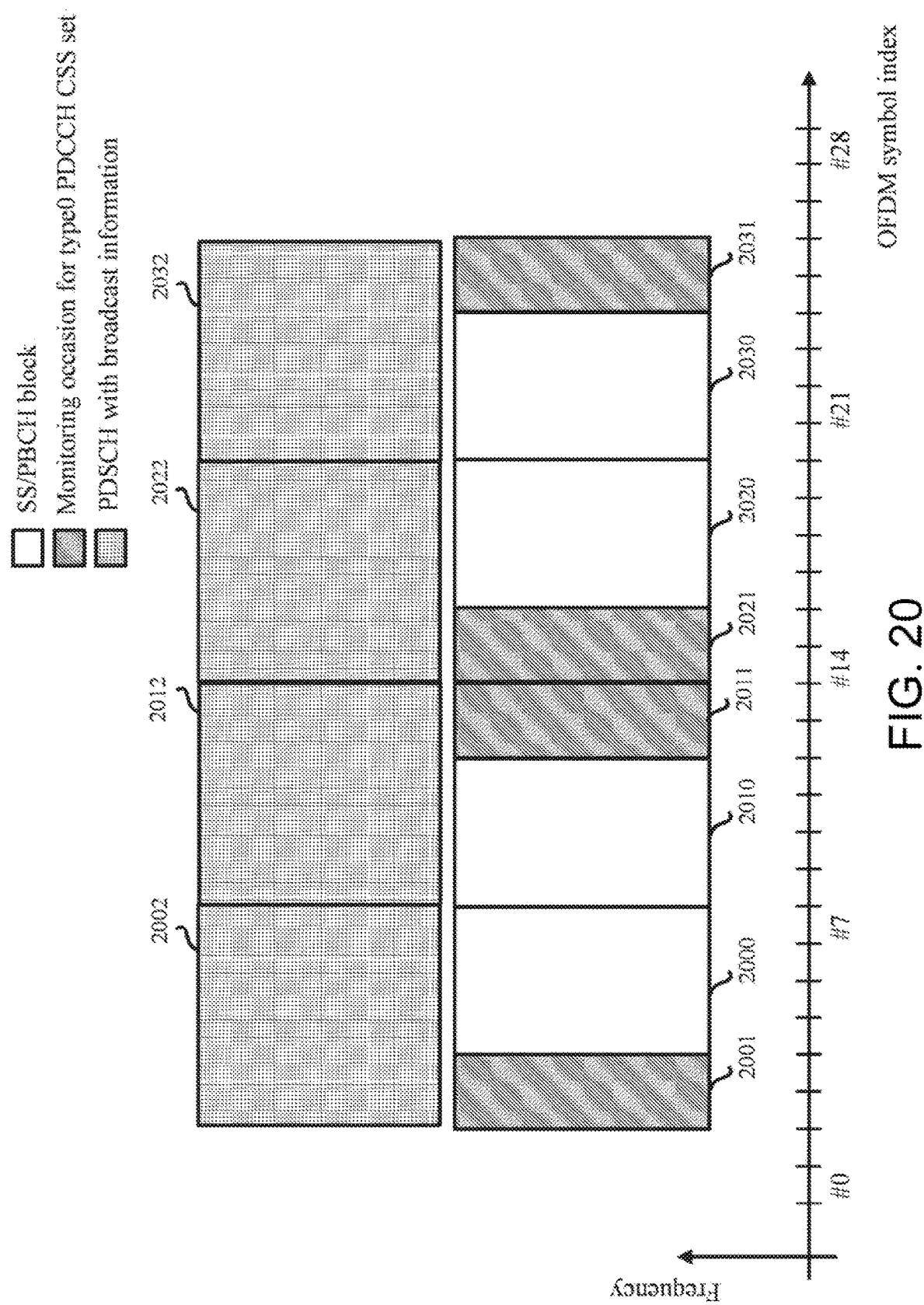
FIG. 20 is a diagram showing a mapping example of a DRS in a time-frequency domain according to one aspect of the present embodiment.

FIG. 20 is a diagram showing a mapping example of a DRS in a time-frequency domain according to one aspect of the present embodiment. In the example shown in FIG. 20, it is assumed that the mapping of SS/PBCH block candidates is a second type, and the number of symbol(s) of a control resource set associated with the type 0 PDCCH common search space set is 2. Here, as shown in FIG. 20, the SS/PBCH block 2000 may be at least mapped to OFDM symbols from #4 to #7. In addition, the SS/PBCH block 2010 may be at least mapped to OFDM, symbols from #8 to #11. In addition, the SS/PBCH block 2020 may be at least mapped to OFDM symbols from #16 to #19. In addition, the SS/PBCH block 2030 may be at least mapped to OFDM symbols from #20 to #23. In addition, a monitoring occasion 2001 for type 0 PDCCH CSS set may be at least mapped to OFDM symbols from #2 to #3. In addition, a monitoring occasion 2011 for type 0 PDCCH CSS set may be at least mapped to OFDM symbols from #12 to #13. In addition, a monitoring occasion 2021 for type 0 PDCCH CSS set may be at least mapped to OFDM symbols from #14 to #15. In addition, a monitoring occasion 2031 for type 0 PDCCH CSS set may be at least mapped to OFDM symbols from #24 to #25. In addition, a PDSCH 2002 with broadcast information may be at least mapped to OFDM symbols from #2 to #7. In addition, a PDSCH 2012 with broadcast information may be at least mapped to OFDM symbols from #8 to #13. In addition, a PDSCH 2022 with broadcast information may be at least mapped to OFDM symbols from #14 to #19. In addition, a PDSCH 2032 with broadcast information may be at least mapped to OFDM symbols from #20 to #25.

In a fourth condition, the monitoring occasion 2001 for type 0 PDCCH CSS set may be at least mapped to the OFDM symbols from #2 to #3. In the fourth condition, the monitoring occasion 2011 for type 0 PDCCH CSS set may be at least mapped to the OFDM symbols from #12 to #13. In the fourth condition, the monitoring occasion 2021 for type 0 PDCCH CSS set may be at least mapped to the OFDM symbols from #14 to #15. In the fourth condition, the monitoring occasion 2031 for type 0 PDCCH CSS set may be at least mapped to the OFDM symbols from #24 to #25.

The fourth condition may satisfy at least some or all of the following Conditions 4A to 4C.
- Condition 4A: the mapping of the SS/PBCH block candidates is the second type,
- Condition 4B: the number of OFDM symbol(s) of a control resource set associated with the type 0 PDCCH common search space set is 2.
- Condition 4C: the operation is performed in an unlicensed band, In the fourth condition, the monitoring occasion 2001 for type 0 PDCCH CSS set may be mapped to an OFDM symbol that is right before the SS/PBCH block 2000. In the fourth condition, the monitoring occasion 2011 for type 0 PDCCH CSS set may be mapped to an OFDM symbol that is right after the SS/PBCH block 2010. In the fourth condition, the monitoring occasion 2021 for type 0 PDCCH CSS set may be mapped to an OFDM symbol that is right before the SS/PBCH block 2020. In the fourth condition, the monitoring occasion 2031 for type 0 PDCCH CSS set may be mapped to an OFDM symbol that is right after the SS/PBCH block 2030.

In the fourth condition, the SS/PICA block 2000 may correspond to the monitoring occasion 2001 for type 0 PDCCH CSS set. In addition, in the fourth condition, the SS/PBCH block 2010 may correspond to the monitoring occasion 2011 for type 0 PDCCH CSS set. In addition, in the fourth condition, the SS/PBCH block 2020 may correspond to the monitoring occasion 2021 for type 0 PDCCH CSS set. In addition, in the fourth condition, the SS/PBCH block 2030 may correspond to the monitoring occasion 2031 for type 0 PDCCH CSS set.

In the fourth condition, the SS/PICA block 2000 may correspond to the monitoring occasion 2011 for type 0 PDCCH CSS set. In addition, in the fourth condition, the SS/PBCH block 2010 may correspond to the monitoring occasion 2001 for type 0 PDCCH CSS set. In addition, in the fourth condition, the SS/PBCH block 2020 may correspond to the monitoring occasion 2031 for type 0 PDCCH CSS set. In addition, in the fourth condition, the SS/PBCH block 2030 may correspond to the monitoring occasion 2021 for type 0 PDCCH CSS set.

In the fourth condition, any of the SS/PBCH block 2000, the SS/PBCH block 2010, the SS/PBCH block 2020, and the SS/PBCH block 2030 may correspond to any of the monitoring occasion 2001 for type 0 PDCCH CSS set, the monitoring occasion 2011 for type 0 PDCCH CSS set, the monitoring occasion 2021 for type 0 PDCCH CSS set, and the monitoring occasion 2031 for type 0 PDCCH CSS set.

In the fourth condition, the index S of the first OFDM symbol to which the PDSCH 2002 with broadcast information is mapped may be equal to the index of the first OFDM symbol to which the monitoring occasion 2001 for type 0 PDCCH CSS set is mapped. In the fourth condition, the index S of the first OFDM symbol to which the PDSCH 2002 with broadcast information is mapped may be equal to the index of the first OFDM symbol of the SS/PITCH block 2000. In the fourth condition, the index S+L−1 of the last OFDM symbol to which the PDSCH 2012 with broadcast information is mapped may be equal to the index of the ending OFDM symbol to which the monitoring occasion 2011 for type 0 PDCCH CSS set is mapped. In the fourth condition, the index S+L−1 of the ending OFDM symbol to which the PDSCH 2012 with broadcast information is mapped may be equal to the index of the ending OFDM symbol of the SS/PBCH block 2010. In the fourth condition, the index S of the first OFDM symbol to which the PDSCH 2022 with broadcast information is mapped may be equal to the index of the first OFDM symbol to which the monitoring occasion 2021 for type 0 PDCCH CSS set is mapped. In the fourth condition, the index S of the first OFDM symbol to which the PDSCH 2022 with broadcast information is mapped may be equal to the index of the first OFDM symbol of the SS/PBCH block 2020. In the fourth condition, the index S+L−1 of the last OFDM symbol to which the PDSCH 2032 with broadcast information is mapped may be equal to the index of the ending OFDM symbol to which the monitoring occasion 2031 for type 0 PDCCH CSS set is mapped. In the fourth condition, the index S of the ending OFDM symbol to which the PDSCH 2032 with broadcast information is mapped may be equal to the index of the ending OFDM symbol of the SS/PBCH block 2030.

Hereinafter, aspects of various apparatuses according to one aspect of the present embodiment will be described.

(1) In order to achieve the above objective, the following means are adopted by the aspects of the present invention. That is, a first aspect of the present invention is to provide a terminal apparatus comprising a reception unit configured to monitor a first SS/PBCH block and a second SS/PBCH block and monitor a PDCCH in a first monitoring occasion for a first search space set and in a second monitoring occasion for a second search space set. The first SS/PBCH block is mapped to OFDM symbols from #2 to #5 in a slot, and a second SS/PBCH block is mapped to OFDM symbols from #8 to #11 in the slot. The first monitoring occasion for the first search space set is at least mapped to an OFDM symbol #1 in the slot, and the second monitoring occasion for the second search space set is at least mapped to an OFDM symbol #7 in the slot. The first SS/PBCH block corresponds to the first monitoring occasion for the first search space set, and the second SS/PBCH block corresponds to the second monitoring occasion for the second search space set.

(2) In addition, in the first aspect of the present invention, the first monitoring occasion for the first search space set is adjacent to a first OFDM symbol of the first SS/PBCH block and mapped to an OFDM symbol before the first SS/PBCH block, and the second monitoring occasion for the second search space set is adjacent to a first OFDM symbol of the second SS/PBCH block and mapped to an OFDM symbol before the second SS/PBCH block.

(3) In addition, a second aspect of the present invention is to provide a base station apparatus comprising a transmission unit configured to transmit a first SS/PBCH block and a second SS/PBCH block and transmit a PDCCH in a first monitoring occasion for a first search space set and in a second monitoring occasion for a second search space set. The first SS/PBCH block is mapped to OFDM symbols from #2 to #5 in a slot, and a second SS/PBCH block is mapped to OFDM symbols from #8 to #11 in the slot. The first monitoring occasion for the first search space set is at least mapped to an OFDM symbol #1 in the slot, and the second monitoring occasion for the second search space set is at least mapped to an OFDM symbol #7 in the slot. The first SS/PBCH block corresponds to the first monitoring occasion for the first search space set, and the second SS/PBCH block corresponds to the second monitoring occasion for the second search space set.

(4) In addition, in the second aspect of the present invention, the first monitoring occasion for the first search space set is adjacent to a first OFDM symbol of the first SS/PBCH block and mapped to an OFDM symbol before the first SS/PBCH block, and the second monitoring occasion for the second search space set is adjacent to a first OFDM symbol of the second SS/PBCH block and mapped to an OFDM symbol before the second SS/PBCH block.

A program operating in the base station apparatus 3 and the terminal apparatus 1 according to the present invention may be a program that controls a central processing unit (CPU) and the like (i.e., a program to cause a computer to function) to implement the functions of the above-described embodiment according to the present invention. Further, the information processed by these apparatuses is temporarily stored in RAM (Random Access Memory) while being processed, then stored in various types of ROM (Read Only Memory) such as a Flash ROM and HDD (Hard Disk Drive), and read, modified, or rewritten by the CPU as necessary.

It should be noted that a part of the terminal apparatus 1 and the base station apparatus 3 according to the above embodiment may be realized by a computer. In that case, it may be realized by recording a program for realizing the control function on a computer-readable recording medium, and causing a computer system to read the program recorded on the recording medium for execution.

It should be noted that the "computer system" mentioned here indicates a computer system built into the terminal apparatus 1 or the base station apparatus 3, and the computer system may include an Operating System (OS) and hardware components such as a peripheral apparatus. In addition, the "computer-readable recording medium" indicates a portable medium such as a flexible disk, an optical disk, a ROM, a CD-ROM, and the like, and a storage device such as a hard disk built into the computer system.

Also, the "computer-readable recording medium" may include a recording medium for dynamically storing programs for a short time, such as a communication line in the case of transmitting the programs via a network such as the internet or a communication line such as a telephone line, and may include a recording medium for storing the programs for a fixed period of time, such as a volatile memory within a computer system of a server or a client in such a case. Besides, the above-mentioned program may be configured to realize some of the functions described above, and also may be configured to be capable of realizing the functions described above in combination with a program already recorded in the computer system.

In addition, the base station apparatus 3 according to the above-mentioned embodiment may be implemented as an aggregation (apparatus group) including multiple apparatuses. Each of the apparatuses constituting such an apparatus group may include some or all portions of each function or each functional block of the base station apparatus 3 according to the above-mentioned embodiment. The apparatus group may be required to have each general function or each functional block of the base station apparatus 3. In addition, the terminal apparatus 1 according to the above-mentioned embodiment can also communicate with a base station apparatus implemented as aggregation.

In addition, the base station apparatus 3 according to the above-mentioned embodiment may serve as an EUTRAN (Evolved Universal Terrestrial Radio Access Network) and/or NG-RAN (NextGen RAN or NR RAN). In addition, the base station apparatus 3 according to the above-mentioned embodiment may have some or all of the functions of a higher layer node with respect to an eNodeB and/or gNB.

In addition, some or all portions of the terminal apparatus 1 and the base station apparatus 3 according to the above-mentioned embodiment may be implemented as an LSI typically functioning as an integrated circuit or may be implemented as a chip set. Each of the functional blocks of the terminal apparatus 1 and the base station apparatus 3 may be individually implemented as a chip, or some or all of the functional blocks of the same may be integrated into a chip. In addition, a circuit integration technique is not limited to the LSI, and may be implemented by a dedicated circuit or a general-purpose processor. In addition, with the advance in semiconductor technology, a circuit integration technology may appear to replace the LSI technology, and an integrated circuit based on such a technology can also be used.

Further, according to the above-mentioned embodiment, the terminal apparatus has been described as an example of a communication apparatus, but the present invention is not limited to such a terminal apparatus, and is applicable to a fixed-type or a stationary-type electronic equipment installed indoors or outdoors, for example, terminal apparatuses or communication apparatuses such as AV equipment, kitchen equipment, cleaning/washing equipment, an air-conditioning equipment, office equipment, a vending machine, and other household apparatuses.

The embodiments of the present invention have been described in detail with reference to the accompanying drawings, but the specific configuration is not limited to the embodiments and further includes design modification and the like without departing from the scope of the present invention. In addition, various modifications are possible within the scope of the present invention defined by claims, and embodiments that are made by suitably combining technical means disclosed according to the different embodiments are also included in the technical scope of the present invention. In addition, a configuration in which constituent elements, described in the respective embodiments and having mutually the same effects, are substituted for one another may also be included in the technical scope of the present invention.

What is claimed is:

1. A terminal apparatus, comprising:
a reception unit configured to:
when a carrier is set in an unlicensed band, detect a first Physical Downlink Control Channel (PDCCH) in a first type 0 PDCCH common search space set and receive a first Physical Downlink Shared Channel (PDSCH) scheduled by the first PDCCH, and
when the carrier is not set in the unlicensed band, detect a second PDCCH in a second type 0 PDCCH common search space set and receive a second PDSCH scheduled by the second PDCCH; and
a higher layer processing unit configured to manage common Radio Resource Control (RRC) signaling included in the first PDSCH or the second PDSCH, wherein:
a time domain resource configuration of the first PDSCH is a first configuration, and
a time domain resource configuration of the second PDSCH is a second configuration different from the first configuration.

2. A base station apparatus, comprising:
a transmission unit configured to:
when a carrier is set in an unlicensed band, transmit a first Physical Downlink Control Channel (PDCCH) in a first type 0 PDCCH common search space set and transmit a first Physical Downlink Shared Channel (PDSCH) scheduled by the first PDCCH, and
when the carrier is not set in the unlicensed band, transmit a second PDCCH in a second type 0 PDCCH common search space set and transmit a second PDSCH scheduled by the second PDCCH; and
a higher layer processing unit configured to manage common Radio Resource Control (RRC) signaling included in the first PDSCH or the second PDSCH, wherein:
a time domain resource configuration of the first PDSCH is a first configuration, and
a time domain resource configuration of the second PDSCH is a second configuration different from the first configuration.

3. A communication method for a terminal apparatus, the communication method comprising:
when a carrier is set in an unlicensed band, detecting a first Physical Downlink Control Channel (PDCCH) in a first type 0 PDCCH common search space set and receiving a first Physical Downlink Shared Channel (PDSCH) scheduled by the first PDCCH;
when the carrier is not set in the unlicensed band, detecting a second PDCCH in a second type 0 PDCCH common search space set and receiving a second PDSCH scheduled by the second PDCCH; and
managing common Radio Resource Control (RRC) signaling included in the first PDSCH or the second PDSCH, wherein:
a time domain resource configuration of the first PDSCH is a first configuration, and
a time domain resource configuration of the second PDSCH is a second configuration different from the first configuration.

4. A communication method for a base station apparatus, the communication method comprising:
when a carrier is set in an unlicensed band, transmitting a first Physical Downlink Control Channel (PDCCH) in a first type 0 PDCCH common search space set and transmitting a first Physical Downlink Shared Channel (PDSCH) scheduled by the first PDCCH;
when the carrier is not set in the unlicensed band, transmitting a second PDCCH in a second type 0 PDCCH common search space set and transmitting a second PDSCH scheduled by the second PDCCH; and
managing common Radio Resource Control (RRC) signaling included in the first PDSCH or the second PDSCH, wherein:
a time domain resource configuration of the first PDSCH is a first configuration, and
a time domain resource configuration of the second PDSCH is a second configuration different from the first configuration.

* * * * *